United States Patent
Ikeda

(10) Patent No.: US 11,954,269 B2
(45) Date of Patent: Apr. 9, 2024

(54) INFORMATION PROCESSING APPARATUS, INFORMATION PROCESSING METHOD, AND PROGRAM FOR GENERATING LOCATION DATA

(71) Applicant: SONY GROUP CORPORATION, Tokyo (JP)

(72) Inventor: Nozomu Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 20 days.

(21) Appl. No.: 17/765,647

(22) PCT Filed: Oct. 29, 2020

(86) PCT No.: PCT/JP2020/040562
§ 371 (c)(1),
(2) Date: Mar. 31, 2022

(87) PCT Pub. No.: WO2021/095537
PCT Pub. Date: May 20, 2021

(65) Prior Publication Data
US 2022/0382390 A1    Dec. 1, 2022

(30) Foreign Application Priority Data

Nov. 12, 2019   (JP) ................. 2019-204442

(51) Int. Cl.
*G06F 3/0346*     (2013.01)
*G06T 19/00*      (2011.01)
(Continued)

(52) U.S. Cl.
CPC .......... *G06F 3/0346* (2013.01); *G06T 19/006* (2013.01); *H04N 13/117* (2018.05); *H04N 13/344* (2018.05)

(58) Field of Classification Search
CPC .. G06F 3/0346; H04N 13/117; H04N 13/344; H04N 13/332; H04N 13/341; G06T 19/006
See application file for complete search history.

(56) References Cited

U.S. PATENT DOCUMENTS

2016/0364013 A1* 12/2016 Katz ................. G06F 3/011

FOREIGN PATENT DOCUMENTS

| JP | 2006-252468 A | 9/2006 |
|---|---|---|
| JP | 2011-036483 A | 2/2011 |

(Continued)

*Primary Examiner* — Lisa S Landis
(74) *Attorney, Agent, or Firm* — Paratus Law Group, PLLC

(57) ABSTRACT

The present technology relates to an information processing apparatus, an information processing method, and a program that enable a configuration of a head mounted display (HMD) to be simplified. There is provided a generation unit configured to generate: first location data regarding a location of self with respect to a real space; second location data regarding a location of another device with respect to self; and third location data regarding a location of the another device with respect to the real space on the basis of the first location data and the second location data. On the basis of the third location data, image data of an image localized in the real space and to be displayed by the another device is generated. The present technology can be applied to, for example, an information processing apparatus that supplies location data representing a location of an HMD to the HMD.

20 Claims, 42 Drawing Sheets

(51) Int. Cl.
*H04N 13/117* (2018.01)
*H04N 13/344* (2018.01)

(56) References Cited

FOREIGN PATENT DOCUMENTS

| | | |
|---|---|---|
| JP | 2015-156186 A | 8/2015 |
| JP | 2017-146651 A | 8/2017 |
| JP | 2019-045178 A | 3/2019 |
| WO | WO 2016/021252 A1 | 2/2016 |

* cited by examiner

FIG. 2
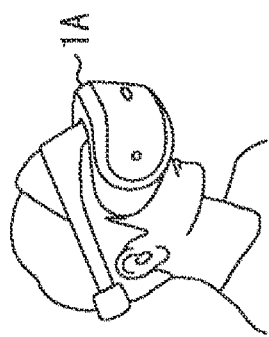
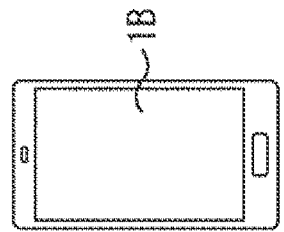

FIG. 7
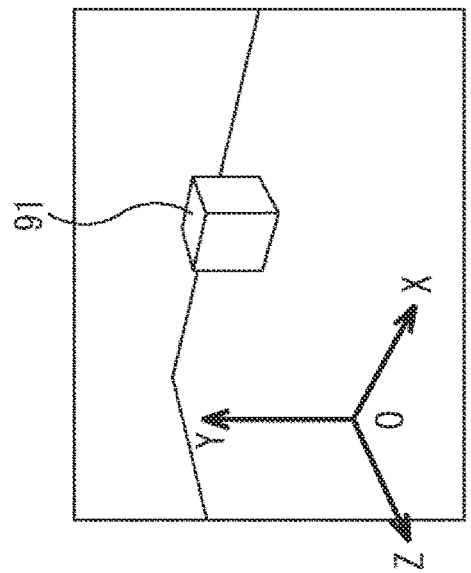
A
WORLD COORDINATE SYSTEM
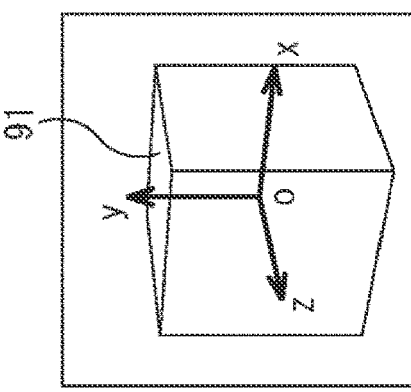
B
LOCAL COORDINATE SYSTEM

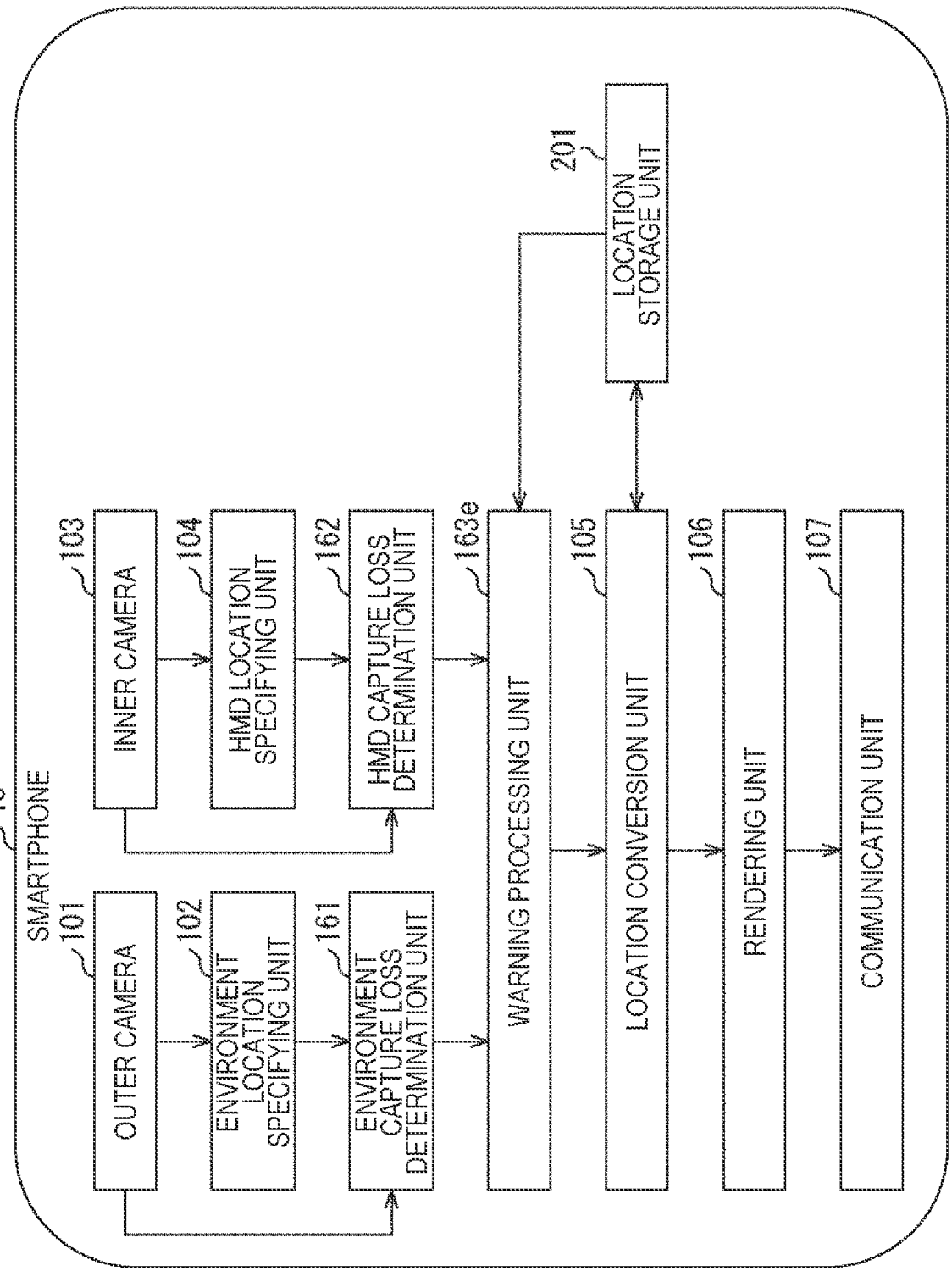

*FIG. 24*

```
START OF FIFTH PROCESSING OF SMARTPHONE
          │
          ▼
CALCULATE LOCATION AND POSITION OF          S241
SMARTPHONE WITH RESPECT TO ENVIRONMENT
          │
          ▼
DETERMINE ENVIRONMENT CAPTURE LOSS          S242
          │
          ▼
CALCULATE LOCATION AND POSITION OF HMD      S243
WITH RESPECT TO SMARTPHONE
          │
          ▼
DETERMINE HMD CAPTURE LOSS                  S244
          │
          ▼
        S245
   HAS CAPTURE
   LOSS OCCURRED?  ──YES──►  GENERATE RETURN SUPPORT INFORMATION   S246
        │                              │
        NO                             ▼
        │                    CALCULATE LOCATION AND POSITION OF    S247
        │                    HMD WITH RESPECT TO ENVIRONMENT
        ▼
CALCULATE LOCATION AND POSITION OF          S248
HMD WITH RESPECT TO ENVIRONMENT
          │
          ▼
STORE LOCATION DATA                         S249
          │
          ▼
PERFORM SPATIAL LOCALIZATION                S250
RENDERING ON AR CONTENT
          │
          ▼
TRANSMIT IMAGE DATA AND                     S251
RETURN SUPPORT INFORMATION
          │
          ▼
         END
```

INFORMATION PROCESSING APPARATUS, INFORMATION PROCESSING METHOD, AND PROGRAM FOR GENERATING LOCATION DATA

CROSS REFERENCE TO PRIOR APPLICATION

This application is a National Stage Patent Application of PCT International Patent Application No. PCT/JP2020/040562 (filed on Oct. 29, 2020) under 35 U.S.C. § 371, which claims priority to Japanese Patent Application No. 2019-204442 (filed on Nov. 12, 2019), which are all hereby incorporated by reference in their entirety.

TECHNICAL FIELD

The present technology relates to an information processing apparatus, an information processing method, and a program, for example, information processing apparatus, an information processing method, and a program capable of generating location data in a space where another device is located.

BACKGROUND ART

A technology called augmented reality (AR) that superimposes additional information on a real space and presents to the user is known. The information presented to the user in the AR technology is also called annotation. The annotation is visualized by a virtual object in various forms such as text, an icon, and animation.

Patent Document 1 discloses a technique for easily realizing a cooperative operation of a plurality of devices via an information processing apparatus. It is disclosed that a plurality of devices includes devices that provide augmented reality.

CITATION LIST

Patent Document

Patent Document 1: Japanese Patent Application Laid-Open No. 2015-156186

SUMMARY OF THE INVENTION

Problems to be Solved by the Invention

A device that provides augmented reality, such as, for example, a head mounted display (HMD), is mounted with a camera that images an external environment, a camera that images a user's line-of-sight, and a sensor to specify of a location. It is desired to promote widespread use of HMDs by reducing a weight of an HMD configuration and reducing a manufacturing cost and an initial introduction cost.

The present technology has been made in view of such a situation, and is to enable, for example, reduction of a weight of a configuration of a device such as an HMD and reduction of a manufacturing cost.

Solutions to Problems

An information processing apparatus of one aspect of the present technology includes a generation unit configured to generate: first location data regarding a location of self with respect to a real space; second location data regarding a location of the another device with respect to self; and third location data regarding a location of the another device with respect to the real space on the basis of the first location data and the second location data.

In an information processing method of one aspect of the present technology, an information processing apparatus for generating location data generates: first location data regarding a location with respect to a real space; second location data regarding a location of the another device with respect to self; and third location data regarding a location of the another device with respect to the real space on the basis of the first location data and the second location data.

A program of one aspect of the present technology causes a computer to execute processing including a step of generating: first location data regarding a location of self with respect to a real space; second location data regarding a location of the another device with respect to self; and third location data regarding a location of the another device with respect to the real space on the basis of the first location data and the second location data.

In the information processing apparatus, information processing method, and program of one aspect of the present technology, there are generated: first location data regarding a location of self with respect to a real space; second location data regarding a location of another device with respect to self; and third location data regarding a location of the another device with respect to the real space on the basis of the first location data and the second location data.

Note that the information processing apparatus may be an independent apparatus, or may be an internal block that forms one device.

Furthermore, the program can be provided by being transmitted via a transmission medium or by being recorded on a recording medium.

BRIEF DESCRIPTION OF DRAWINGS

FIG. 2 is a view showing an example of a display device.

FIG. 7 is a view for explaining a coordinate system.

FIG. 23 is a diagram showing a configuration example of a smartphone in a fifth embodiment.

FIG. 24 is a flowchart for explaining processing of the smartphone in the fifth embodiment.

MODE FOR CARRYING OUT THE INVENTION

Hereinafter, embodiments for implementing the present technology (hereinafter, referred to as embodiments) will be described.

<About Display Device for AR Content>

Figure 1:
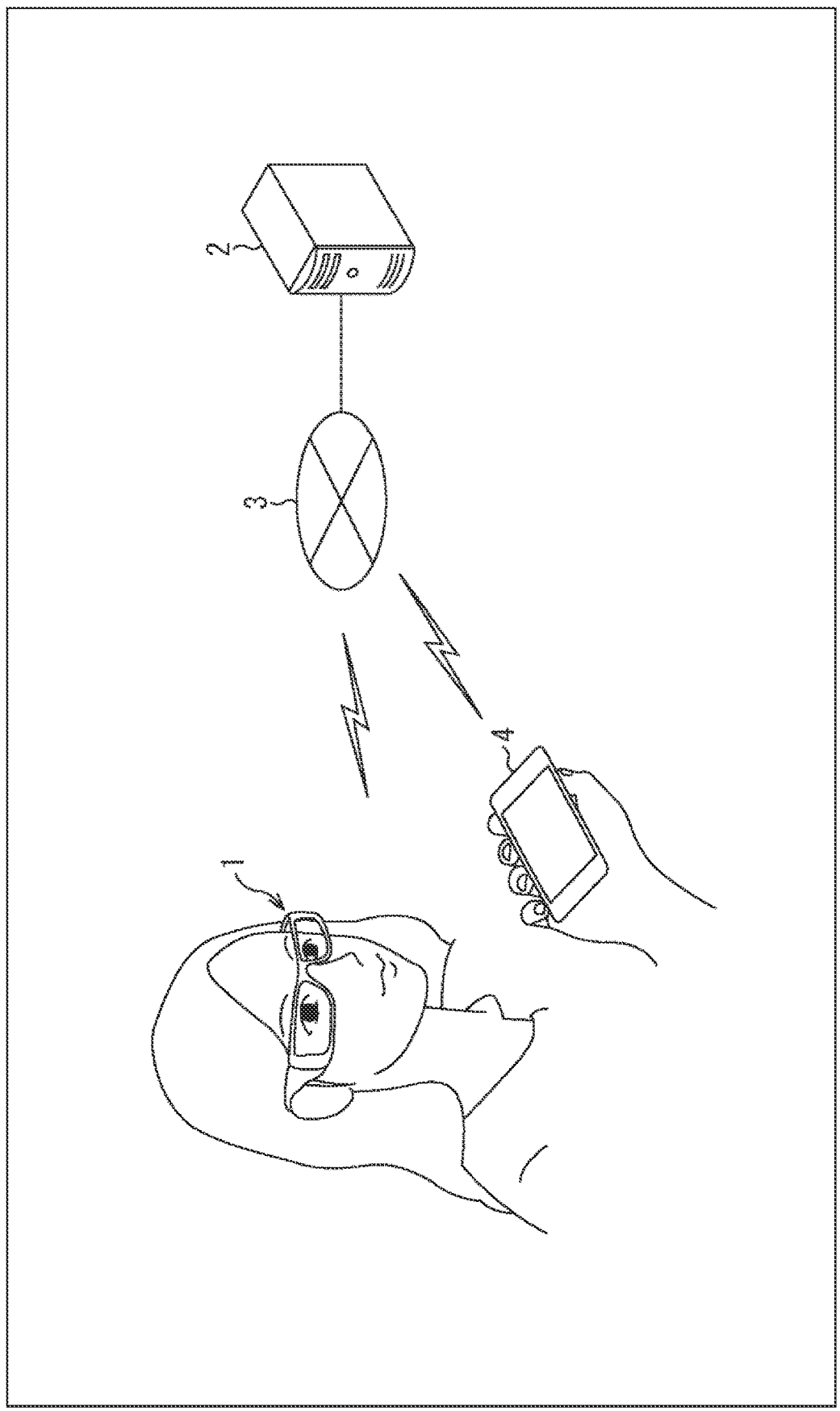
FIG. 1 is a view showing a configuration of an embodiment of an information processing system according to the present disclosure.

FIG. 1 is a view showing a configuration example of an information processing system according to an embodiment of the present technology.

The information processing system of FIG. 1 is configured by connecting a head mounted display (HMD) 1 and an information processing apparatus 2 via a network 3 such as a local area network (LAN) or the Internet. Alternatively, the configuration is made by connecting a smartphone 4 and the information processing apparatus 2 via the network 3.

Furthermore, the HMD 1 and the smartphone 4 are configured to be able to exchange data with each other at least such that data is transmitted from the smartphone 4 to the HMD 1, and the HMD 1 receives and processes the data. The HMD 1, the information processing apparatus 2, and the smartphone 4 constituting the information processing system individually function as an information processing apparatus that processes predetermined information (data).

As shown in FIG. 1, the HMD 1 is a spectacle-shaped wearable terminal provided with a transmissive display unit. The HMD 1 displays a video image including various objects such as characters on a display unit, in accordance with control by the information processing apparatus 2 performed via the network 3, or in accordance with control by the information processing apparatus 2 performed via the network 3 and the smartphone 4. A user will see an object superimposed on a landscape in front of the user.

Hereinafter, a plurality of embodiments will be described as embodiments to which the present technology is applied. Depending on the embodiment, there are cases where image data of an image displayed by the HMD 1 is supplied from the information processing apparatus 2, and where the image data is once supplied from the information processing apparatus 2 to the smartphone 4 and then supplied via the smartphone 4.

A projection method of a video image including an object may be a virtual image projection method or a retinal projection method in which the image is directly formed on the retina of the user's eye.

The information processing apparatus 2 reproduces an AR content and transmits video image data obtained by the reproduction to the HMD 1 or the smartphone 4, so that a video image of the AR content is displayed on the HMD 1. The information processing apparatus 2 is configured by, for example, a personal computer (PC).

The smartphone 4 calculates a location and a position of the HMD 1 with respect to an environment (a real space). While details will be described later, the smartphone 4 calculates a location of the HMD 1 with respect to the environment by calculating a location of the smartphone 4 (self) with respect to the environment and a location of the HMD 1 with respect to the smartphone 4 (self).

In a conventional HMD 1, the HMD 1 itself has calculated a location of self with respect to an environment. Therefore, the HMD 1 has been provided with a camera that images the environment and a processing unit that calculates a location by analyzing an imaged image of the environment. In the present technology, the location of the HMD 1 is calculated by the smartphone 4, so that the HMD 1 does not need to be provided with a camera or a processing unit. Therefore, a configuration of the HMD 1 can be simplified, and a size and a weight can be reduced.

Here, the smartphone 4 will be taken as an example for description, but the smartphone 4 only needs to have a function of specifying a location of the HMD 1, and to be a terminal having a camera that images an image and a processing unit that processes the imaged image. That is, although the description will be continued by taking the smartphone 4 as an example here, the present technology can be applied to a mobile terminal (an information processing apparatus) other than the smartphone.

Instead of the HMD 1, a mobile terminal such as an HMD 1A, which is a video-transmissive HMD shown in A of FIG. 2, or a smartphone 1B shown in B of FIG. 2 may be used as a display device for an AR content.

In a case of using the smartphone 1B instead of the HMD 1, the smartphone 4 to constitute the system shown in FIG. 1 may be a smartphone different from the smartphone 1B, or may be, as described above, a mobile terminal provided with a camera and a processing unit.

In a case of using the HMD 1A as a display device, a video image of an AR content reproduced by the information processing apparatus 2 is displayed to be superimposed on an image of a landscape in front of the HMD 1A imaged by the camera installed in the HMD 1A. In front of the eyes of the user wearing the HMD 1A, there is a display that displays an AR content superimposed on an image imaged by the camera.

Furthermore, in a case of using the smartphone 1B, a video image of an AR content reproduced by the information processing apparatus 2 is displayed to be superimposed on an image of a landscape in front of the smartphone 1B imaged by a camera installed on a back surface of the smartphone 1B. On a front surface of the smartphone 1B, a display that displays various images is provided.

As a display device for an AR content, a projector that projects a video image on a surface of an object existing in an actual scene may be used. Various devices such as a tablet terminal and a television receiver can be used as the display device for the AR content.

The display device and the information processing apparatus 2 may be connected by wire instead of being wirelessly connected via the network 3.

<Appearance Configuration of HMD>

Figure 3:
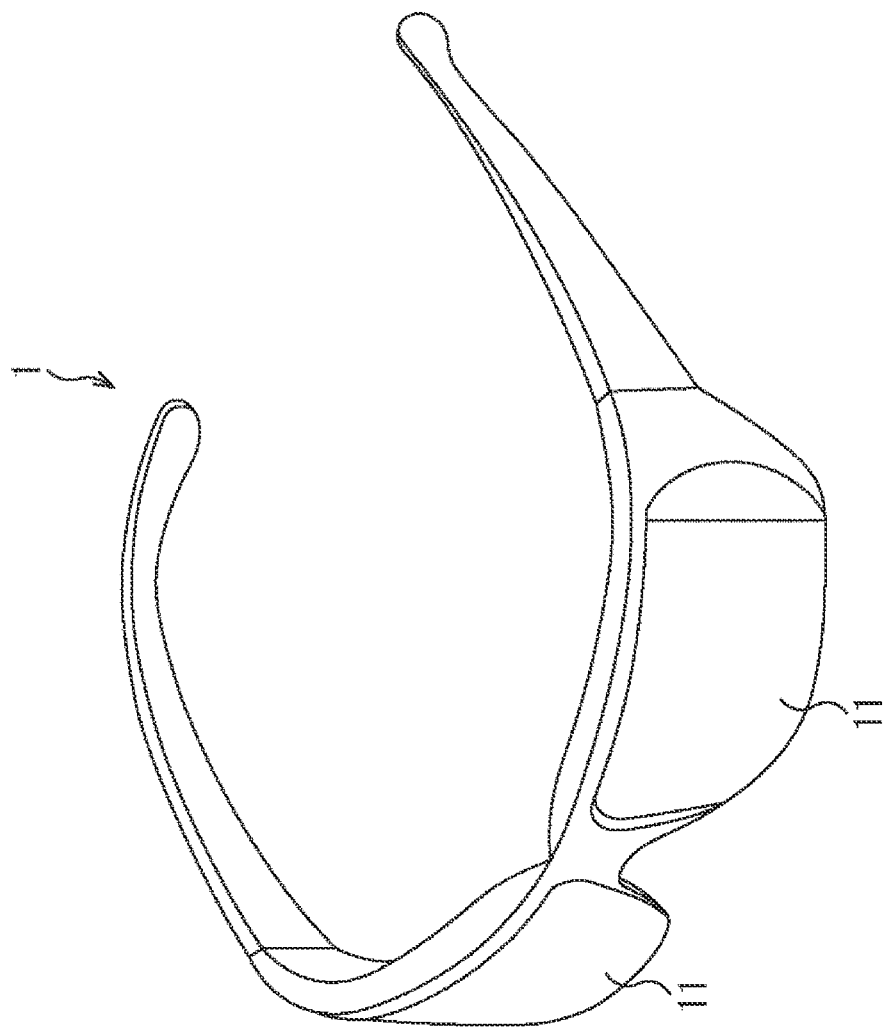
FIG. 3 is a view showing an appearance configuration of an HMD to which the technology according to the present disclosure is applied.

In the following description, as shown in FIG. 3, a wearable terminal having a form of a spectacle shape will be described as an example of an information processing apparatus to which the present technology is applied.

The HMD 1 shown in FIG. 3 has a form of a spectacle shape as a whole and includes a display unit 11.

The display unit 11 corresponds to a lens portion of spectacles, and for example, the entire display unit 11 is configured as a transmissive display. Therefore, the display unit 11 transmissively superimposes and displays an annotation (a virtual object) on an image (a real object) in the real world that the user is directly viewing.

Although not illustrated, a casing corresponding to a frame of the spectacles in the HMD 1 may be configured to accommodate or be mounted with various sensors, a button, a speaker, and the like.

Note that the shape of the HMD 1 is not limited to the shape shown in FIG. 3, and may take various shapes such as a hat shape, a belt shape that is fixed around the head of the user, and a helmet shape that covers the entire head of the user. Furthermore, the present technology described below can also be applied to a device such as a display of a contact lens type. That is, the technology according to the present disclosure can be applied to HMDs in general.

<Configuration Example of HMD as Information Processing Apparatus>

Figure 4:
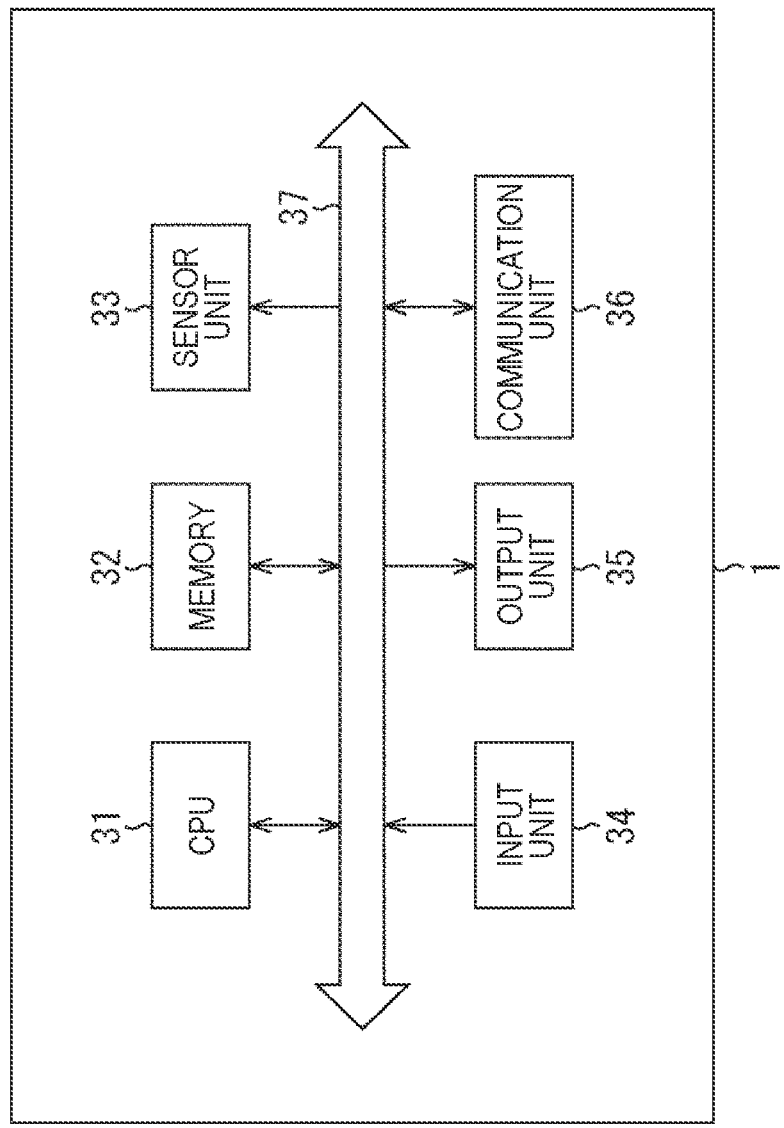
FIG. 4 is a block diagram showing a configuration example of an HMD as an information processing apparatus.

FIG. 4 is a block diagram showing a configuration example of the HMD 1 as an information processing apparatus.

The HMD 1 in FIG. 4 includes a central processor unit (CPU) 31, a memory 32, a sensor unit 33, an input unit 34, an output unit 35, and a communication unit 36. These are connected with each other via a bus 37.

The CPU 31 executes processing for implementing various functions of the HMD 1 in accordance with a program and data stored in the memory 32.

The memory 32 includes a storage medium such as a semiconductor memory or a hard disk, and stores a program and data for processing by the CPU 31.

The sensor unit 33 includes various sensors such as a microphone, a gyro sensor, and an acceleration sensor. Various sensor information acquired by the sensor unit 33 is also used for processing by the CPU 31. Note that the present technology can be applied even to an HMD 1 that does not have the sensor unit 33.

The input unit 34 includes buttons, keys, a touch panel, and the like. The output unit 35 includes the display unit 11 in FIG. 3, a speaker, and the like. The communication unit 36 is configured as a communication interface that mediates various types of communication.

First Embodiment

Figure 5:
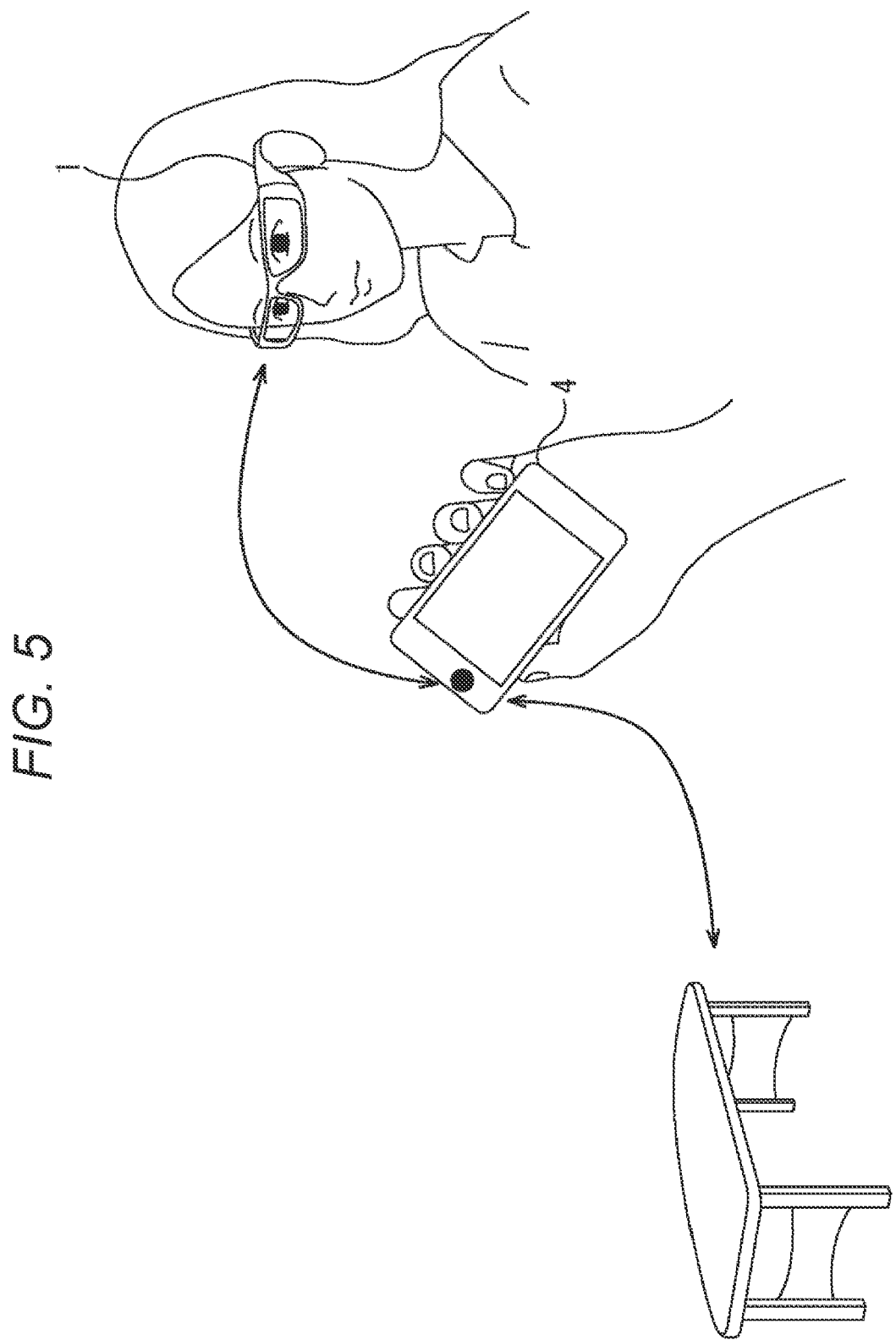
FIG. 5 is a view showing an image when the system is used.

A first embodiment will be described. As shown in FIG. 5, a case will be described as an example in which the smartphone 4 is held by a user and an environment and the HMD 1 are imaged by the smartphone 4.

The smartphone 4 includes two cameras, an outer camera 101 and an inner camera 103, as described with reference to FIG. 6. The outer camera 101 of the smartphone 4 images an environment, and the inner camera 103 images the HMD 1. The HMD 1 is worn by the user.

The smartphone 4 specifies a location of the smartphone 4 with respect to an environment and a location of the HMD 1 with respect to the smartphone 4, and uses information regarding the two specified locations to specify the location of the HMD 1 with respect to the environment. Configurations of the smartphone 4 and the HMD 1 when such processing is performed will be described.

Configuration Example of Smartphone in First Embodiment

Figure 6:
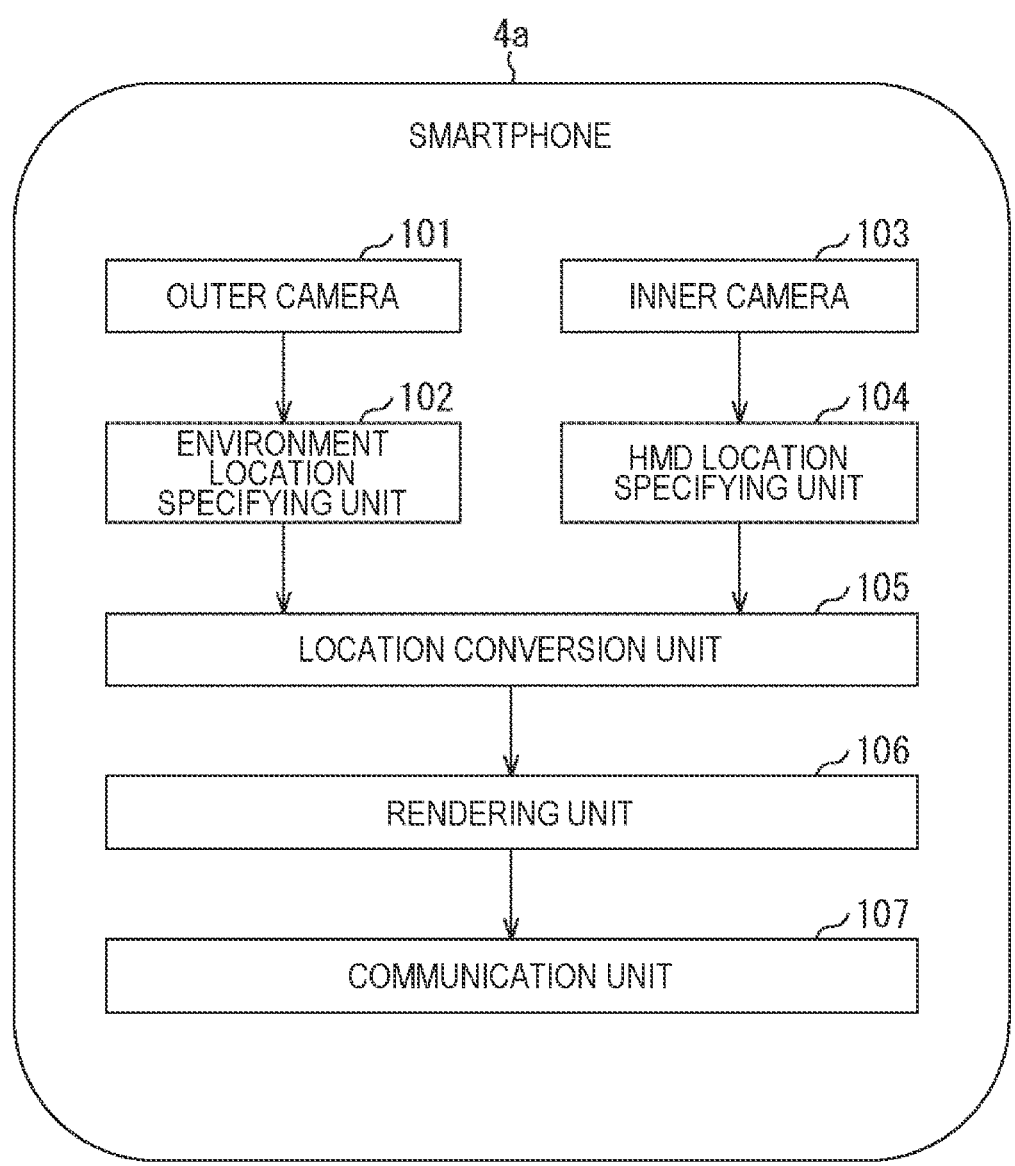
FIG. 6 is a diagram showing a configuration example of a smartphone in a first embodiment.

FIG. 6 is a diagram showing a configuration example of the smartphone 4 (referred to as a smartphone 4a) in the first embodiment. The smartphone 4a includes an outer camera 101, an environment location specifying unit 102, an inner camera 103, an HMD location specifying unit 104, a location conversion unit 105, a rendering unit 106, and a communication unit 107.

Note that, in the following description, functions necessary for the description are illustrated, and other functions are not illustrated. For example, while the smartphone 4 has a display that displays texts and images, a telephone function, and the like, these functions are not illustrated but are provided. This similarly applies to other devices.

The outer camera 101 and the inner camera 103 are individually provided on different surfaces of the smartphone 4a. For example, the inner camera 103 is provided on a surface same as a surface on which the display of the smartphone 4a is provided, while the outer camera 101 is provided on a surface on a back surface side of the surface on which the display is provided.

The description is continued assuming that the outer camera 101 images an environment and the inner camera 103 images the HMD 1, but the outer camera 101 may image the HMD 1 and the inner camera 103 may image the environment. Note that, the environment here is a space in which the user is located. For example, in the example shown in FIG. 5, the user is located in a space where a desk is located, and the outer camera 101 is imaging the environment where the desk is located.

The environment location specifying unit 102 specifies a location and a position of the smartphone 4*a* with respect to the environment. For example, with an origin at a predetermined location in the environment, a location (coordinates) of the smartphone 4*a* and a position of the smartphone 4*a* with respect to the origin are specified. A way of the specification will be described later with reference to FIGS. 9 and 10.

The coordinates handled by the smartphone 4*a* and the HMD 1 include world coordinates and local coordinates. The world coordinates and the local coordinates will be briefly described with reference to FIG. 7. A three-dimensional coordinate system includes a left-handed coordinate system and a right-handed coordinate system. In FIG. 7 and the following description, the right-handed coordinate system will be used as an example. Furthermore, here, a coordinate system such as the world coordinates and the local coordinates will be used as an example for description, but it is also possible to implement the present technology by using other coordinate systems such as a coordinate system expressed by an azimuth, an angle, and a distance.

A of FIG. 7 is a view for explaining the world coordinates, and B of FIG. 7 is a view for explaining the local coordinates.

With reference to A of FIG. 7, the world coordinates are coordinates that represent the world itself in three-dimensional space. In the case of the HMD 1, the world coordinates are coordinates based on the real world. The coordinates specified in the world coordinates are coordinates that do not move. The world coordinates may also be referred to as global coordinates, absolute coordinates, and the like. The world coordinates are a coordinate system whose origin is a common reference point between an object and a camera. In the following description, coordinate axes in the world coordinates are represented as an X-axis, a Y-axis, and a Z-axis, two axes of a surface parallel to a bottom surface in a three-dimensional space are represented as the X axis and the Z axis, and an axis in a direction perpendicular to the surface is represented as the Y axis.

For example, to an object 91 in the three-dimensional space shown in A of FIG. 7, for example, (X1, Y1, Z1) as coordinates in the world coordinates are assigned.

With reference to B of FIG. 7, the local coordinates are coordinates based on an object arranged in a three-dimensional space, and are coordinates individually given to the object. For example, in a case where a plurality of objects is arranged in the three-dimensional space, the local coordinates exist for the plurality of objects. The local coordinates can be coordinates with a center of the object as an origin. In the following description, coordinate axes in the local coordinates are represented as an x-axis, a y-axis, and a z-axis, two axes of a surface parallel to a bottom surface in the three-dimensional space are represented as the x-axis and z-axis, and a direction perpendicular to the surface is represented as the y-axis.

For example, in the local coordinates, a coordinate system with a central portion of the object 91 as the origin (0, 0, 0) is obtained.

In the following description, the description is continued with, as an example, a case of the world coordinates while being simply described to as coordinates, but the present technology can also be applied in a case where the local coordinates are used.

The description is returned to the configuration of the smartphone 4*a* shown in FIG. 6. The HMD location specifying unit 104 specifies a location and a position of the HMD 1*a* with respect to the smartphone 4*a*. For example, with an origin at a predetermined location of the smartphone 4*a*, a location (coordinates) and a position of the HMD 1 with respect to the origin are specified.

The location conversion unit 105 functions as a generation unit configured to use location data from the environment location specifying unit 102 and location data from the HMD location specifying unit 104 to specify a location and a position of the HMD 1*a* with respect to the environment, and generate location data. The generated location data is supplied to the rendering unit 106.

Note that, in the following description, while being simply described as location data, the location data includes data for specifying a location and a position. Furthermore, for example, while a description is given such as specifying a location of the HMD 1*a* with respect to the environment, this description includes specification of a location and specification of a position.

The rendering unit 106 generates image data associated with a location of a real object or a virtual object, on the basis of a locational relationship between a display region of the display unit 11 of the HMD 1 and the real object or the virtual object arranged in a three-dimensional space, and on the basis of user operation information (hereinafter, also simply referred to as operation information) that represents a user's operation. The three-dimensional space referred to here can be a real space or a virtual space.

A configuration may be adopted in which data of the virtual object is supplied from the information processing apparatus 2 (FIG. 1). In a case of such a configuration, the communication unit 107 receives the data of the virtual object from the information processing apparatus 2 and supplies to the rendering unit 106.

The rendering unit 106 uses location data regarding a location and a position of the HMD 1*a* with respect to the environment, to specify information regarding a distance and the like between the user and the object, and a location of the user's head and a direction in which the user's head is facing (a direction in which the user is looking). Furthermore, the rendering unit 106 generates image data regarding an object in a display region of a display unit 11 of the HMD 1*a*, and outputs to the communication unit 107.

The communication unit 107 transmits the image data to the HMD 1*a*.

Configuration Example of HMD in First Embodiment

Figure 8:
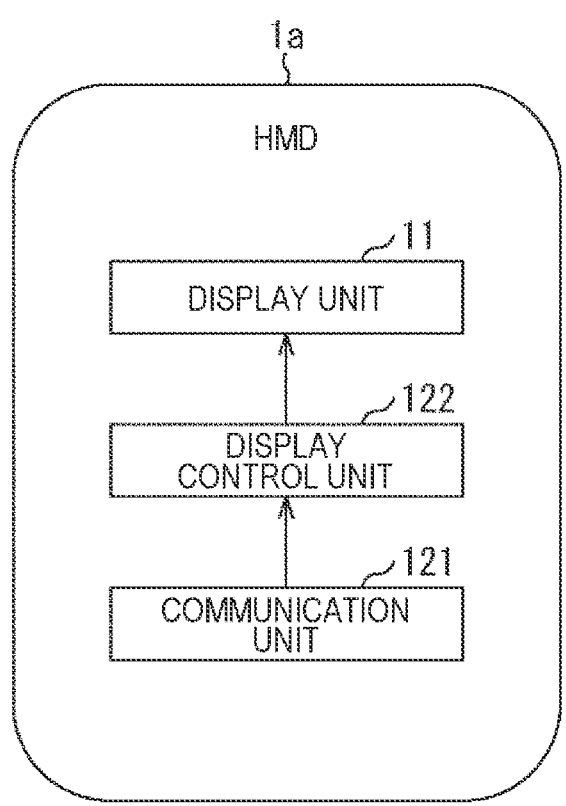
FIG. 8 is a diagram showing a configuration example of an HMD in the first embodiment.

FIG. 8 is a diagram showing a configuration example of the HMD 1 (referred to as the HMD 1*a*) in the first embodiment. The HMD 1*a* includes a communication unit 121, a display control unit 122, and the display unit 11.

The communication unit 121 receives image data transmitted from the communication unit 107 of the smartphone 4*a*. The received image data is supplied to the display control unit 122. The display control unit 122 controls the display unit 11 so that an image based on the image data is displayed on the display unit 11.

<Specification of Location of Smartphone and HMD>

Figure 9:
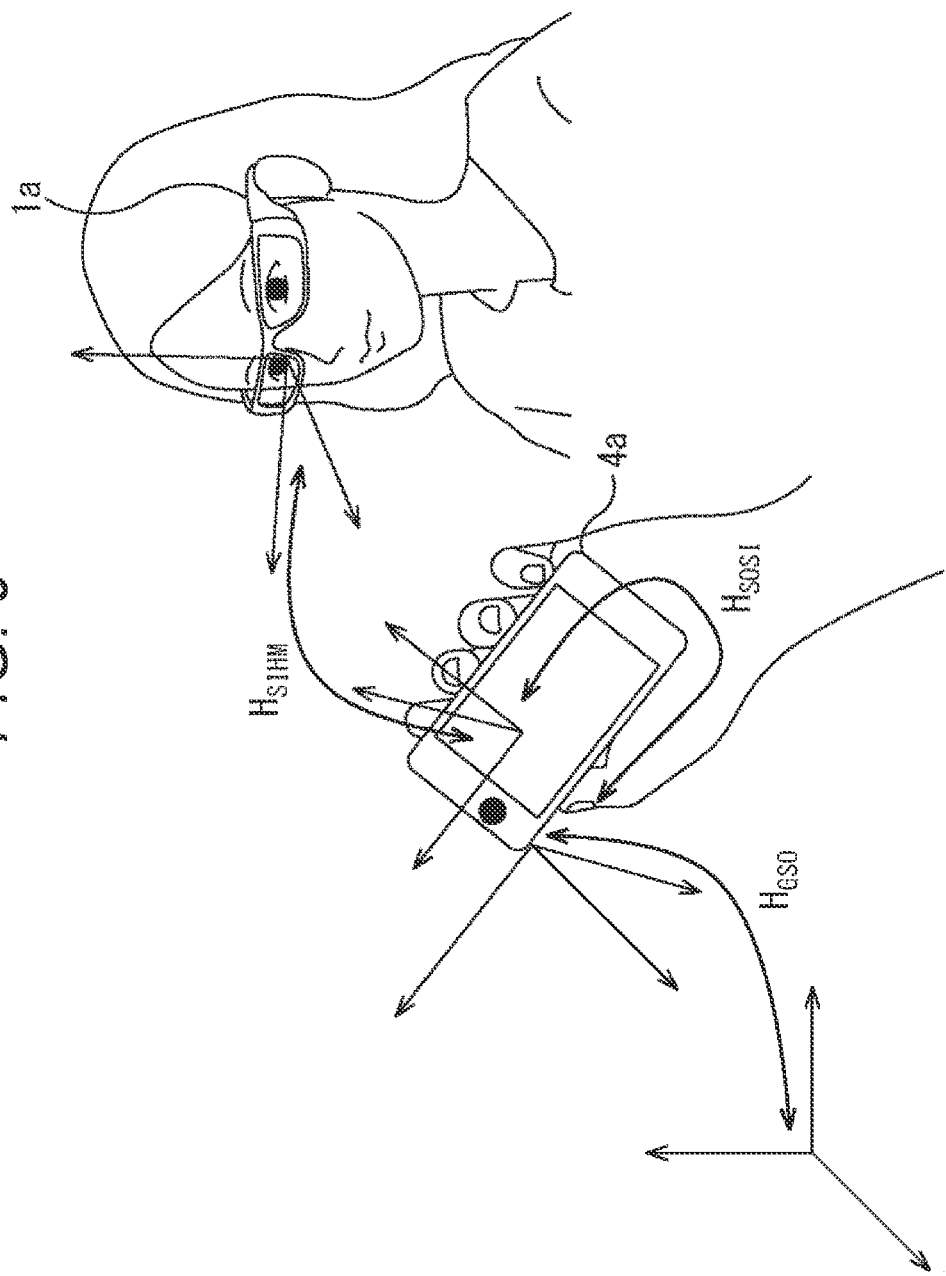
FIG. 9 is a view for explaining coordinate transformation.

With reference to FIG. 9, specification of locations of the smartphones 4*a* and the HMD 1*a* will be described. The smartphone 4*a* specifies a location HGSO of the outer camera 101 of the smartphone 4*a* with respect to the environment. G of the location HGSO represents an origin that is set in the environment, and SO represents the outer camera 101 of the smartphone 4*a*.

The smartphone 4*a* specifies a location HSOSI of the inner camera 103 with respect to the outer camera 101 of the smartphone 4*a*. SI of the location HSOSI represents the inner camera 103 of the smartphone 4*a*. Furthermore, the smartphone 4*a* specifies a location HSIHM of the HMD 1*a* with respect to the inner camera 103 of the smartphone 4*a*. HM of the location HSOSI represents the HMD 1*a*.

By using the location HGSO of the outer camera 101 of the smartphone 4*a* with respect to the environment, the location HSOSI of the inner camera 103 with respect to the outer camera 101, and the location HSIHM of the HMD 1*a* with respect to the inner camera 103, specifically, by multiplying individual locations as expressed in the following Equation (1), a location HGHM of the HMD 1*a* with respect to the environment is calculated.

location HGHM=location HGSO×location HSOSI× location HSIHM (1)

H of the location HGSO, the location HSOSI, the location HSIHM, and the location HSIHM represents an H matrix. The H matrix is a simultaneous transformation matrix (homogeneous transformation matrix), which is a matrix expressing translation and rotation in one matrix, and is used here as a matrix for performing coordinate transformation.

Note that, in a case where the H row example is used, and exchange such as communication or the like is involved, calculation may be performed using a translational component (XYZ) and a rotation component (Quaternion). Furthermore, here, the description will be continued with the H row example as an example, but it is possible to appropriately use a calculation and conversion method suitable for a situation.

Equation (2) is a translational matrix t, and Equation (3) is a rotation row example R.

[Formula 1]

$$t = \begin{bmatrix} x \\ y \\ z \end{bmatrix} \quad (2)$$

[Formula 2]

$$R = RxRyRz \quad (3)$$

Individual elements Rx, Ry, and Rz of the matrix R is expressed by Equation (4).

[Formula 3]

$$R_x = \begin{bmatrix} 1 & 0 & 0 \\ 0 & \cos\theta & -\sin\theta \\ 0 & \sin\theta & \cos\theta \end{bmatrix} \quad (4)$$

$$R_y = \begin{bmatrix} \cos\theta & 0 & \sin\theta \\ 0 & 1 & 0 \\ -\sin\theta & 0 & \cos\theta \end{bmatrix}$$

$$R_z = \begin{bmatrix} \cos\theta & -\sin\theta & 0 \\ \sin\theta & \cos\theta & 0 \\ 0 & 0 & 1 \end{bmatrix}$$

Using the matrix t and the matrix R allows the matrix H to be expressed by the following Equation (5).

[Formula 4]

$$H = \begin{bmatrix} R & t \\ 0 & 1 \end{bmatrix} \quad (5)$$

In this way, when the origin is set at a predetermined location in the environment, the coordinates of the HMD 1*a* with respect to the origin can be obtained. On the basis of the location of the HMD 1*a* with respect to the environment obtained in this way, arrangement of a virtual object is determined, and image data of an image including the virtual object is generated by the rendering unit 106 of the smartphone 4*a*.

Note that, here, a description is given in which the location HSOSI of the inner camera 103 with respect to the outer camera 101 of the smartphone 4*a* is specified, and multiplied when the location of the HMD 1*a* with respect to the environment is calculated as shown in Equation (1), a configuration may also be adopted in which the term of location HSOSI is not multiplied.

For example, when the outer camera 101 and the inner camera 103 are arranged at locations close to each other and a value of the location HSOSI becomes small, when high accuracy is not required for the location accuracy of the HMD 1*a* with respect to the environment, and the like, it is also possible to omit the term of the location HSOSI.

Figure 10:
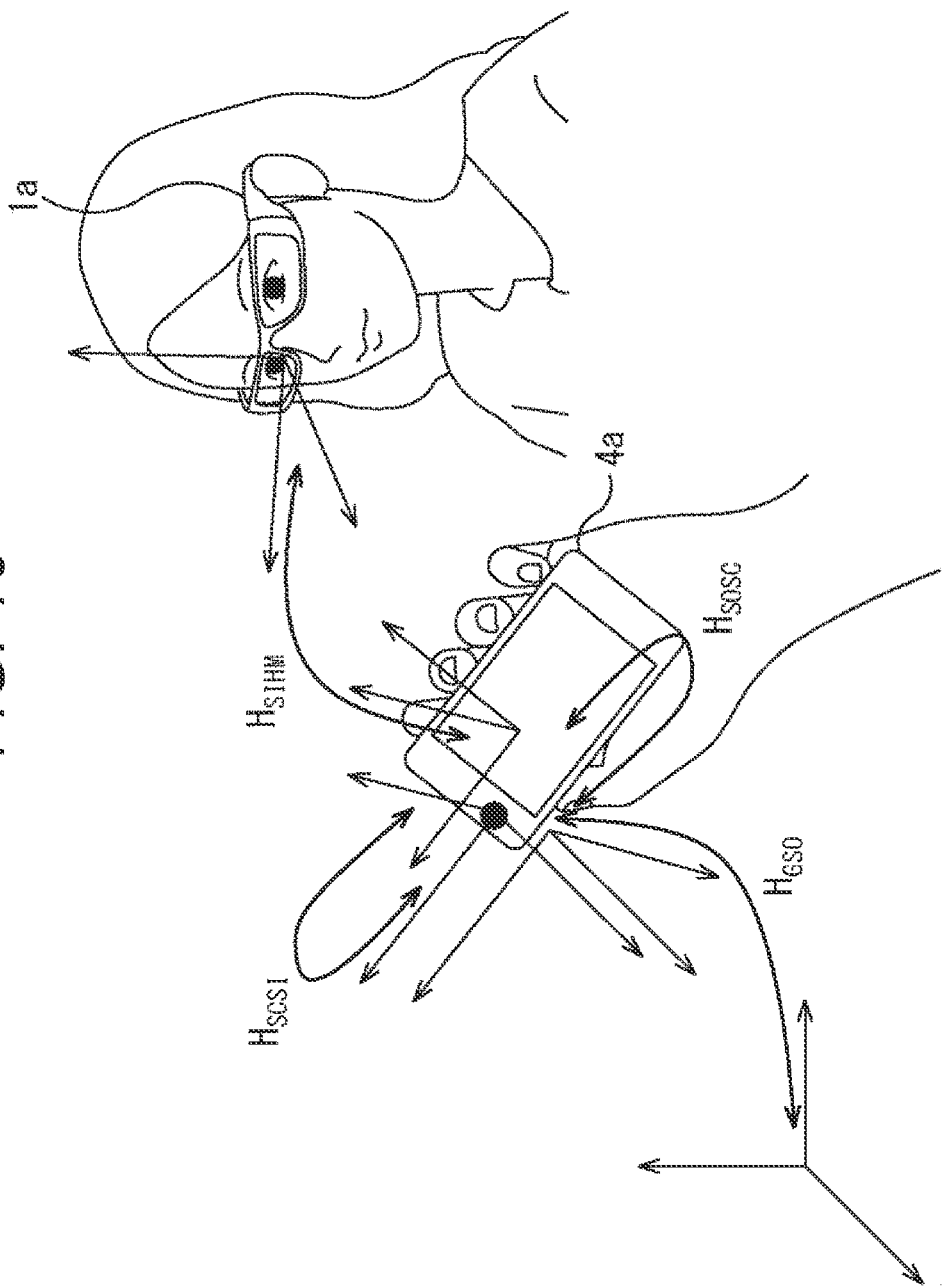
FIG. 10 is a view for explaining another coordinate transformation.

Other ways of specifying the location of the HMD 1*a* with respect to the environment are described with reference to FIG. 10. A specific method described with reference to FIG. 10 is to set a predetermined location of the smartphone 4*a* as a virtual origin, and specify each location by using the virtual origin of the smartphone 4*a*. The virtual origin can be, for example, a center of the smartphone 4*a*. Furthermore, the virtual origin is different from the origin in the world coordinates, which is the origin in the environment.

In this case as well, similarly to the case shown in FIG. 9, the location HGSO of the outer camera 101 of the smartphone 4*a* with respect to the environment and the location HSIHM of the HMD 1*a* with respect to the inner camera 103 of the smartphone 4*a* are obtained.

Furthermore, in a case where a virtual origin (described as an origin SC) is set in the smartphone 4*a*, a location HSOSC of the origin SC with respect to the outer camera 101 and a location HSCSI of the inner camera 103 with respect to the origin SC are also obtained.

By using the location HGSO of the outer camera 101 of the smartphone 4*a* with respect to the environment, the location HSOSC of the origin SC with respect to the outer camera 101, the location HSCSI of the inner camera 103 with respect to the origin SC, and the location HSIHM of the HMD 1*a* with respect to the inner camera 103, specifically, by multiplying individual locations as expressed in the following Equation (6), the location HGHM of the HMD 1*a* with respect to the environment is calculated.

location HGHM=location HGSO×location HSOSC× location HSCSI×location HSIHM (6)

In this way, a virtual origin is set in the smartphone 4*a*, coordinate transformation is performed using the virtual origin, and coordinates of the HMD 1*a* with respect to an origin when a predetermined location in the environment is set as the origin are obtained. On the basis of the location of the HMD 1*a* with respect to the environment obtained in this way, arrangement of a virtual object is determined, and image data of an image including the virtual object is generated by the rendering unit 106 of the smartphone 4*a*.

Processing of Smartphone in First Embodiment

With reference to a flowchart shown in FIG. 11, processing of the smartphone 4a (FIG. 6) in the first embodiment will be described.

In step S101, a location and a position of the smartphone 4a with respect to the environment are calculated. By using an image imaged by the outer camera 101 (FIG. 6) of the smartphone 4a, the environment location specifying unit 102 (FIG. 6) obtains a location of the outer camera 101 with respect to the environment, that is, the location HGSO described with reference to FIGS. 9 and 10.

Note that, for capturing of an external environment, self-location estimation processing (simultaneously localization and mapping (SLAM)) may be adopted to use a 3D map obtained by SLAM, or the capturing is made by recognizing a target to be a landmark and performing processing based on the landmark. Furthermore, as location data, information obtained from global positioning system (GPS) may be used.

Note that the description will be given assuming that the location data is acquired by imaging with the outer camera 101 and the inner camera 103, and analyzing the image obtained by the imaging, but the present technology can be applied as long as information regarding a location and a position can be acquired. For example, the outer camera 101 and the inner camera 103 may be a monocular camera or a stereo camera. Furthermore, it is also possible to use a camera that performs distance measurement, such as a depth camera or a time of flight (ToF) camera. Furthermore, the location and the position may be measured by sound wave measurement. In a case of distance measurement, location data is generated by detecting a plurality of points.

In step S102, a location and a position of the HMD 1a with respect to the smartphone 4a are calculated. By using an image imaged by the inner camera 103 (FIG. 6) of the smartphone 4a, the HMD location specifying unit 104 (FIG. 6) obtains a location of the HMD 1a with respect to the inner camera 103 of the smartphone 4a, that is, the location HSIHM described with reference to FIGS. 9 and 10.

In step S103, the location conversion unit 105 calculates a location and a position of the HMD 1a with respect to the environment. The location conversion unit 105 is supplied with the location HGSO of the smartphone 4a with respect to the environment from the environment location specifying unit 102, and supplied with the location HSIHM of the MD 1a with respect to the smartphone 4a from the HMD location specifying unit 104. The location conversion unit 105 calculates the location HGHM of the HMD 1a with respect to the environment by using these pieces of location data.

In a case of calculating the location HGHM of the HMD 1a with respect to the environment as described with reference to FIG. 9, the location conversion unit 105 calculates the location HGHM on the basis of Equation (1) described above. Equation (1) is described again.

$$\text{location HGHM} = \text{location HGSO} \times \text{location HSOSI} \times \text{location HSIHM} \quad (1)$$

In Equation (1), while the location HSOSI of the inner camera 103 with respect to the outer camera 101 is multiplied, this location HSOSI may be calculated by the location conversion unit 105, or a value (matrix) calculated in advance may be used. Since the outer camera 101 and the inner camera 103 are fixed to the smartphone 4a, the location HSOSI of the inner camera 103 with respect to the outer camera 101 can be calculated in advance.

In a case of calculating the location HGHM of the HMD 1a with respect to the environment as described with reference to FIG. 10, the location conversion unit 105 calculates the location HGHM on the basis of Equation (6) described above. Equation (6) is described again.

$$\text{location HGHM} = \text{location HGSO} \times \text{location HSOSC} \times \text{location HSCSI} \times \text{location HSIHM} \quad (6)$$

In Equation (6), the location HSOSC of the virtual origin SC set in the smartphone 4a with respect to the outer camera 101, and the location HSCSI of the inner camera 130 with respect to the virtual origin SC are multiplied. The location HSOSC and the location HSCSI may be calculated by the location conversion unit 105, or a value (matrix) calculated in advance may be used.

Since the outer camera 101 and the inner camera 103 are fixed to the smartphone 4a, and further, since the virtual origin SC can be set in advance, for example, at a center of the display or the like, the location HSOSC for the virtual origin SC set in the smartphone 4a with respect to the outer camera 101 and the location HSCSI of the inner camera 130 with respect to the virtual origin SC can be individually calculated in advance.

Furthermore, location HGSO×location HSOSC may be calculated by the environment location specifying unit 102, location HSCSI×location HSIHM may be calculated by the HMD location specifying unit 104, and those values (matrix) may be supplied to the location conversion unit 105.

A value calculated by computing location HGSO×location HSOSC is the location of the virtual origin SC that is set in the smartphone 4a with respect to the environment. The environment location specifying unit 102 can also be configured to calculate the location of the virtual origin SC that is set in the smartphone 4a with respect to the environment.

Similarly, a value calculated by computing location HSCSI×location HSIHM is the location of the HMD 1a with respect to the virtual origin SC that is set in the smartphone 4a. The HMD location specifying unit 104 can also be configured to calculate the location of the HMD 1a with respect to the virtual origin SC that is set in the smartphone 4a.

Then, the location conversion unit 105 can also be configured to calculate the location of the HMD 1a with respect to the environment by multiplying values individually supplied from the environment location specifying unit 102 and the HMD location specifying unit 104.

For the first embodiment and embodiments described below, it is also possible to apply the one described with reference to FIG. 9 in which the location of the HMD 1a with respect to the environment is obtained, and it is also possible to apply the one described with reference to FIG. 10 in which the location of the HMD 1a with respect to the environment is obtained.

Figure 11:
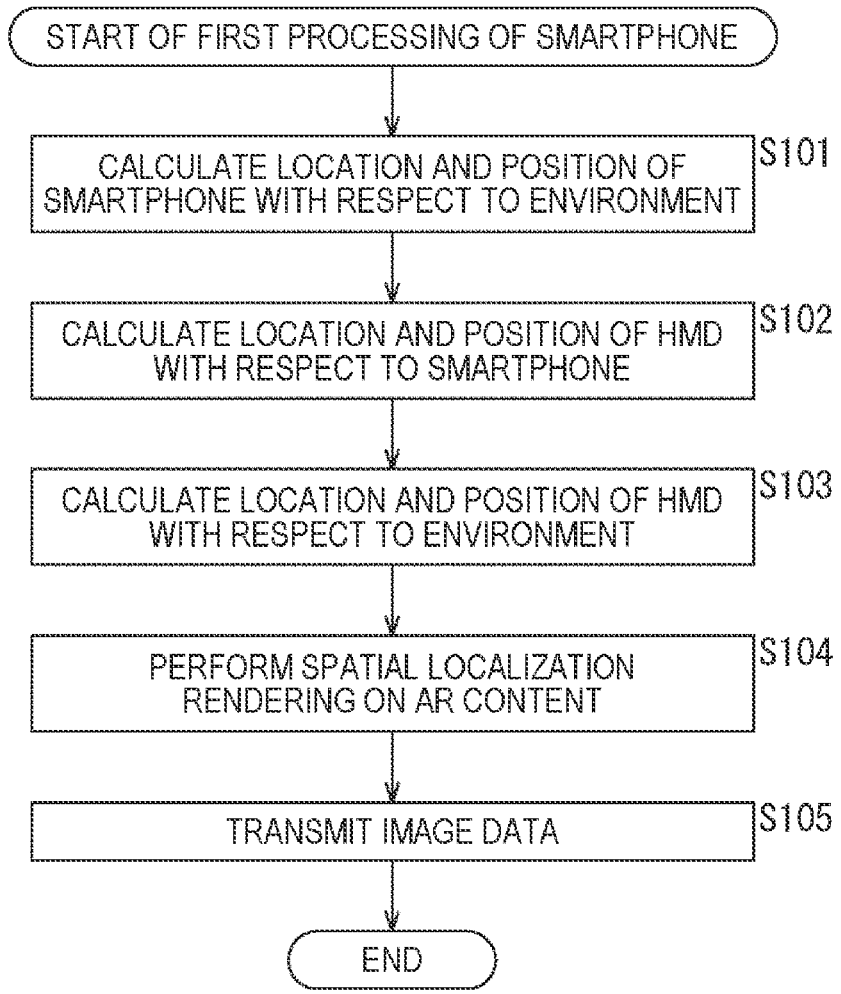
FIG. 11 is a flowchart for explaining processing of the smartphone in the first embodiment.

Returning to the description of the flowchart shown in FIG. 11, when the location conversion unit 105 obtains the location of the HMD 1a with respect to the environment in step 3103, the location data is supplied to the rendering unit 106.

In step S104, the rendering unit 106 uses the supplied location data, and uses, for example, data of the virtual object supplied from the information processing apparatus 2 to perform spatial localization rendering on an AR content, and generates rendered image data.

In step S105, the communication unit 107 transmits the image data generated by the rendering unit 106 to the HMD 1a.

Processing of HMD in First Embodiment

Figure 12:
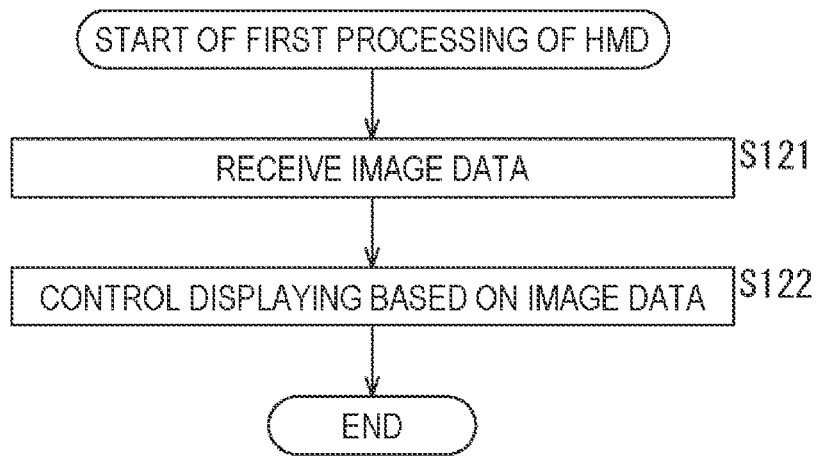
FIG. 12 is a flowchart for explaining processing of the HMD in the first embodiment.

With reference to a flowchart shown in FIG. 12, processing of the HMD 1a (FIG. 8) in the first embodiment will be described.

In step S121, the communication unit 121 of the HMD 1a receives image data transmitted from the communication unit 107 of the smartphone 4a. In step S122, the display control unit 122 controls displaying of the display unit 11 so that an image based on the image data received by the communication unit 121 is displayed on the display unit 11.

In this way, the HMD 1a receives and processes the image data from the smartphone 4a. Therefore, the HMD 1a only needs to have a function of receiving and processing image data from the smartphone 4a, and can allow the user to experience AR and VR even without having the outer camera and the inner camera that have been provided in the conventional HMD 1, for example. That is, according to the present technology, the configuration of the HMD 1a can be simplified, and it is possible to reduce a size and a weight by being able to be simplified.

Second Embodiment

In the first embodiment, a location of the HMD 1a is specified by the smartphone 4a, and image data corresponding to the location is generated and transmitted to the HMD 1a. That is, in the first embodiment, image data is exchanged between the smartphone 4a and the HMD 1a. The smartphone 4a and the HMD 1a need to secure a communication band for transmitting and receiving image data without delay, and to have a processing capacity for transmitting and receiving.

As a second embodiment, a description is given to an information processing system that allows a user to experience AR and VR similarly to the first embodiment even if a communication band between the smartphone 4a and the HMD 1a is small.

Configuration Example of Smartphone in Second Embodiment

Figure 13:
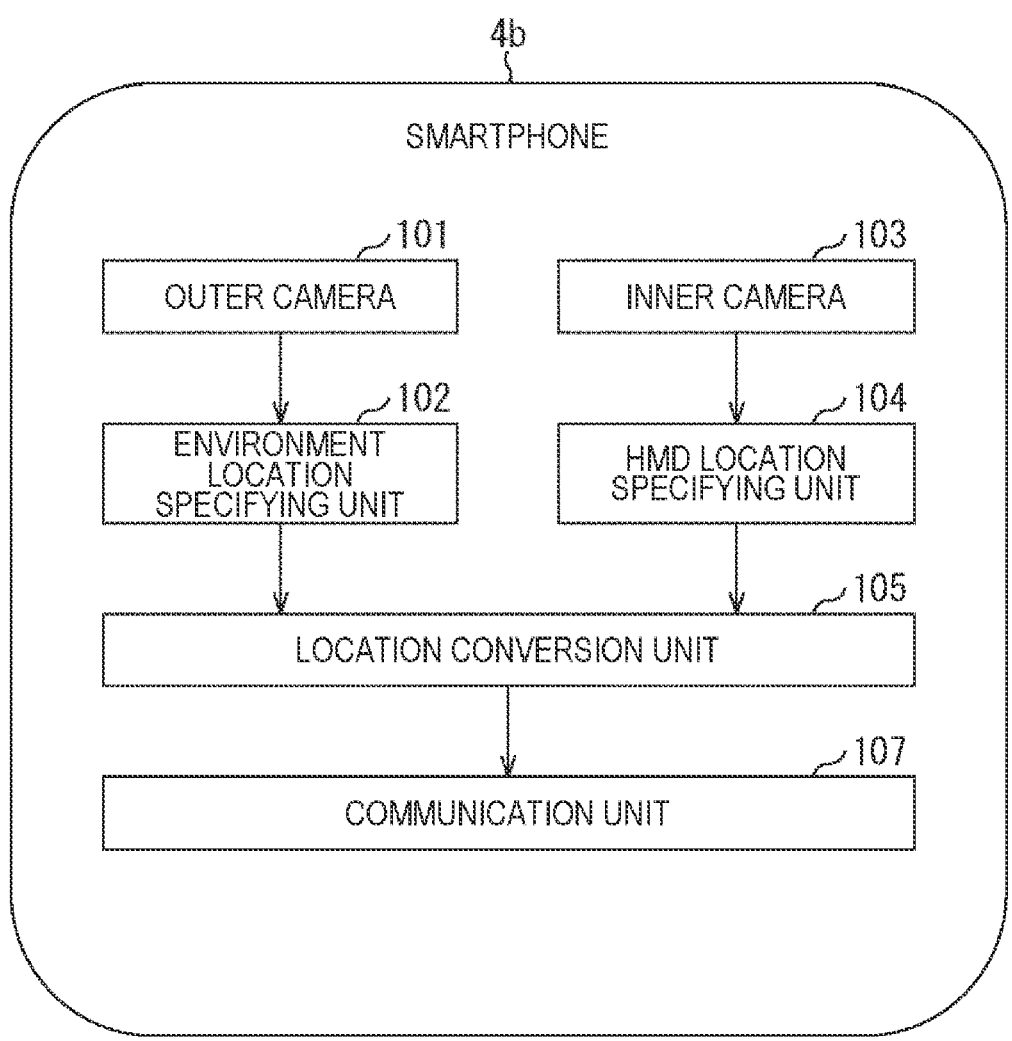
FIG. 13 is a diagram showing a configuration example of a smartphone in a second embodiment.

FIG. 13 is a diagram showing a configuration example of a smartphone 4b in the second embodiment. The smartphone 4b in the second embodiment is the same as that of the smartphone 4a in the first embodiment in that a location of an HMD 1b (FIG. 14) with respect to an environment is calculated, but different in that image data is not generated and location data is transmitted.

In the following description, the same portions as the smartphone 4a in the first embodiment are designated by the same reference numerals, and the description thereof will be omitted as appropriate. Similarly, in the following description, the same portions as the HMD 1a in the first embodiment are designated by the same reference numerals, and the description thereof will be omitted as appropriate.

Since a configuration is adopted in which image data is not generated, the smartphone 4b in the second embodiment has a configuration in which the rendering unit 106 is deleted from the configuration of the smartphone 4a (FIG. 6) in the first embodiment. In the smartphone 4b shown in FIG. 13, location data regarding a location of the HMD 1b (FIG. 14) with respect to an environment calculated by a location conversion unit 105 is supplied to a communication unit 107. Then, the communication unit 107 transmits the location data to the HMD 1b.

Since the location data has a smaller amount of data than image data, data transmitted from the communication unit 107 can be made smaller than that in a case of the first embodiment.

Configuration Example of HMD in Second Embodiment

Figure 14:
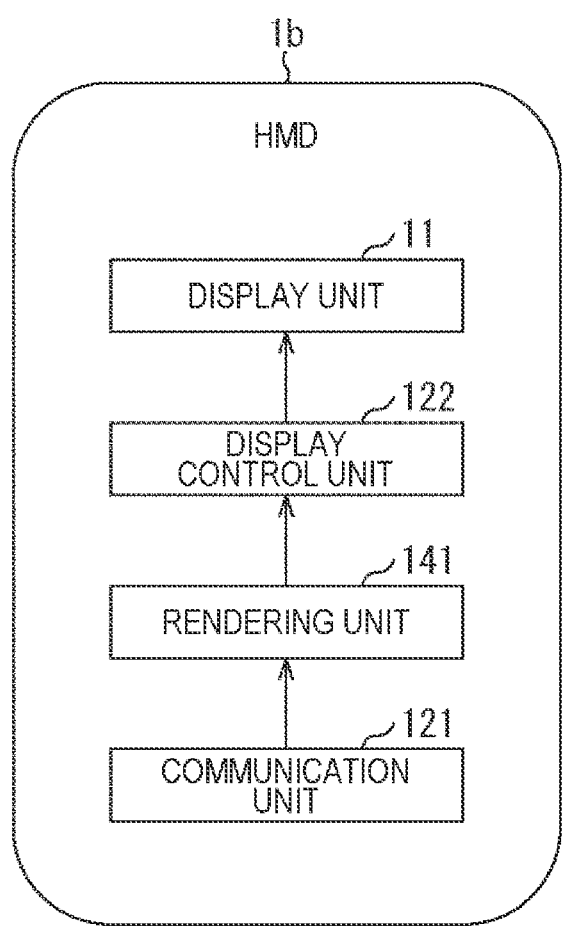
FIG. 14 is a diagram showing a configuration example of an HMD in the second embodiment.

FIG. 14 is a diagram showing a configuration example of the HMD 1b in the second embodiment. The HMD 1b in the second embodiment is different from the HMD 1a (FIG. 8) in the first embodiment in that location data regarding a location of the HMD 1b with respect to the environment is received from the smartphone 4b and processed.

The HMD 1b in the second embodiment receives location data from the smartphone 4b, performs rendering by using the location data, and generates and processes image data. The processing of performing rendering and generating the image data is the processing that has been executed by the rendering unit 106 (FIG. 6) of the smartphone 4a in the first embodiment.

As shown in FIG. 14, the HMD 1b in the second embodiment includes a rendering unit 141 corresponding to the rendering unit 106 of the smartphone 4a in the first embodiment. The rendering unit 141 performs rendering by using location data received by a communication unit 121, generates image data, and supplies to a display control unit 122.

In this way, with the configuration in which the location data having a smaller amount of data than the image data is exchanged between the smartphone 4b and the HMD 1b, a communication band between smartphone 4b and the HMD 1b can be made smaller than at least the communication band between the smartphone 4a and the HMD 1a in the first embodiment.

Processing of Smartphone in Second Embodiment

Figure 15:
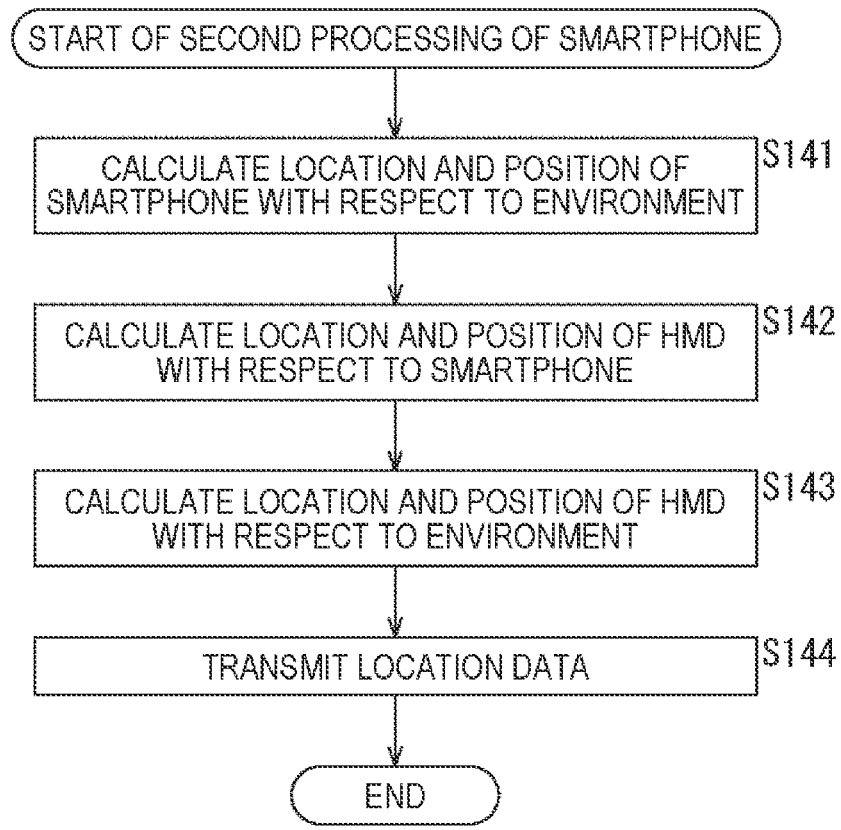
FIG. 15 is a flowchart for explaining processing of the smartphone in the second embodiment.

With reference to a flowchart shown in FIG. 15, processing of the smartphone 4b (FIG. 13) in the second embodiment will be described.

Since steps S141 to S143 are the same as steps S101 to S103 (FIG. 11) in the first embodiment, the description thereof will be omitted. Location data generated in step S143 by the location conversion unit 105 is transmitted to the HMD 1b by the communication unit 107 in step S144.

Processing of HMD in Second Embodiment

Figure 16:
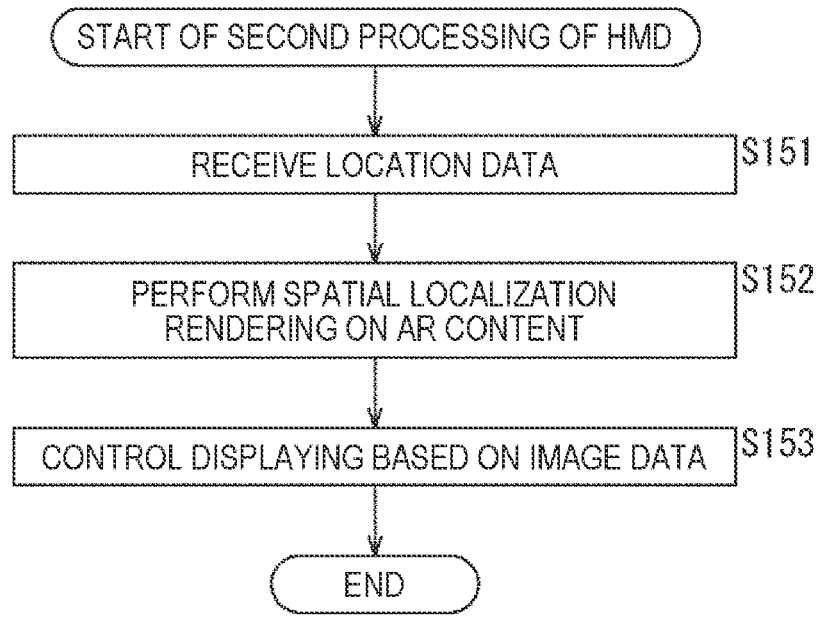
FIG. 16 is a flowchart for explaining processing of the HMD in the second embodiment.

With reference to a flowchart shown in FIG. 16, processing of the HMD 1b (FIG. 14) in the second embodiment will be described.

In step S151, the communication unit 121 of the HMD 1b receives location data transmitted from the communication unit 107 of the smartphone 4b.

In step S152, the rendering unit 141 uses the location data supplied via the communication unit 121, and further, for example, uses AR content data supplied from the information processing apparatus 2, to perform spatial localization rendering on the AR content, and generates rendered image data. Communication with the information processing apparatus 2 is performed by the communication unit 121.

In step S153, the display control unit 122 controls displaying of a display unit 11 so that an image based on the image data generated by the rendering unit 141 is displayed on the display unit 11.

In this way, the HMD 1a only needs to have a function of receiving location data from the smartphone 4a and using the location data and image data to generate image data of an image to be presented to the user, and can allow the user to experience AR and VR even without having the outer camera and the inner camera that have been provided in the conventional HMD 1, for example. That is, according to the present technology, the configuration of the HMD 1a can be simplified, and it is possible to reduce a size and a weight by being able to be simplified.

Third Embodiment

As a third embodiment, an embodiment will be described in which environment (real space) information is also collected, and processing is performed by using the collected environment information. The environment information is, for example, a shape or an object of the environment. In a case where processing is performed by using the collected environment information, for example, it becomes possible to detect a desk as an object of the environment and display a virtual character on the desk.

Configuration Example of Smartphone in Third Embodiment

Figure 17:
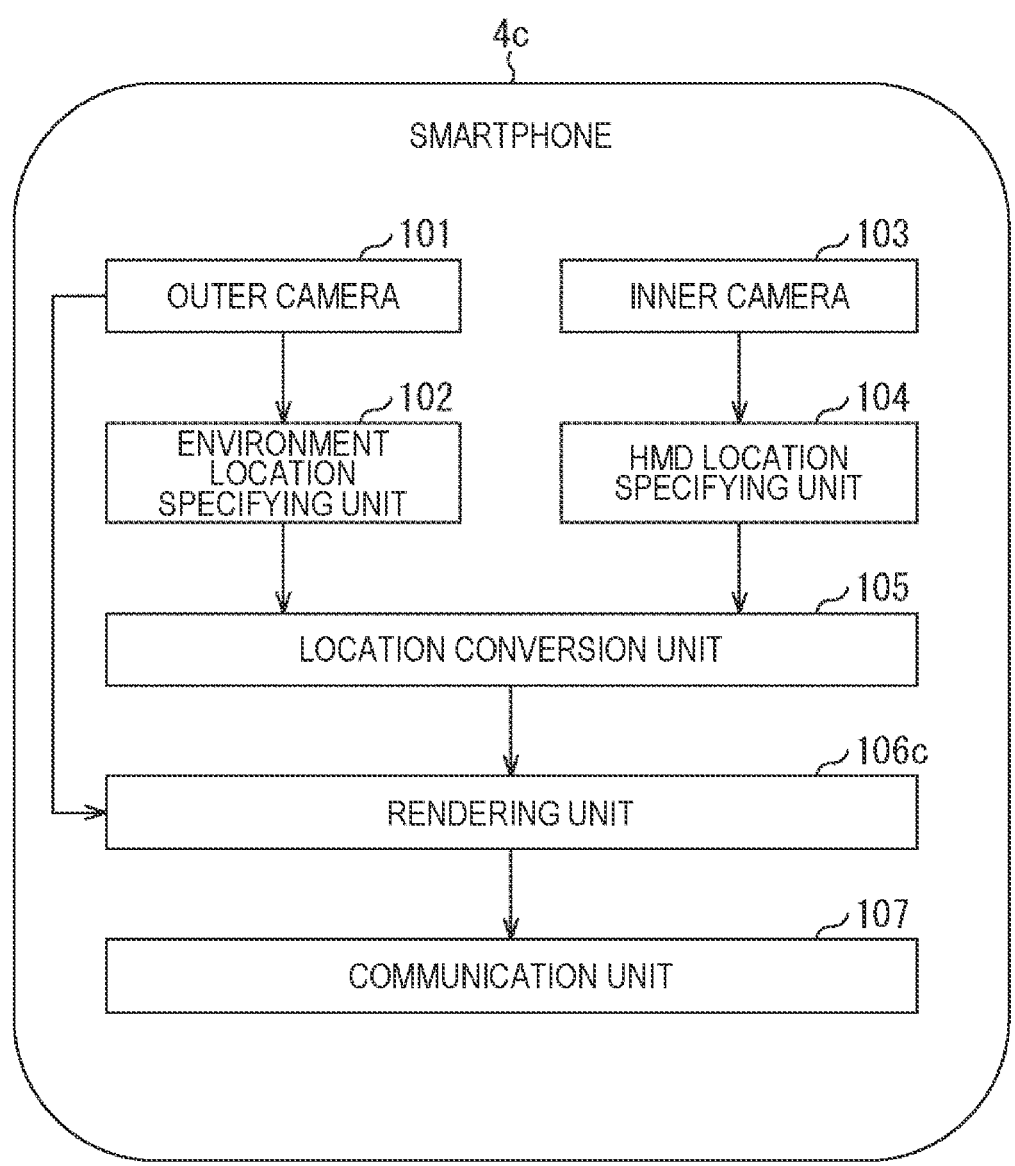
FIG. 17 is a diagram showing a configuration example of a smartphone in a third embodiment.

FIG. 17 is a diagram showing a configuration example of a smartphone 4c in the third embodiment. The smartphone 4c in the third embodiment is different from the smartphone 4a (FIG. 6) in the first embodiment in that image data is supplied from an outer camera 101 to a rendering unit 106c, and other configurations are the same.

The rendering unit 106c analyzes an external environment imaged by the outer camera 101, collects environment information, and performs spatial localization rendering on an AR content in accordance with the information. For example, as described above, in a case where a desk in the real space is detected as environment information, the rendering unit 106c performs rendering for displaying of a predetermined AR content on the desk.

An HMD 1c in the third embodiment receives image data from the smartphone 4c and performs processing on the basis of the image data to present an image to a user. The HMD 1c that performs such processing has the same configuration as that of the HMD 1a (FIG. 8) in the first embodiment, and can be configured to perform the same processing (FIG. 12). Here, it is assumed that the configuration and processing of the HMD 1c are the same as those of the HMD 1a in the first embodiment, and the description thereof will be omitted.

Processing of Smartphone in Third Embodiment

Figure 18:
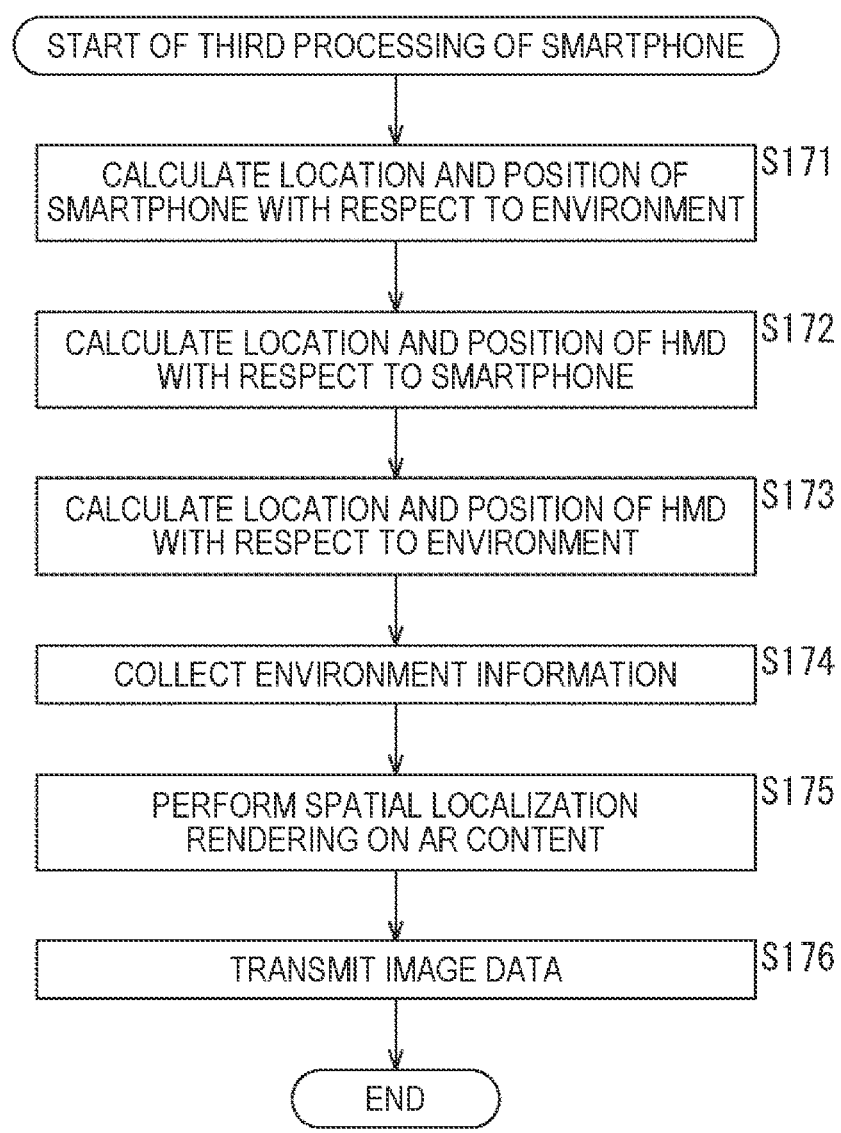
FIG. 18 is a flowchart for explaining processing of the smartphone in the third embodiment.

Processing of the smartphone 4c will be described with reference to a flowchart shown in FIG. 18.

Since steps S171 to S173 are the same as steps S101 to S103 (FIG. 11) in the first embodiment, the description thereof will be omitted. While location information is generated, in step S174, the rendering unit 106c collects environment information. The rendering unit 106c analyzes an image obtained by imaging an external environment and supplied from the outer camera 101, detects, for example, an object, a wall, a floor, and the like installed in the external environment, and collects as environment information. Note that, here, the description is continued assuming that the rendering unit 106c collects environment information, but a configuration may be adopted in which a unit to collect environmental information, for example, an environmental information collection unit, is provided separately from the rendering unit 106c, and the environmental information collection unit collects environmental information.

In step S175, the rendering unit 106c uses the location data supplied from a location conversion unit 105, the collected environment information, the AR content information supplied from the information processing apparatus 2, and the like, to execute processing for spatial localization rendering on the AR content to generate image data. The generated image data is transmitted to the HMD 1c (not illustrated) by a communication unit 107 in step S176.

In this way, the HMD 1a receives and processes the image data from the smartphone 4a. The image data from the smartphone 4a can be used as image data for displaying an AR content according to a shape of the environment and an object existing in the environment.

Fourth Embodiment

As described with reference to FIG. 1 and the like, the smartphone 4 is used in a state of being held by a user. Furthermore, a location of the HMD 1 with respect to the environment is specified by imaging an external environment and the HMD 1 with the smartphone 4. The user needs to keep the smartphone 4 in a state of being able to image the external environment and the HMD 1.

However, there is a possibility that a hand of the user holding the smartphone 4 will be lowered, and the smartphone 4 will not be in a state of being able to image the external environment and the HMD 1. For example, when the user's hand is lowered, the inner camera 103 may be directed in a direction in which the HMD 1 cannot be imaged.

Furthermore, even if the smartphone 4 is held in a state of being able to image the external environment and the HMD 1, for example, in a case where the outer camera 101 is imaging a white wall, a situation may occur in which it will be difficult to specify a location of the smartphone 4 with respect to the environment because a sufficient number of feature points (feature quantity) cannot be extracted. In the following description, it is described as feature points, but it may be a feature quantity.

As a fourth embodiment, a mode will be described in which, in a case where a situation occurs in which a smartphone 4 cannot capture an environment or cannot capture an HMD 1, occurrence of such a state is notified (a warning is issued) to a user.

Configuration Example of Smartphone in Fourth Embodiment

Figure 19:
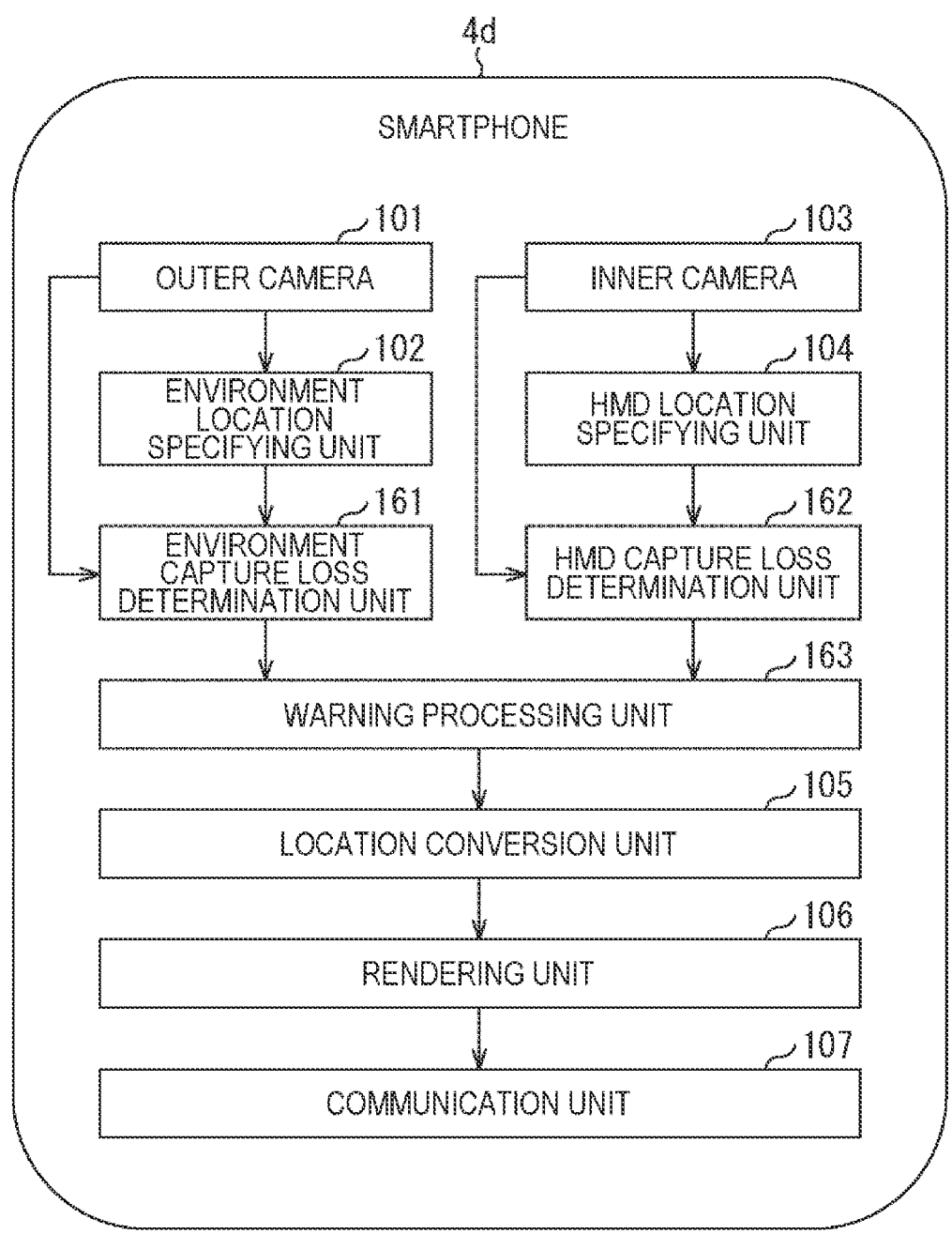
FIG. 19 is a diagram showing a configuration example of a smartphone in a fourth embodiment.

FIG. 19 is a diagram showing a configuration example of a smartphone 4d in the fourth embodiment. The smartphone 4d in the fourth embodiment is different in that an environment capture loss determination unit 161, an HMD capture loss determination unit 162, and a warning processing unit 163 are added to the configuration of the smartphone 4a (FIG. 6) in the first embodiment, and other portions are the same.

In the smartphone 4d shown in FIG. 19, image data from an outer camera 101 and location data from an environment location specifying unit 102 are supplied to the environment capture loss determination unit 161. The environment capture loss determination unit 161 determines whether to be a state in which an environment has been successfully captured by the outer camera 101.

The environment capture loss determination unit 161 determines, for example, whether or not to be a state in which the environment has been successfully imaged by the outer camera 101. In a case where it is determined that the outer camera 101 has failed to image the environment, a warning is issued. A case where it is determined that the outer camera 101 has failed to image the environment is, for example, a case where an imaged screen is all black or all white.

Furthermore, the environment capture loss determination unit 161 also determines whether or not spatial localization has been successfully achieved. For example, a case where spatial localization is successfully achieved is a state in which sufficient feature points are extracted from an image imaged by the outer camera 101, and localization is successfully achieved by using sufficient feature points. Therefore, a state in which the spatial localization is not achieved is a state in which sufficient feature points have failed to be extracted. In such a case, a warning can be issued.

Furthermore, the environment capture loss determination unit 161 may also determine whether or not time series tracking of feature points has been achieved, and whether or not there is a plurality of feature point groups for which time series tracking has been achieved. A warning can be issued in a state in which time-series tracking has failed or a case of a situation in which there is only one (no) feature point group for which time series tracking has been achieved.

A determination result by the environment capture loss determination unit 161 is supplied to the warning processing unit 163. As the determination result, a flag of "1" can be used when it is determined that capture loss has occurred, and a flag of "0" can be used when it is determined that no capture loss has occurred.

The HMD capture loss determination unit 162 determines, for example, whether or not an HMD 1d (FIG. 20) has been successfully imaged by the inner camera 103. In a case where it is determined that the inner camera 103 has failed to image the HMD 1d, a warning is issued.

Furthermore, a warning may be issued when capturing is about to be lost. For example, in a case where the HMD 1d imaged by the inner camera 103 is imaged near an edge of the image, the HMD capture loss determination unit 162 may determine as not a state in which the inner camera 103 has successfully imaged the HMD 1d (FIG. 20), and a warning may be issued to the user.

A determination result by the HMD capture loss determination unit 162 is supplied to the warning processing unit 163. As the determination result, a flag of "1" can be used when it is determined that capture loss has occurred, and a flag of "0" can be used when it is determined that no capture loss has occurred.

In a case where at least one determination result of the determination result by the environment capture loss determination unit 161 or the determination result by the HMD capture loss determination unit 162 is a determination result as capture loss, the warning processing unit 163 determines to issue a warning, and generates warning information. The warning information differs depending on how the warning is issued by the HMD 1d, and information according to specifications of the HMD 1d is generated.

The warning may be given visually to the user, may be given tactilely to the user, or may be given auditorily to the user. For example, in a case where the warning is given visually to the user, the warning information can be information such as an image or text (a message) that makes the user to recognize that capture loss has occurred.

Furthermore, for example, in a case where the warning is given tactilely, the warning information can be information for generating a vibration that makes the user to recognize that capture loss has occurred. Furthermore, for example, in a case where the warning is given auditorily, the warning information can be information such as a warning sound or a voice that makes the user to recognize that capture loss has occurred.

Of course, as the warning, warnings given to the user visually, tactilely, and auditorily can be combined.

The warning information from the warning processing unit 163 may be supplied to a location conversion unit 105, a rendering unit 106, or/and a communication unit 107. For example, in a case where the warning is given visually, the warning information from the warning processing unit 163 may be supplied to the rendering unit 106, and the rendering unit 106 may generate image data of an image in which the warning information is superimposed on an image to be presented to the user.

Furthermore, in a case where the warning is given tactilely or auditorily to the user, the warning information from the warning processing unit 163 may be supplied to the communication unit 107, and the warning information may be transmitted to the HMD 1d from the communication unit 107 as data separate from the image data.

Here, the description is continued assuming that the warning information from the warning processing unit 163 is supplied to the location conversion unit 105, and is supplied to the rendering unit 106 and further to the communication unit 107 in the subsequent stage via the location conversion unit 105.

For example, in a case where a determination result is given indicating that a warning is to be issued by the warning processing unit 163, and is supplied to the location conversion unit 105, the location conversion unit 105 may perform processing while assuming that either a location specified by the environment location specifying unit 102 or a location specified by an HMD location specifying unit 104 is location information with low accuracy. At this time, the warning processing unit 163 may also be configured to supply, to the location conversion unit 15, information indicating which location is less accurate among the location specified by the environment location specifying unit 102 and the location specified by the HMD location specifying unit 104, and the location conversion unit 105 may also be configured to use such information to perform processing.

Configuration Example of HMD in Fourth Embodiment

Figure 20:
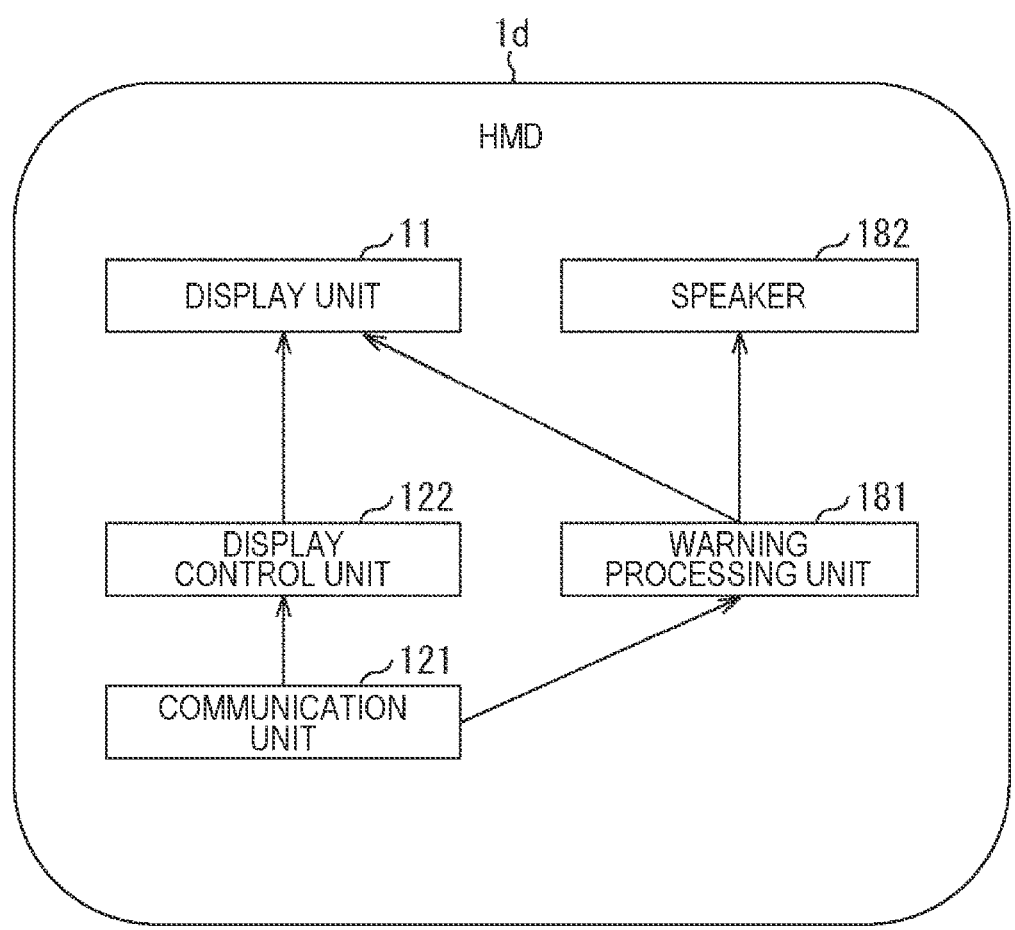
FIG. 20 is a diagram showing a configuration example of an HMD in the fourth embodiment.

FIG. 20 is a diagram showing a configuration example of the HMD 1d in the fourth embodiment. The HMD 1d in the fourth embodiment is different in that a warning processing unit 181 and a speaker 182 are added to the configuration of the HMD 1a (FIG. 8) in the first embodiment, and other portions are the same.

Since the HMD 1d shown in FIG. 20 shows a configuration of a case where a warning is given auditorily to the user, the speaker 182 that emits sound is provided. In a case of giving a warning visually to the user, the HMD 1d may have a configuration in which the speaker 182 is not provided. Furthermore, in a case of giving a warning tactilely to the user, the HMD 1d may have a configuration in which e a vibrator for generation of a vibration is provided instead of the speaker 182.

In a case where warning information is received by a communication unit 121, the warning processing unit 181 performs processing for issuing a warning on the basis of the warning information. In the example shown in FIG. 20, the warning processing unit 181 executes processing for sound production of a warning sound or a message by the speaker 182. Note that, here, the description has been made with a case where the warning is issued by the HMD 1d as an example, but the warning may be issued on the smartphone 4d side.

Processing of Smartphone in Fourth Embodiment

Figure 21:
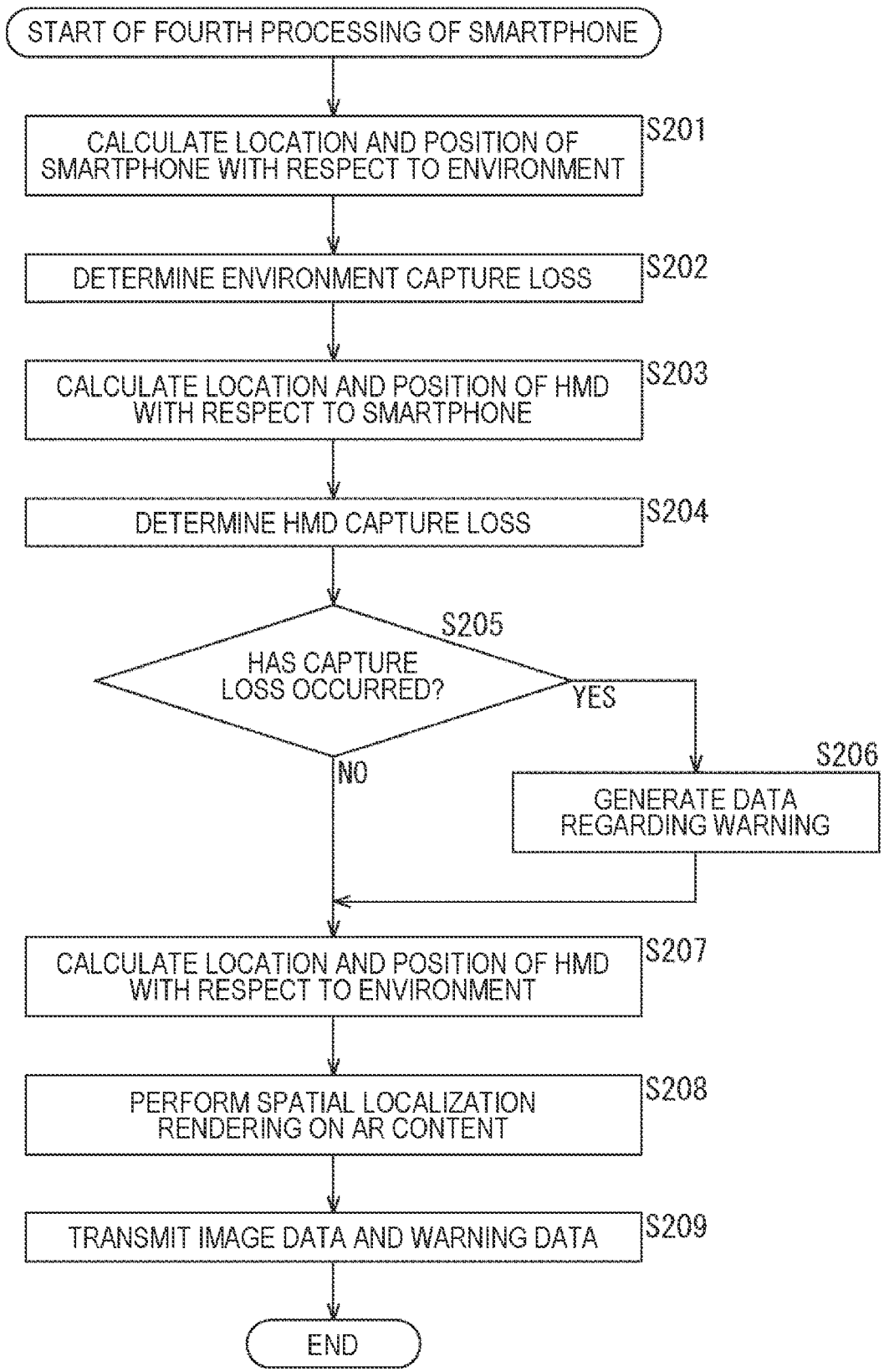
FIG. 21 is a flowchart for explaining processing of the smartphone in the fourth embodiment.

With reference to a flowchart shown in FIG. 21, processing of the smartphone 4d in the fourth embodiment will be described.

In step S201, the environment location specifying unit 102 calculates a location and a position of the smartphone 4d with respect to an environment. The process of step S201 can be performed similarly to step S101 (FIG. 11).

In step S202, the environment capture loss determination unit 161 uses image data from the outer camera 101 and location data from the environment location specifying unit 102, to determine whether or not the environment has been captured in an image imaged by the outer camera 101. As described above, this determination as to whether or not of the environment has been captured is performed by determining whether or not sufficient feature points have been extracted, whether or not tracking has been successfully achieved, and the like.

In step S203, the HMD location specifying unit 104 calculates a location and a position of the HMD 1d with respect to the smartphone 4d. The process of step S203 can be performed similarly to step S102 (FIG. 11).

In step S203, the HMD capture loss determination unit 162 uses image data from the inner camera 103 and location data from the HMD location specifying unit 104, to determine whether or not the HMD 1d has been captured in an image imaged by the inner camera 103. As described above, this determination as to whether or not the HMD 1d has been captured is performed by determining whether or not the HMD 1d has been successfully imaged near a center of a screen (a region other than an edge).

In step S205, the warning processing unit 163 determines whether or not capture loss has occurred. The warning processing unit 164 refers to a determination result from the environment capture loss determination unit 161 and a determination result from the HMD capture loss determination unit 162, to determine whether or not the determination result indicates that capture loss has occurred. In a case where it is determined in step S205 that capture loss has occurred, the process proceeds to step S206.

In step S206, in a case where it is determined that capture loss has occurred, the warning processing unit 163 generates information (warning data) to make the user to recognize that the capture loss has occurred. For example, for the HMD 1d shown in FIG. 20, warning data for producing a warning sound by the speaker 182 is generated.

Note that, since a description is given here with a case of a configuration in which the smartphone 4d is provided with the rendering unit 106 as an example, the description is continued assuming that the smartphone 4d also generates warning data. However, a configuration may be adopted in which the HMD 1d includes a rendering unit and the warning data is generated on the HMD 1d side. For example, a capture state can be transmitted from the smartphone 4d to the HMD 1d side as it is, and the warning determination can be made on the HMD 1d side.

Whereas, in a case where it is determined in step S205 that no capture loss has occurred, the process proceeds to step S207. The process proceeds to step S207 also in a case where the warning data is generated in step S206.

Since the processes of steps S207 to S209 are similar to those of steps S103 to S105 (FIG. 11), the description thereof will be omitted.

In this way, a situation where the smartphone 4d has failed to capture the environment or failed to capture the HMD 1d can be detected, and a warning can be issued to the user. In a case where the warning is issued, in order to improve a situation where capturing of the environment has failed or capturing of the HMD 1d has failed, the user can take actions such as reorienting the smartphone 4d to improve a state in which capturing has failed.

Processing of HMD in Fourth Embodiment

Figure 22:
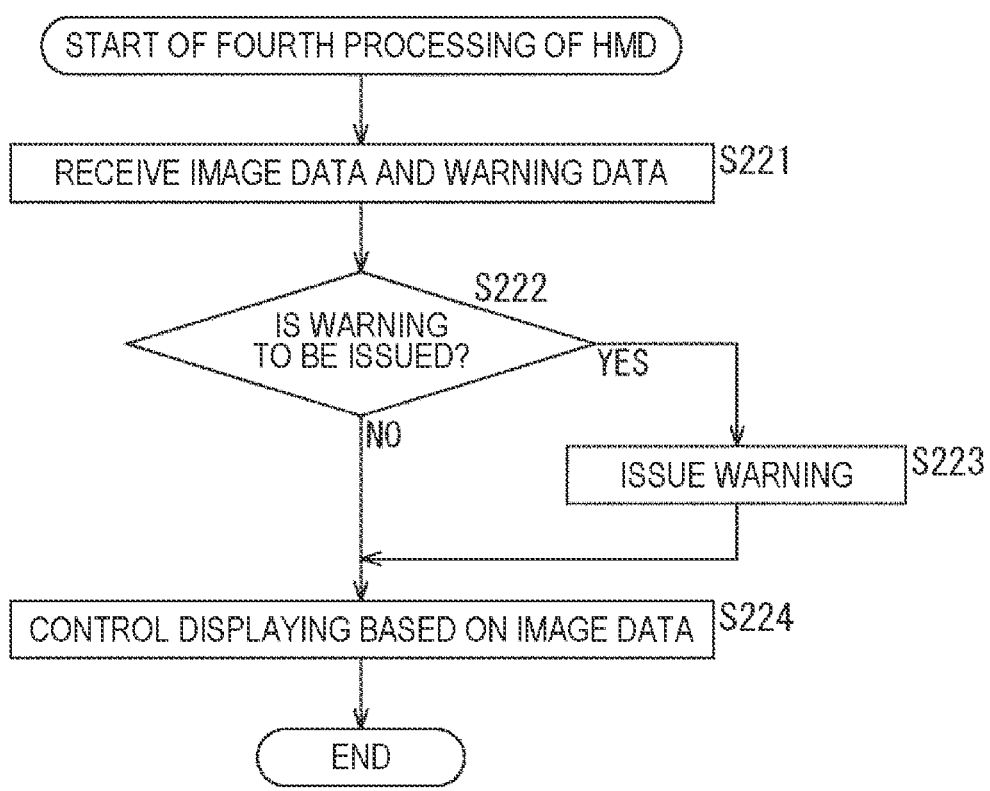
FIG. 22 is a flowchart for explaining processing of the HMD in the fourth embodiment.

With reference to a flowchart of FIG. 22, processing of the HMD 1d in the fourth embodiment will be described.

In step S221, the communication unit 121 receives image data and warning data transmitted from the smartphone 4d. Note that the warning data may be received only when there is a warning (generated and transmitted only when there is a warning on the smartphone 4d side), or information indicating whether or not there is a warning may be received.

In step S222, the warning processing unit 181 determines whether or not to issue a warning. The warning processing unit 181 determines to issue a warning in a case where warning data is received by the communication unit 121 or in a case where the warning data indicates that there is a warning. In a case where the warning processing unit 181 determines in step S222 to issue a warning, the process proceeds to step S223.

In step S223, a warning is issued. According to the configuration of the HMD 1d shown in FIG. 20, since the speaker 182 is configured to emit a warning sound, the speaker 182 emits a warning sound in step S223. While the warning sound is emitted, the process in step S224 is also executed.

The process proceeds to the process of step S224 also in a case where it is determined in step S222 that no warning is to be issued. In step S224, a display control unit 122 performs display control for displaying an image based on the received image data on a display unit 11.

Note that, in a case of giving a warning to be superimposed on the image displayed on the display unit 11, the image data includes a warning image and text, so that the processes in steps S222 and S223 can be omitted.

In this way, in a case where occurrence of a situation is detected in which the smartphone 4d has failed to capture the environment or has failed to capture the HMD 1d, a warning can be issued to the user by the HMD 1d. In a case where the warning is issued, in order to improve a situation where capturing of the environment has failed or capturing of the HMD 1d has failed, the user can take actions such as reorienting the smartphone 4d to improve a state in which capturing has failed.

Note that, as the fourth embodiment, a case where the fourth embodiment is applied to the first embodiment has been described as an example, but it is also possible to apply the fourth embodiment to the second embodiment and the third embodiment.

Fifth Embodiment

In the fourth embodiment, the description has been given to a mode for issuing a warning to a user in a case where a state occurs in which the environment cannot capture the HMD 1d. Moreover, a fifth embodiment for notifying a user of how to cancel a warning when the warning is issued will be described. The smartphone 4 in the fifth embodiment is a smartphone 4e, and the HMD 1 is an HMD 1e.

For example, in a case where capturing of the HMD 1e by an inner camera 103 is lost, information on how to move the smartphone 4e to return to a state in which the HMD 1e can be captured (hereinafter referred to as return support information) is presented to the user. This return support information is information that enables improvement of the situation without the user looking directly at the smartphone 4e, in other words, without disturbing a state of wearing the HMD 1d and enjoying AR and the like provided by the HMD 1d.

In a case where it is determined that the capture state of the HMD 1e has been lost due to, for example, lowering of a hand of the user holding the smartphone 4e, the return support information instructing to lift the smartphone 4e is generated. As the return support information in this case, an upward arrow, a gesture display for moving the hand upward, a text such as "Please move your hand upward", and the like are displayed on a display unit 11 of the HMD 1e.

Furthermore, the return support information may be information for providing a message such as "Please move your hand upward" by a voice. Such a display and a voice may be combined. Moreover, it may be possible to notify by a vibration that the user's hand is being lowered, and the return support information by a display or a voice may be presented in a case where the situation is not improved by the notification.

Furthermore, as the return support information, a region being captured by the smartphone 4e may be displayed on the HMD 1d. By seeing the region captured by the smartphone 4e and displayed on the display unit 11 of the HMD 1d, the user can recognize that the environment and/or the HMD 1d are not captured, and improve the situation by moving the hand holding the smartphone 4e to enable capturing.

For example, in a case where it is determined that capture loss has occurred since an image imaged by the smartphone 4e is a white wall and sufficient feature points cannot be extracted, the return support information is generated to return to a state immediately before in which no capture loss has occurred. For example, an image or a message is displayed or a voice is outputted for instructing the user to return to the state immediately before it is determined that the capture loss has occurred (a past state), in other words, a state in which feature points have been stably obtained.

For example, in a case where the state (a place) where the feature points have been stably obtained is at a location on a right side of a place where the capture loss occurs, a right side arrow is displayed, and a message such as "Please move your smartphone to the right side" is displayed or is spoken as a voice.

For example, in a case where an image imaged by an outer camera 101 or the inner camera 103 becomes so dark that there is no contrast, and it is determined that capture loss has occurred, a message or a voice such as "Please make it brighter" can be issued. The case where an image is so dark that there is no contrast is, for example, a case where the smartphone 4e and/or the HMD 1e is not moved and the smartphone 4e and/or the HMD 1e is brought into a sleep state, and the like.

Configuration Example of Smartphone in Fifth Embodiment

FIG. 23 is a diagram showing a configuration example of the smartphone 4e in the fifth embodiment. The smartphone 4e in the fifth embodiment shown in FIG. 23 is different in that a configuration is adopted in which a location storage unit 201 is added to the smartphone 4d in the fourth embodiment shown in FIG. 19, and other portions are the same.

The location storage unit 201 stores location data generated by a location conversion unit 105. Since the location conversion unit 105 specifies a location of the HMD 1d with respect to the environment and generates location data, the location storage unit 201 stores location data regarding the location of the HMD 1d with respect to the environment.

Furthermore, the location storage unit 201 can be configured not to store the location data when capture loss has occurred. With such a configuration, the location storage unit 201 can store the location data in a state in which the environment and the HMD 1d are being captured. By storing such location data, when capture loss occurs, it is possible to generate return support information for returning to a situation where no capture loss has occurred, by using the location data when no capture loss has occurred.

In a case where a determination result from an environment capture loss determination unit 161 or an HMD capture loss determination unit 162 indicates that capture loss has occurred, a warning processing unit 163e generates return support information with reference to the location data stored in the location storage unit 201.

The return support information generated by the smartphone 4e is supplied to the HMD 1e and provided to the user by the HMD 1e. Since a configuration of the HMD 1e can be similar to that of the HMD 1d (FIG. 20) in the fourth embodiment, the illustration and description will be omitted.

Processing of Smartphone in Fifth Embodiment

With reference to a flowchart shown in FIG. 24, processing of the smartphone in the fifth embodiment will be described.

Since the processes of steps S241 to S245 are similar to those of steps S201 to S205 (FIG. 21), the description thereof will be omitted here. In a case where it is determined in step S245 that capture loss has occurred, the process proceeds to step S246.

In step S246, return support information is generated. In a case where it is determined that capture loss has occurred, the warning processing unit 163e generates the return support information with reference to location data stored in the location storage unit 201 as necessary. The generated return support information is the information as described above, for example, a figure, a text message, a voice message, or the like for instructing to lift the smartphone 4e. When the return support information is generated in step S246, the process proceeds to step S248.

In step S248, the location conversion unit 105 calculates a location and a position of the HMD 1e with respect to an environment and generates location data. Since the location and the position of the HMD 1e with respect to the environment calculated at this time are those when it is determined that capture loss has occurred, some correction may be performed such that location conversion is performed to reduce an influence of the capture loss. When the location data is generated in step S248, the process proceeds to step 3250.

Whereas, in a case where it is determined in step S245 that no capture loss has occurred, the process proceeds to step S248. In step 3248, the location conversion unit 105 calculates a location and a position of the HMD 1e with respect to an environment and generates location data. Since the location and the position of the HMD 1e with respect to the environment calculated at this time are those when it is determined that no capture loss has occurred, the generated location data is stored in the location storage unit 201 (step S249). When the location data is stored in the location storage unit 201 in step S249, the process proceeds to step 3250.

Since the processes of steps S250 and S251 are similar to those of steps 3103 to S105 (FIG. 11), the description thereof will be omitted.

In this way, it is possible to detect occurrence of a situation in which the smartphone 4d has failed to capture the environment or has failed to capture the HMD 1d, and generate, for the user, return support information regarding processing to be performed to improve such a state in which capturing has failed. On the basis of the return support information, in order to improve a situation where capturing of the environment has failed or capturing of the HMD 1d has failed, the user can take actions such as reorienting the smartphone 4d to improve a state in which capturing has failed.

Processing of HMD in Fifth Embodiment

Figure 25:
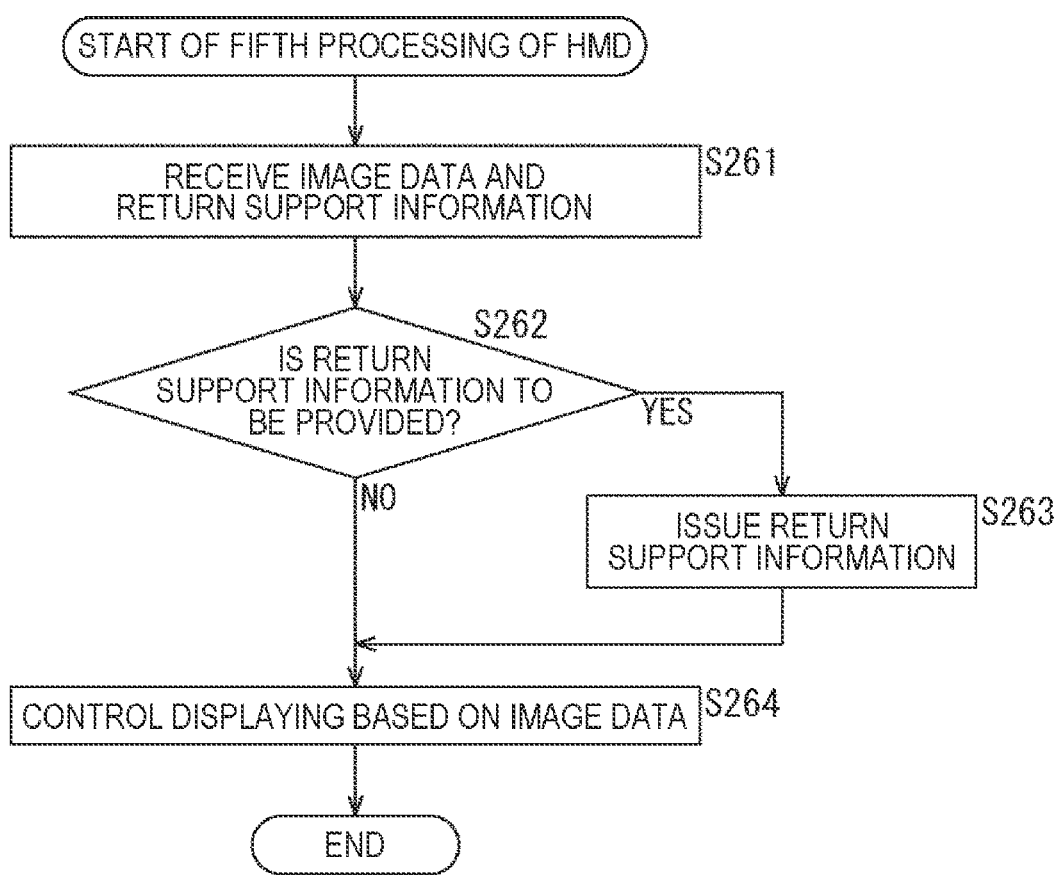
FIG. 25 is a flowchart for explaining processing of an HMD in the fifth embodiment.

With reference to a flowchart of FIG. 25, processing of the HMD 1e in the fifth embodiment will be described.

In step S261, a communication unit 121 receives image data and return support information transmitted from the smartphone 4e. Note that, the return support information may be received only when capture loss has occurred (generated and transmitted only when it is determined that capture loss has occurred on the smartphone 4e side), or information indicating whether or not there is return support information, for example, a flag may be received.

In step S262, a warning processing unit 181 determines whether or not to provide the return support information to the user. In a case where the return support information is received by the communication unit 121, or in a case where the information indicating that there is return support information is received, the warning processing unit 181 determines to provide the return support information. In a case where the warning processing unit 181 determines in step S262 to provide the return support information, the process proceeds to step S263.

In step S263, the return support information is provided to the user. According to the configuration of the HMD 1e (HMD 1d) shown in FIG. 20, since the speaker 182 is configured to provide the return support information, the speaker 182 outputs the return support information, for example, a voice such as "Please move your hand upward" in step S263. While the voice is outputted, the process in step S264 is also executed.

The process proceeds to the process of step S264 also in a case where it is determined not to provide the return support information in step S262. In step S264, a display control unit 122 performs display control for displaying an image based on the received image data on the display unit 11.

Note that, in a case where the return support information is issued to be superimposed on the image displayed on the display unit 11, it is possible to omit the process in steps S262 and S263 since image data also includes an image or text as the return support information.

In this way, in a case where occurrence of a situation is detected in which the smartphone 4e has failed to capture the environment or has failed to capture the HMD 1e, return support information regarding processing to be performed to improve such a state in which capturing has failed can be provided by the HMD 1e. On the basis of the return support information, in order to improve a situation where capturing of the environment has failed or capturing of the HMD 1e has failed, the user can take actions such as reorienting the smartphone 4e to improve a state in which capturing has failed.

Note that, as the fifth embodiment, a case where the fifth embodiment is applied to the first embodiment has been described as an example, but it is also possible to apply the fourth embodiment to the second embodiment and the third embodiment.

Sixth Embodiment

The first to fifth embodiments are embodiments in a case where the smartphone 4 is provided with two cameras, the outer camera 101 and the inner camera 103. As a sixth embodiment, a description is given to a case where a smartphone 4 has one camera (uses one of a plurality of cameras provided to the smartphone 4), and performs processing almost similar to that of the first to fifth embodiments.

Configuration Example of Smartphone in Sixth Embodiment

Figure 26:
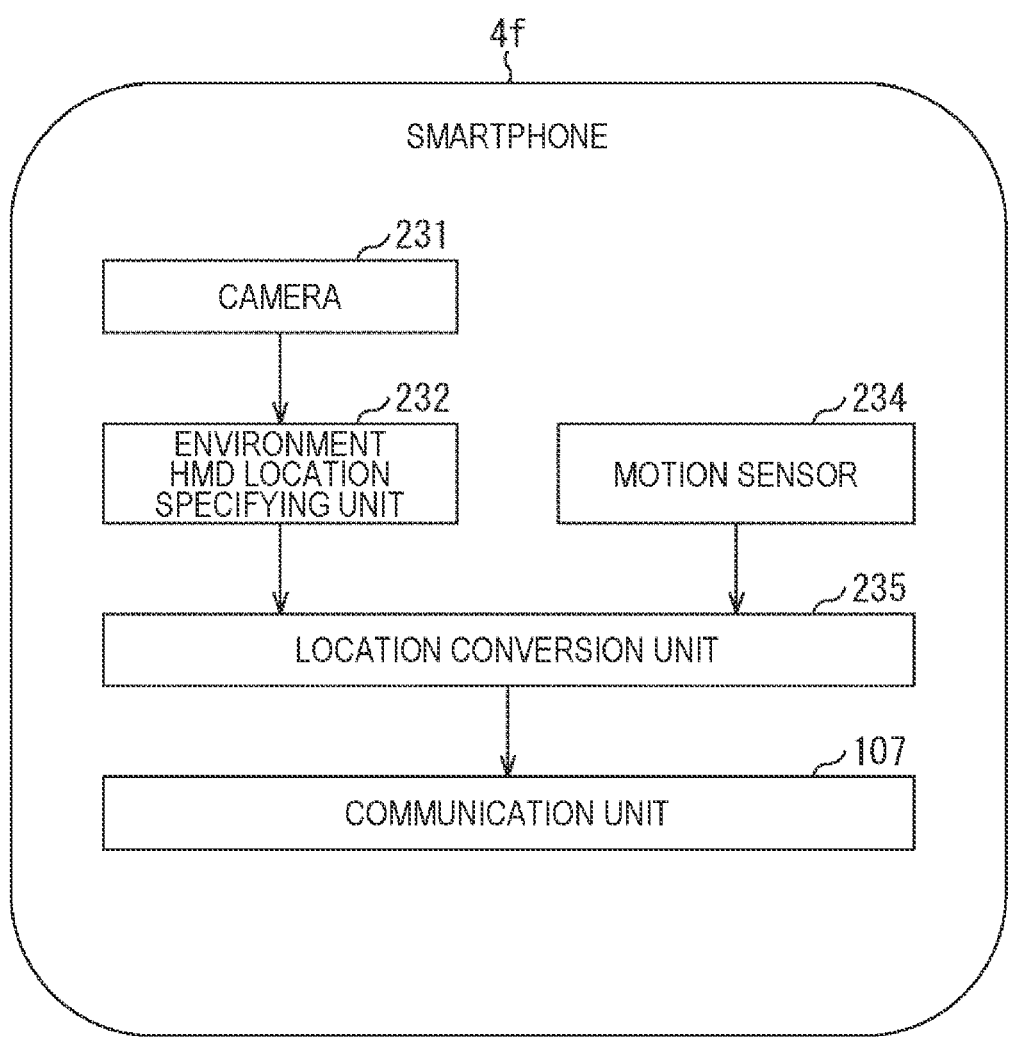
FIG. 26 is a diagram showing a configuration example of a smartphone in a sixth embodiment.

FIG. 26 is a diagram showing a configuration example of a smartphone 4f in the sixth embodiment. The smartphone 4f shown in FIG. 26 includes a camera 231, an environment HMD location specifying unit 232, a motion sensor 234, a location conversion unit 235, and a communication unit 107.

A configuration of the smartphone 4f shown in FIG. 26 indicates a configuration in a case where, similar to the smartphone 4b in the second embodiment, processing up to generation of location data regarding a location of an HMD 1f with respect to an environment is performed, and processing of spatial localization rendering on an AR content is not performed. Here, a case where the sixth embodiment is combined with the second embodiment will be described as an example, but the sixth embodiment may be combined with the first and third to fifth embodiments.

The camera 231 corresponds to the outer camera 101 and the inner camera 103 (FIG. 13), and images the environment and images the HMD 1f. Image data from the camera 231 is supplied to the environment HMD location specifying unit 232. The camera 231 images an environment and images the HMD 1f, for example, in a time division manner.

Note that, here, the description is continued assuming that the HMD 1f is not being imaged when the environment is being imaged.

In the above description, for example, the description has been made that, in a case where the outer camera 101 and the inner camera 103 are provided as in the smartphone 4e shown in FIG. 23, the environment is imaged by the outer camera 101 and the HMD 1e is imaged by the inner camera 103. In a case where the smartphone 4e is used, it can be said that a state in which the environment is being imaged by the outer camera 101 is a state in which the HMD 1e is not being imaged by the outer camera 101.

As shown in FIG. 26, in a case of the smartphone 4f provided with one camera 231, the camera 231 may be used as a camera corresponding to the outer camera 101 and as a camera corresponding to the inner camera 103. When the camera 231 is used as the camera corresponding to the outer camera 101, it can be said as a state in which the environment is imaged and the HMD 1e is not being imaged.

Similarly, when the camera 231 is used as the camera corresponding to the inner camera 103, it can be said as a state in which the HMD 1e is imaged and the environment is not being imaged.

For such a reason, the description here is continued assuming that the HMD 1f is not imaged when the environment is being imaged by the camera 231.

Note that, when the environment is being imaged, a location of the smartphone 4f in the environment is calculated by acquiring features (points) obtained from (an image obtained by imaging) the environment. It can be said that imaging the environment means whether or not an image that enables acquisition of feature points is being imaged. Therefore, a time when the feature points can be acquired from a background of the HMD 1f when the HMD 1f is being imaged is also included in the situation where the environment is being imaged.

In this way, it is possible in some situations to image the HMD 1d and the environment with one camera. In such a case, since processing can be performed similarly to a case where there are two cameras described above, the description is omitted here, and the description will be given with, as an example, a case where an image that enables acquisition of the feature points is not being imaged when the HMD 1f is being imaged.

Returning to the description with reference to FIG. 26, the environment HMD location specifying unit 232 corresponds to the environment location specifying unit 102 and the HMD location specifying unit 104 (FIG. 13), and specifies a location of the smartphone 4f with respect to the environment, and specifies a location of the HMD 1f with respect to the smartphone 4f. Location data from the environment HMD location specifying unit 232 is supplied to the location conversion unit 235.

The motion sensor 234 is, for example, a sensor in which an acceleration sensor and a gyro sensor are combined. The motion sensor 234 detects an acceleration, a tilt, a direction, and the like of the smartphone 4f.

Location data from the motion sensor 234 is used to correct a location of the smartphone 4f with respect to the environment when the environment is not imaged by the camera 231.

The location conversion unit 235 uses location data from the environment HMD location specifying unit 232 and location data from the motion sensor 234, to specify a location of the HMD 1f with respect to the environment, generate location data, and supply to the communication unit 107. The communication unit 107 transmits the location data to the HMD 1f.

Configuration Example of HMD in Sixth Embodiment

Figure 27:
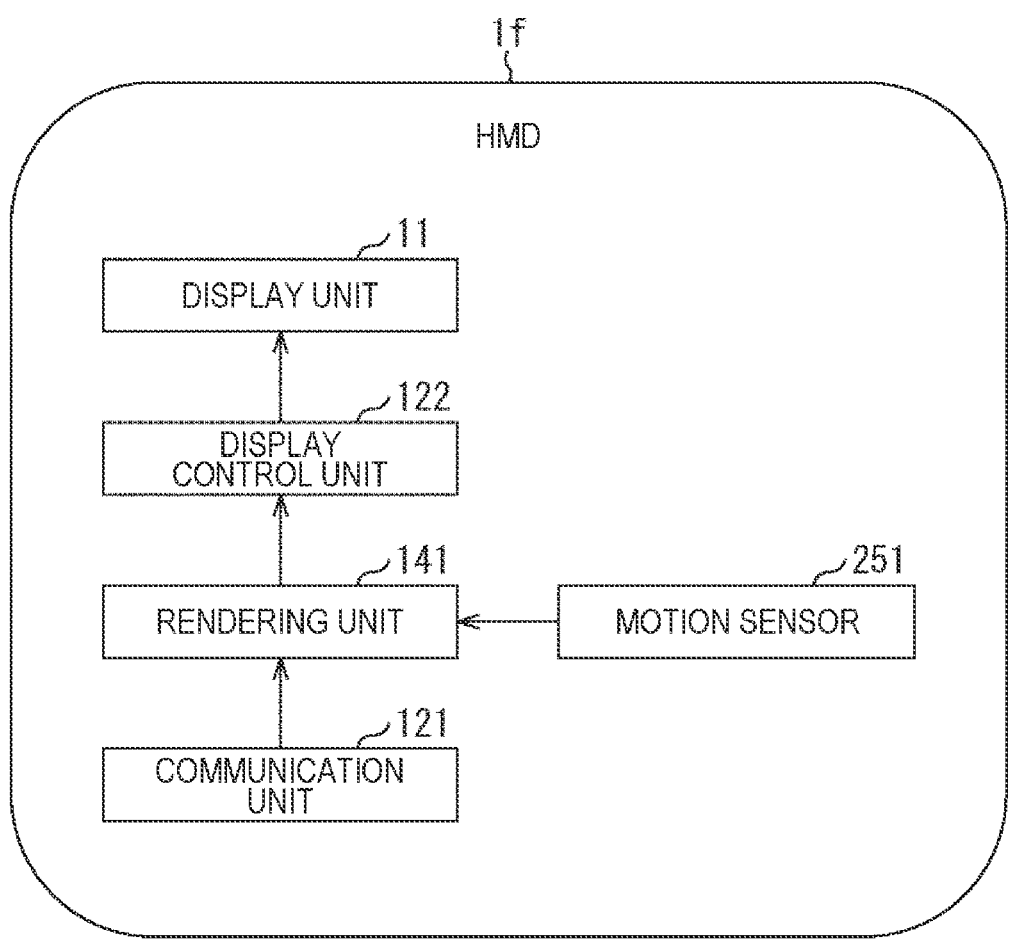
FIG. 27 is a diagram showing a configuration example of an HMD in the sixth embodiment.

FIG. 27 is a diagram showing a configuration example of the HMD 1f in the sixth embodiment. The HMD 1f shown in FIG. 27 has a configuration in which a motion sensor 251 is added to the HMD 1b in the second embodiment.

The motion sensor 251 is provided to supply location data for correcting location data when the HMD 1f is not captured in the smartphone 4f.

Here, a case where the motion sensor 234 is provided on the smartphone 4f and the motion sensor 251 is provided on the HMD 1f is described as an example, but a configuration may be adopted in which a motion sensor is provided in only one of them.

In a case where motion sensors are provided on both the smartphone 4f and the HMD 1f, it will be easier to follow movements of the smartphone 4f and the HMD 1f, and drift will also be suppressed.

The motion sensor is provided for correcting the location, but may also be provided as an external device different from the smartphone 4f or the HMD 1f. For example, a motion sensor provided in a wristwatch-shaped terminal called a smart watch may be linked with the smartphone 4f or the HMD 1f to perform processing.

Furthermore, a configuration may be adopted in which, by using location information from the motion sensor as an external device, location data of the motion sensor 234 of the smartphone 4f is corrected, or location data of the motion sensor 251 of the HMD 1f is corrected.

Processing of Smartphone in Sixth Embodiment

Figure 28:
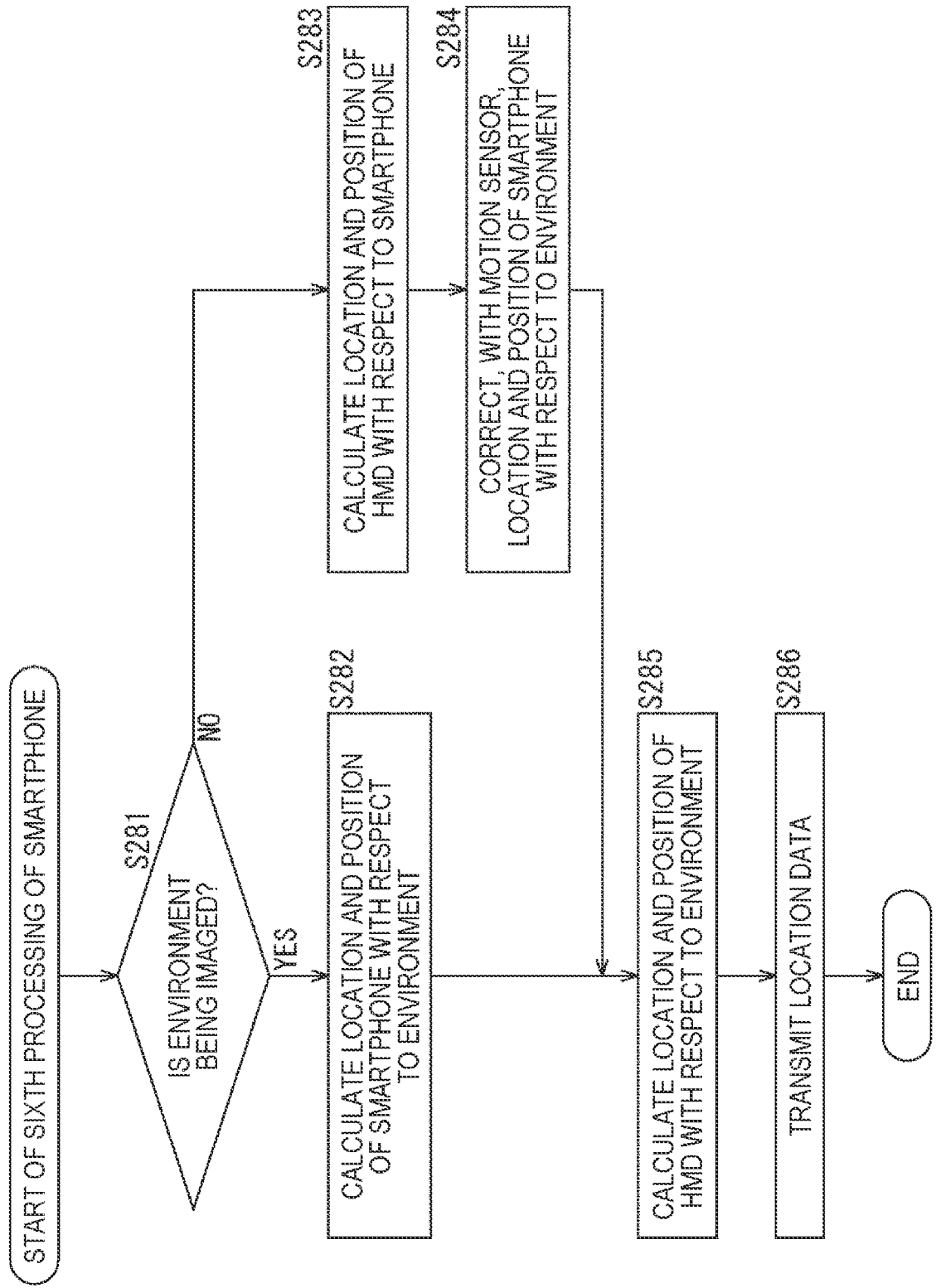
FIG. 28 is a flowchart for explaining processing of the smartphone in the sixth embodiment.

With reference to a flowchart shown in FIG. 28, processing of the smartphone 4f in the sixth embodiment will be described.

In step S281, the environment HMD location specifying unit 232 determines whether or not the environment is being imaged by the camera 231. In other words, in step S281, it is determined whether or not the HDM 1f is not being imaged by the camera 231. In a case where it is determined in step S281 that the camera 231 is imaging the environment, the process proceeds to step S282.

In step S282, the environment HMD location specifying unit 232 calculates a location and a position of the smartphone 4f with respect to the environment. Location data (for example, location data corresponding to the location HGSO in the description with reference to FIG. 9) regarding the location that is of the smartphone 4f with respect to the environment and is calculated by the environment HMD location specifying unit 232 is supplied to the location conversion unit 235.

Whereas, in step S281, in a case where it is determined that the camera 231 is not imaging the environment, in other words, in a case where it is determined that the camera 231 is imaging the HMD 1f, the process proceeds to step S283.

In step S283, the environment HMD location specifying unit 232 calculates a location and a position of the HMD 1f with respect to the smartphone 4f. Location data regarding the location that is of the HMD 1f with respect to the smartphone 4f and is calculated by the environment HMD location specifying unit 232 is supplied to the location conversion unit 235.

In step S284, the location conversion unit 235 calculates a location and a position of the smartphone 4f with respect to the environment by using the location data from the motion sensor 234. The location conversion unit 235 holds the location data when the location data of the smartphone 4f with respect to the environment is supplied by the environment HMD location specifying unit 232.

Then, the environment HMD location specifying unit 232 generates location data of the smartphone 4f with respect to the environment at the present moment, by correcting the held location data of the smartphone 4f with respect to the environment by using the location data from the motion sensor 234.

That is, the location conversion unit 235 holds the location data of the smartphone 4f with respect to the environment obtained when the environment is being captured by the camera 231, and corrects the held location data by using the location data obtained by the motion sensor 234 when the environment is not captured by the camera 231. In this way, when the environment is not captured by the camera 231, the location data is interpolated using the location data from the motion sensor 234.

By executing the processes of steps S283 and S284, the location data of the smartphone 4f with respect to the environment and the location data of the HMD 1f with respect to the smartphone 4f are supplied to the location conversion unit 235. In step S285, similarly to the embodiment described above, for example, the first embodiment, the location conversion unit 235 uses these pieces of location data to generate location data of the HMD 1f with respect to the environment. The generated location data is transmitted to the HMD 1f by the communication unit 107 in step S286.

In the sixth embodiment, the environment and the HMD 1f are imaged in a time division manner. For example, in a case of using the smartphone 4f fixedly, the environment is imaged first, a location of the smartphone 4f with respect to the environment at that time is specified, and subsequent processing is performed using the specified location. As the subsequent processing, processing of tracking a movement of the HMD 1f (calculation of a location of the HMD 1f with respect to the smartphone 4f) is performed.

In this way, the location of the HMD 1f with respect to the environment is calculated with one camera. Note that, after the location data is calculated by the smartphone 4f, rendering may be further performed and the image data may be transmitted to the HMD 1f.

Processing of HMD in Sixth Embodiment

The HMD 1f receives location data from the smartphone 4f, and uses the location data to perform rendering in which an AR content is spatially localized by a rendering unit 141. Since such processing is similar to the processing of the HMD 1b (processing of the flowchart shown in FIG. 16) in the second embodiment, the description thereof will be omitted.

Figure 29:
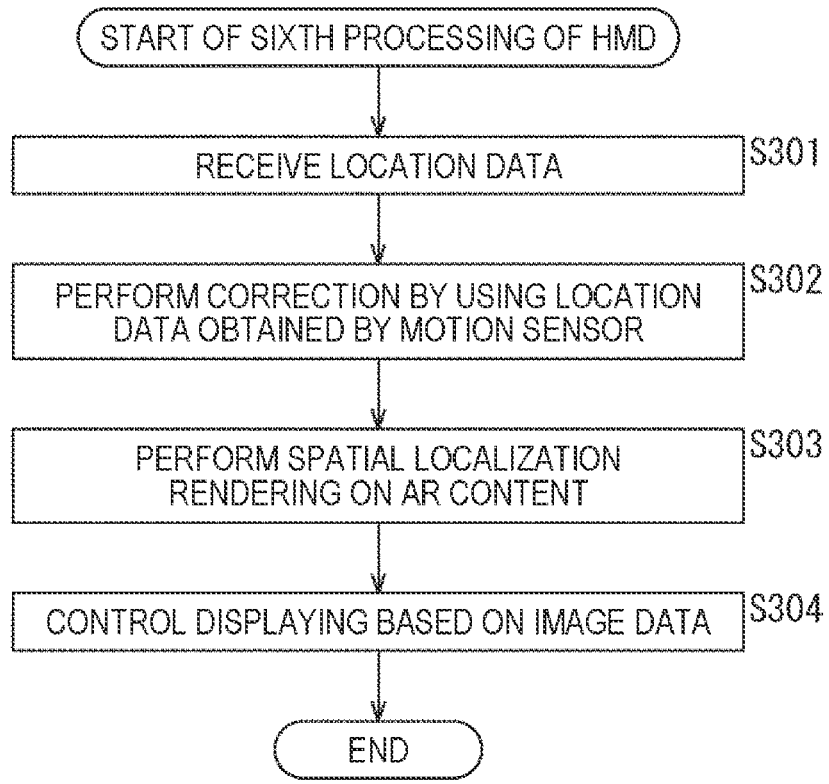
FIG. 29 is a flowchart for explaining processing of the HMD in the sixth embodiment.

Furthermore, the HMD 1f may use the received location data by correcting with location data from the motion sensor 251 provided to the HMD 1f. In such a case, the HMD 1f performs processing on the basis of the processing of a flowchart shown in FIG. 29.

In step S301, the communication unit 121 receives location data from the smartphone 4f. In step S302, the rendering unit 141 corrects the location data supplied via the communication unit 121 by using location data from the motion sensor 251.

Note that, here, the description is continued assuming that the rendering unit 141 corrects the location data supplied via the communication unit 121 by using the location data from the motion sensor 251. However, a configuration may be adopted in which a correction unit to correct location data is provided between the communication unit 121 and the rendering unit 141, location data is supplied from the motion sensor 251 to the correction unit, and the location data supplied via the communication unit 121 is corrected.

Since the location data from the smartphone 4f is a location calculated in a state in which either the environment or the HMD 1f is captured, either the location of the smartphone 4f with respect to the environment or the location of the HMD 1f with respect to the smartphone 4f may be less accurate. Therefore, the accuracy can be improved by correcting the location data calculated on the smartphone 4f side with the location data from the motion sensor 251 of the HMD 1f.

Note that such correction may not be always performed, but may be performed only for location data when the HMD 1f is not captured on the smartphone 4f side, for example.

In step S303, the rendering unit 141 performs spatial localization rendering on the AR content by using the corrected location data, and generates image data. The generated image data is supplied to a display control unit 122. In step S304, the display control unit 122 controls displaying of an image on a display unit 11 on the basis of the image data.

In this way, by analyzing an image obtained from one camera of the smartphone 4f, it is possible to specify the location of the HMD 1f with respect to the environment and present the AR content on the basis of the specified location.

Note that, also in the first to fifth embodiments and a seventh and subsequent embodiments described below, as in the sixth embodiment, a configuration may be adopted in which a motion sensor is mounted on the smartphone 4, and correction is performed using location data from the mounted motion sensor. Furthermore, a configuration may be similarly adopted in the HMD 1 in which a motion sensor is mounted on the HMD 1 and received location data is corrected by using location data from the mounted motion sensor.

Seventh Embodiment

In the first to sixth embodiments, as an example, the description has been given to a case where the environment and the HMD 1 are imaged and a location of the HMD 1 with respect to the environment is specified. A case where a plurality of the HMDs 1 exists in an environment (a real space) and a virtual space is shared by the plurality of the HMDs 1 will be described.

Figure 30:
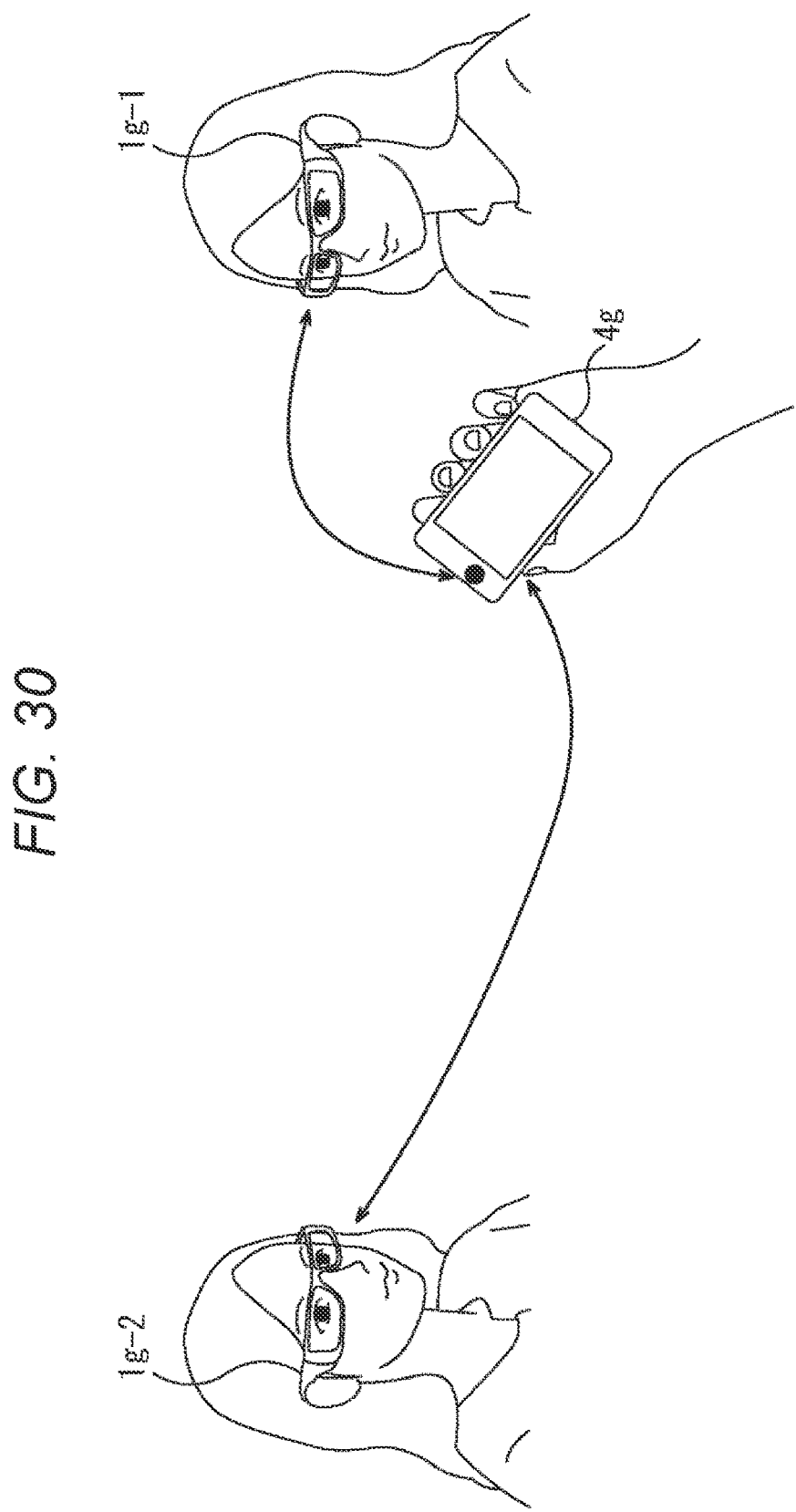
FIG. 30 is a view showing an image when another system is used.

FIG. 30 is a view for explaining the seventh embodiment. As shown in FIG. 30, there are two users in the real space, and these two users are individually wearing an HMD 1g-1 and an HMD 1g-2. It is assumed that a smartphone 4g belongs to a person wearing the HMD 1g-1. In the following description, the HMD 1g-1 may be described as own HMD 1g, and the HMD 1g-2 may be described as partner HMD 1g-1.

In a case where these two users share a virtual space, locations of the HMD 1g-1 and the HMD 1g-2 are specified by the smartphone 4g. For example, in a virtual space with the smartphone 4g as an origin, a location of the HMD 1g-1 and a location of the HMD 1g-2 in the virtual space are individually obtained by obtaining a locational relationship between the smartphone 4g and the HMD 1g-1 and a locational relationship between the smartphone 4g and the HMD 1g-2, and a content in the virtual space can be presented to the HMD 1g-1 and the HMD 1g-2.

As a configuration of the smartphone 4g that performs such processing, a configuration may be adopted in which two cameras are provided and processing is performed by using the two cameras, or a configuration may be adopted in which one camera is provided and processing is performed by using the one camera. As the seventh embodiment, a case where one camera is provided and processing is performed using the one camera will be described as an example.

Configuration Example of Smartphone and HMD in Seventh Embodiment

Figure 31:
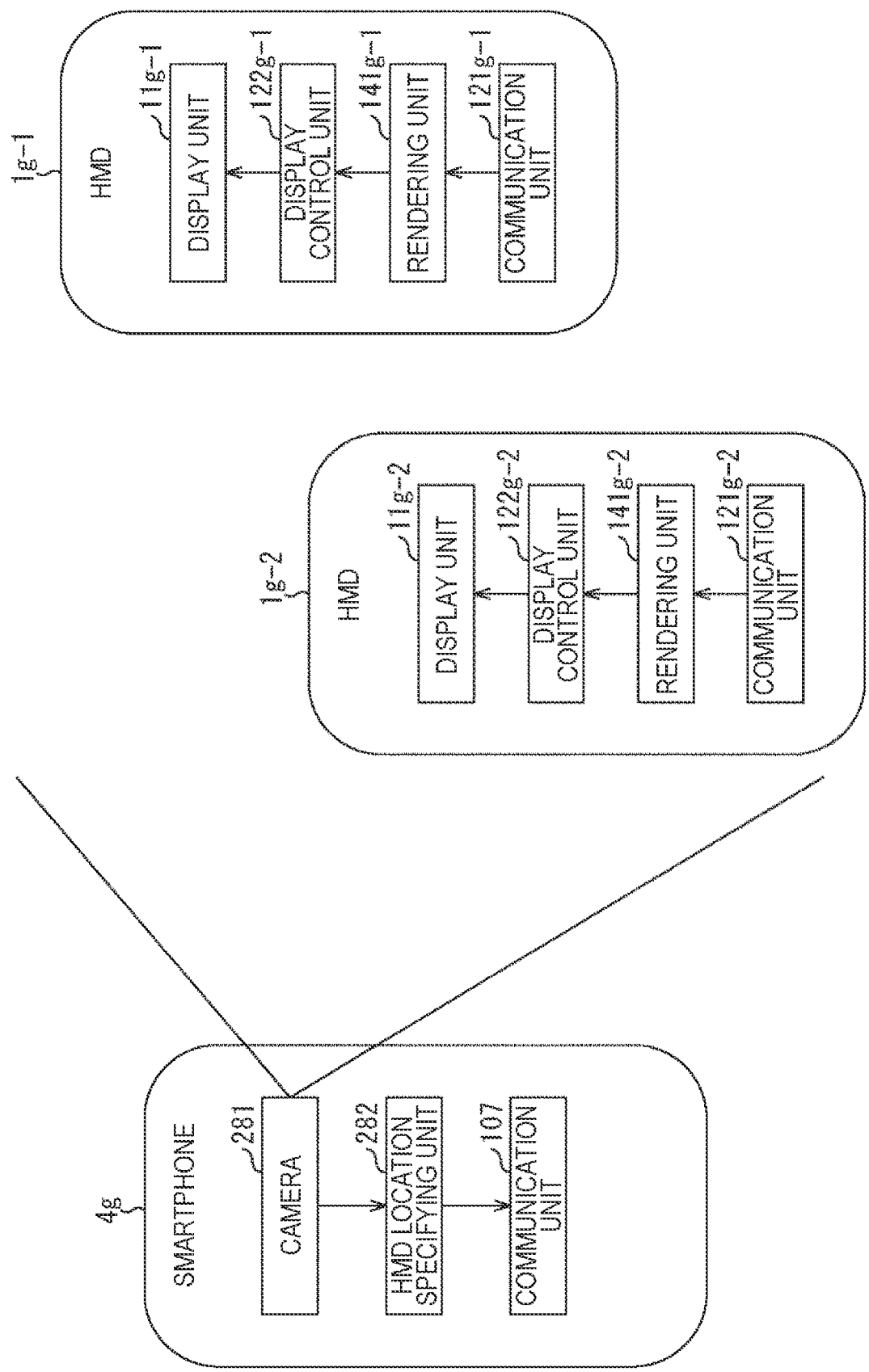
FIG. 31 is a diagram showing a configuration example of a smartphone and an HMD in a seventh embodiment.

FIG. 31 is a diagram showing configurations of the smartphone 4g and the HMD 1g in the seventh embodiment.

The smartphone 4g includes a camera 281, an HMD location specifying unit 282, and a communication unit 107. The camera 281 images the HMD 1g-1 and the HMD 1g-2. As shown in FIG. 31, the HMD 1g-1 and the HMD 1g-2 are located at locations to be simultaneously imaged by the camera 281. Note that, here, the description will be continued with two HMDs 1g as an example, but the present embodiment can be applied even to a plurality of the HMDs 1g of two or more.

Image data of images obtained by imaging the HMD 1g-1 and the HMD 1g-2 with the camera 281 is supplied to the HMD location specifying unit 282. The HMD location specifying unit 282 detects a plurality of the HMDs 1g imaged in the image, and individually specifies locations of the detected plurality of the HMDs 1g. In the example shown in FIG. 31, the HMD 1g-1 and the HMD 1g-2 are detected, and the location of the HMD 1g-1 and the location of the HMD 1g-2 are individually specified.

Location data of the specified locations is supplied to the communication unit 107. The communication unit 107 transmits location data regarding the HMD 1g-1 to the HMD 1g-1 and transmits location data regarding the HMD 1g-2 to the HMD 1g-2.

The description is continued assuming that the HMD 1g-1 and the HMD 1g-2 have the same configuration. In a case where it is not necessary to distinguish between the HMD 1g-1 and the HMD 1g-2, the description is simply made as the HMD 1g. Other portions will be described in a similar manner.

The HMD 1g includes a communication unit 121g, a rendering unit 141, a display control unit 122g, and a display unit 11g. This configuration is similar to the configuration of the HMD 1b in the second embodiment, in which location data is received, and an AR content is subjected to spatial localization rendering on the basis of the location data. Since processing of the HMD 1g is similar to the processing of the HMD 1b (processing of the flowchart shown in FIG. 16) in the second embodiment, the description thereof will be omitted.

Processing of Smartphone in Seventh Embodiment

Figure 32:
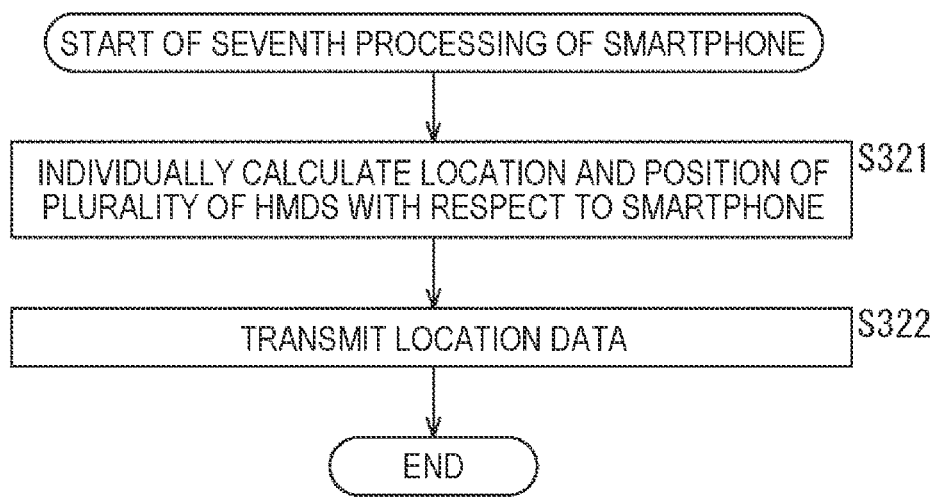
FIG. 32 is a flowchart for explaining processing of the smartphone in the seventh embodiment.

With reference to a flowchart shown in FIG. 32, processing of the smartphone 4g in the seventh embodiment will be described.

In step S321, the HMD location specifying unit 282 analyzes an image imaged by the camera 281, detects a plurality of the HMDs 1g, and individually calculates a location and a position of the HMD 1g with respect to the smartphone 4g.

In a case of a situation shown in FIG. 31, the HMD 1g-1 and the HMD 1g-2 are imaged by the camera 281, and the HMD 1g-1 and the HMD 1g-2 are individually detected in the images in which the HMD 1g-1 and the HMD 1g-2 are imaged. Then, a location of the HMD 1g-1 with respect to the smartphone 4g is calculated, and a location of the HMD 1g-2 with respect to the smartphone 4g is calculated.

By using the location of the smartphone 4g as a reference, the location of the HMD 1g-1 from the smartphone 4g and the location of the HMD 1g-2 from the smartphone 4g are individually calculated. A relative locational relationship between the HMD 1g-1 and the HMD 1g-2 can be obtained with the smartphone 4g as a reference.

The calculated location data is individually transmitted to the HMD 1g-1 and the HMD 1g-2 by the communication unit 107 in step S322. The HMD 1g-1 and the HMD 1g-2 individually receive location data regarding own locations and perform rendering based on that location data.

By performing such processing, a virtual space can be shared by the plurality of the HMDs 1g.

By combining the sixth embodiment and the seventh embodiment, the processing in the seventh embodiment may be executed when a plurality of the HMDs 1 is detected from an imaged image, and the processing in the sixth embodiment may be executed when one HMD 1 is detected.

Note that the seventh embodiment may be an embodiment obtained by combining any one or a plurality of the first to sixth embodiments.

Eighth Embodiment

As an eighth embodiment, as in the seventh embodiment, a description is given to a case where two cameras are provided and processing on a locational relationship with a plurality of the HMDs 1 is performed by using the two cameras.

Configuration Example of Smartphone and HMD in Eighth Embodiment

Figure 33:
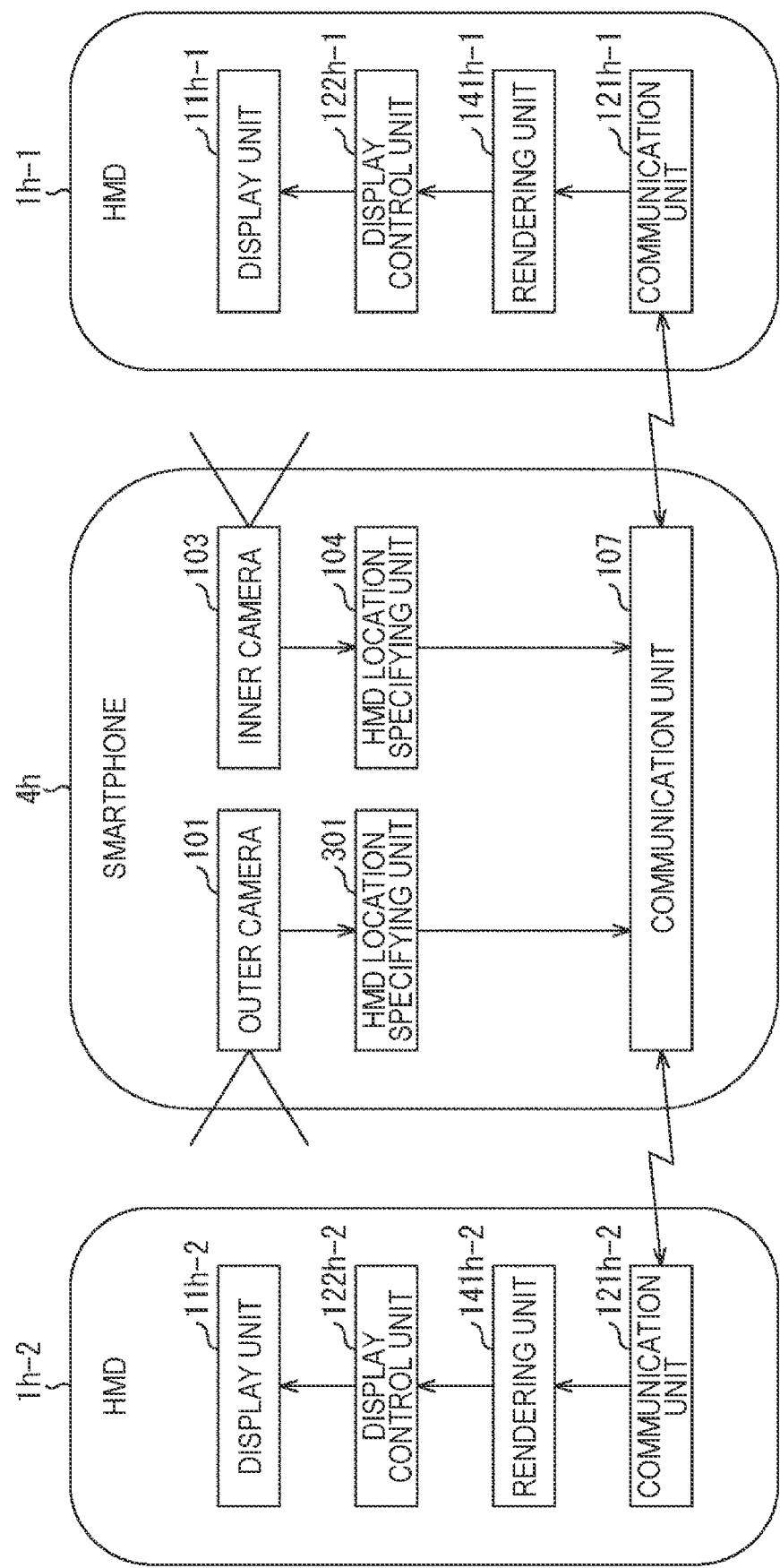
FIG. 33 is a diagram showing a configuration example of a smartphone and an HMD in an eighth embodiment.

FIG. 33 is a diagram showing configurations of a smartphone 4h and an HMD 1h in the eighth embodiment.

The smartphone 4h includes an outer camera 101, an HMD location specifying unit 301, an inner camera 103, an HMD location specifying unit 104, and a communication unit 107. As compared with the smartphone 4a (FIG. 6) in the first embodiment, the smartphone 4h is different in that a configuration is adopted in which the environment location specifying unit 102 is replaced with the HMD location specifying unit 301, and the location conversion unit 105 and the rendering unit 106 are omitted.

The outer camera 101 images an HMD 1h-2, and the inner camera 103 images an HMD 1h-1. Image data of an image imaged by the outer camera 101 is supplied to the HMD location specifying unit 301. Similarly, image data of an image imaged by the inner camera 103 is supplied to the HMD location specifying unit 104.

The HMD location specifying unit 301 detects the HMD 1h-2 imaged in the image and specifies a location of the detected HMD 1h-2. Similarly, the HMD location specifying unit 104 detects the HMD 1h-1 imaged in the image and specifies a location of the detected HMD 1h-1.

In the example shown in FIG. 33, the HMD 1h-1 and the HMD 1h-2 are individually imaged by different cameras, the HMD 1h-1 and the HMD 1h-2 are individually detected from images imaged by different cameras, and a location of the HMD 1h-1 and a location of the HMD 1h-2 are individually specified.

Location data of the specified locations is supplied to the communication unit 107. The communication unit 107 transmits location data regarding the HMD 1h-1 to the HMD 1h-1 and transmits location data regarding the HMD 1h-2 to the HMD 1h-2.

The description is continued assuming that the HMD 1h-1 and the HMD 1h-2 have the same configuration. The HMD 1h includes a communication unit 121h, a rendering unit 141, a display control unit 122h, and a display unit 11h. This configuration is similar to the configuration of the HMD 1b in the second embodiment, in which location data is received, and an AR content is subjected to spatial localization rendering on the basis of the location data. Since processing of the HMD 1h is similar to the processing of the HMD 1*b* (processing of the flowchart shown in FIG. 16) in the second embodiment, the description thereof will be omitted.

Processing of Smartphone in Eighth Embodiment

Figure 34:
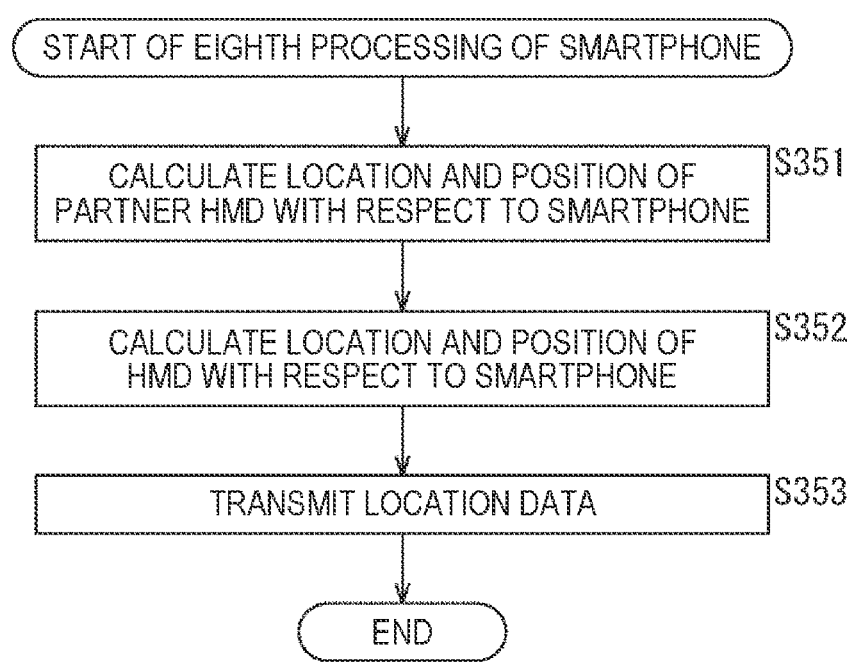
FIG. 34 is a flowchart for explaining processing of the smartphone in the eighth embodiment.

With reference to a flowchart shown in FIG. 34, processing of the smartphone 4*h* in the eighth embodiment will be described.

By step S351, the HMD location specifying unit 301 analyzes an image imaged by the outer camera 101, detects the HMD 1*h*-2 (the partner HMD 1*h*), and calculates a location and a position of the HMD 1*h*-2 with respect to the smartphone 4*h*.

By step S352, the HMD location specifying unit 104 analyzes an image imaged by the inner camera 103, detects the HMD 1*h*-1 (the own HMD 1*h*), and calculates a location and a position of the HMD 1*h*-1 with respect to the smartphone 4*h*.

By using the location of the smartphone 4*h* as a reference, the location of the HMD 1*h*-1 from the smartphone 4*h* and the location of the HMD 1*h*-2 from the smartphone 4*h* are individually calculated. In other words, a relative locational relationship between the HMD 1*h*-1 and the HMD 1*h*-2 is obtained with the smartphone 4*h* as a reference.

In step S353, the calculated location data is individually transmitted to the HMD 1*h*-1 and the HMD 1*h*-2 by the communication unit 107. The HMD 1*h*-1 and the HMD 1*h*-2 individually receive location data regarding own locations and perform rendering based on that location data.

Note that, here, the description has been given to a case where one HMD 1 is imaged by one camera as an example, but the seventh embodiment may be combined so that a plurality of the HMDs 1 may be imaged by one camera and locations of the plurality of the HMDs 1 may be specified.

That is, by combining the seventh embodiment and the eighth embodiment, a plurality of the HMDs 1 may be imaged by the outer camera 101, and the HMD location specifying unit 301 may specify locations of the plurality of the HMDs 1. Furthermore, the plurality of the HMDs 1 may be imaged by the inner camera 103, and locations of the plurality of the HMDs 1 may be specified by the HMD location specifying unit 104. By doing this way, it is possible to specify a location of the HMD 1 that covers 360 degrees around the smartphone 4*h*.

By performing such processing, a virtual space can be shared by the plurality of the HMDs 1*h*.

Note that the eighth embodiment may be an embodiment obtained by combining any one or a plurality of the first to seventh embodiments.

Ninth Embodiment

As a ninth embodiment, a description is given to an embodiment in which the second embodiment and the seventh embodiment are combined and locations of a plurality of HMDs 1 with respect to an environment are specified.

Configuration Example of Smartphone and HMD in Ninth Embodiment

Figure 35:
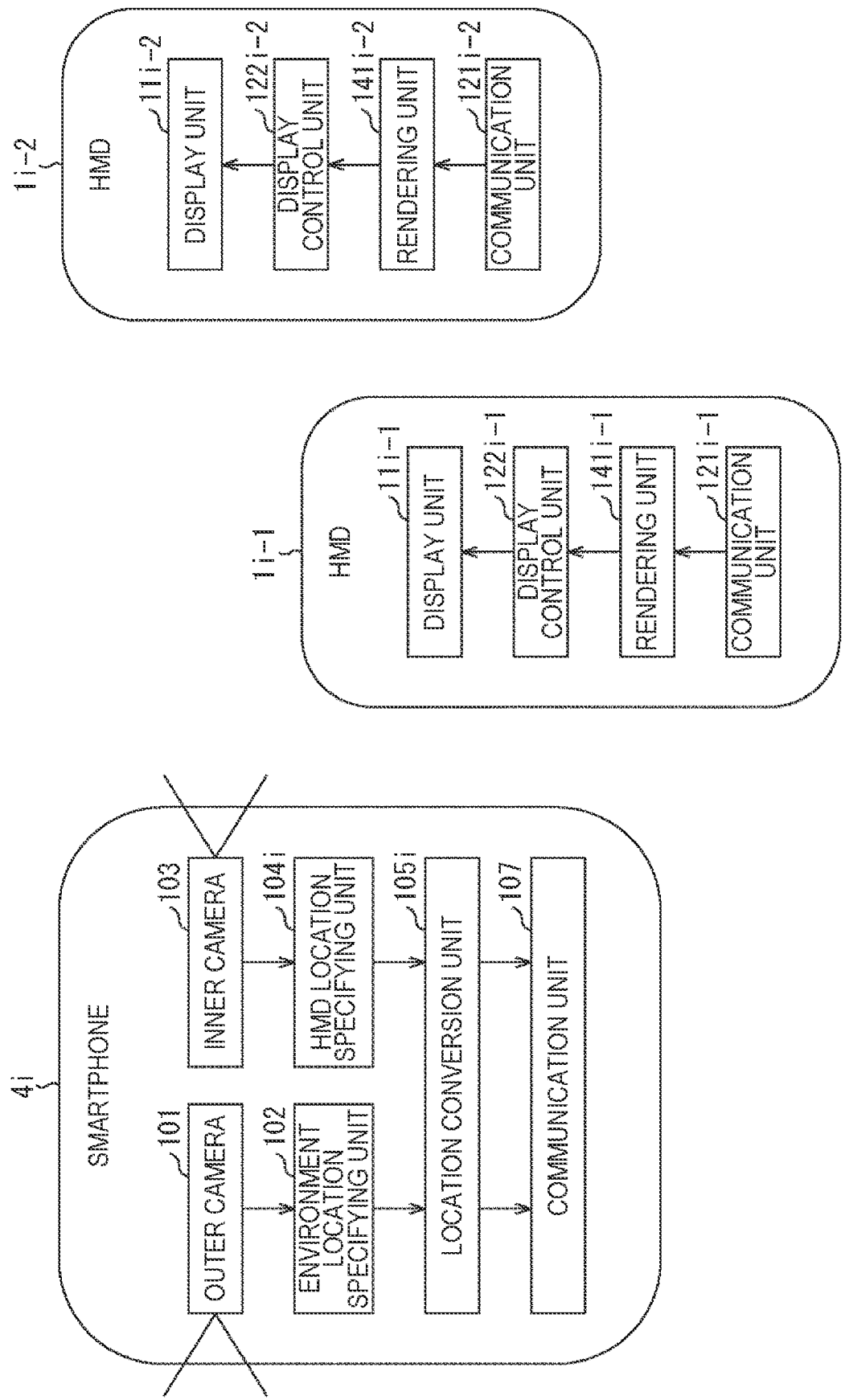
FIG. 35 is a diagram showing a configuration example of a smartphone and an HMD in a ninth embodiment.

FIG. 35 is a diagram showing configurations of a smartphone 4*h* and an HMD 1*h* in the ninth embodiment. A smartphone 4*i* has a configuration similar to that of the smartphone 4*b* (FIG. 13) in the second embodiment.

However, in a case where a plurality of HMDs 1*i* is imaged in an image imaged by an inner camera 103, an HMD location specifying unit 104*i* specifies each location of the plurality of HMDs 1*i*. Furthermore, in a case where a plurality of pieces of location data of the HMD 1*i* with respect to the smartphone 4*i* is supplied, a location conversion unit 105*i* converts a location for each piece of the location data. That is, the location conversion unit 105*i* generates a plurality of pieces of location data as location data of the HMD 1*i* with respect to the environment.

Location data of the specified locations is supplied to a communication unit 107. The communication unit 107 transmits location data regarding an HMD 1*i*-1 to the HMD 1*i*-1 and transmits location data regarding an HMD 1*i*-2 to the HMD 1*i*-2.

The description is continued assuming that the HMD 1*i*-1 and the HMD 1*i*-2 have the same configuration. The HMD 1*i* includes a communication unit 121*i*, a rendering unit 141, a display control unit 122*i*, and a display unit 11*i*. This configuration is similar to the configuration of the HMD 1*b* in the second embodiment, in which location data is received, and an AR content is subjected to spatial localization rendering on the basis of the location data. Since processing of the HMD 1*i* is similar to the processing of the HMD 1*b* (processing of the flowchart shown in FIG. 16) in the second embodiment, the description thereof will be omitted.

Processing of Smartphone in Ninth Embodiment

Figure 36:
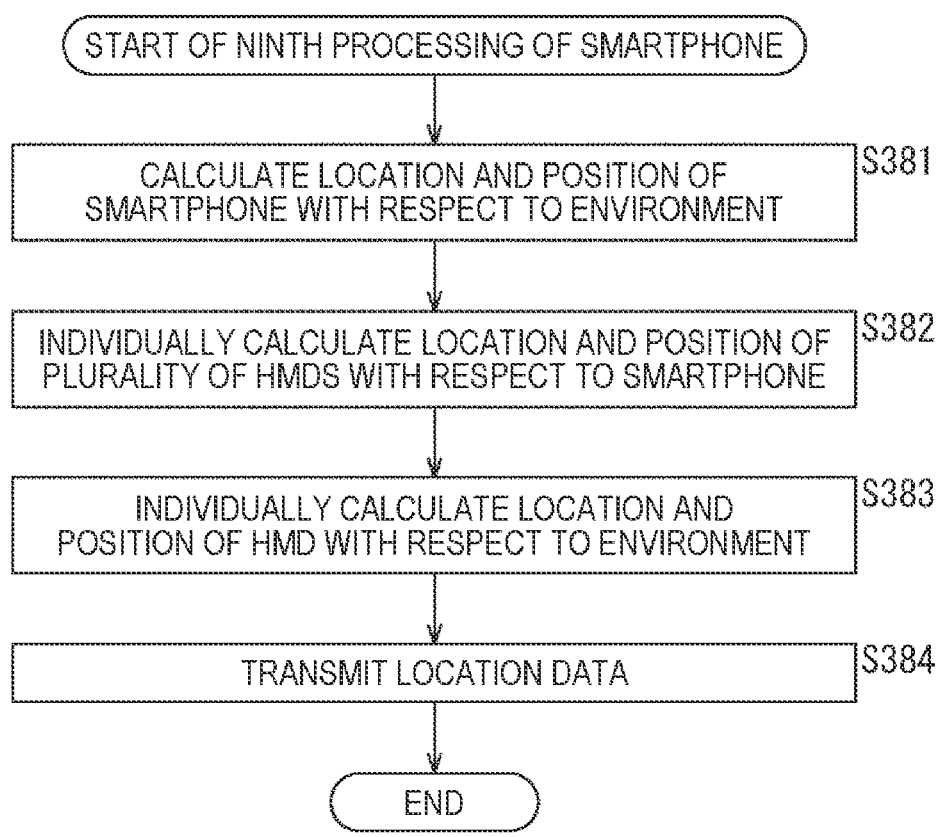
FIG. 36 is a flowchart for explaining processing of the smartphone in the ninth embodiment.

With reference to a flowchart shown in FIG. 36, processing of the smartphone 4*i* in the ninth embodiment will be described.

In step S381, an environment location specifying unit 102 analyzes an image obtained by imaging the environment with an outer camera 101, and calculates a location of the smartphone 4*i* with respect to the environment.

In step S382, the HMD location specifying unit 104*i* analyzes an image obtained by imaging the HMD 1*i* with the inner camera 103, and calculates a location of the HMD 1*i* with respect to the smartphone 4*i*. At this time, in a case where a plurality of the HMDs 1*i* is detected, the location of the HMD 1*i* with respect to the smartphone 4*i* is calculated for each of the plurality of the HMDs 1*i*. For example, in a case shown in FIG. 35, the location of the HMD 1*i*-1 with respect to the smartphone 4*i* and the location of the HMD 1*i*-2 with respect to the smartphone 4*i* are individually specified.

In step S383, the location conversion unit 105*i* uses the location data of the smartphone 4*i* with respect to the environment from the environment location specifying unit 102 and the location data of the HMD 1*i* with respect to the smartphone 4*i* from the HMD location specifying unit 104*i*, to calculate a location and a position of the HMD 1*i* with respect to the environment. At this time, in a case where a plurality of pieces of location data of the HMDs 1*i* with respect to the smartphone 4*i* is supplied, the location of the HMD 1*i* with respect to the environment is calculated for each of the plurality of the HMDs 1*i*. For example, in a case shown in FIG. 35, the location of the HMD 1*i*-1 with respect to the environment and the location of the HMD 1*i*-2 with respect to the environment are individually specified.

In this way, by imaging the environment with one camera and imaging a plurality of the HMDs 1*i* with another camera, the location with respect to the environment can be specified for each of the plurality of the HMDs 1*i*. Therefore, the same virtual space can be shared by a plurality of the HMDs 1*i*.

Note that the ninth embodiment may be an embodiment obtained by combining any one or a plurality of the first to eighth embodiments.

Tenth Embodiment

Figure 37:
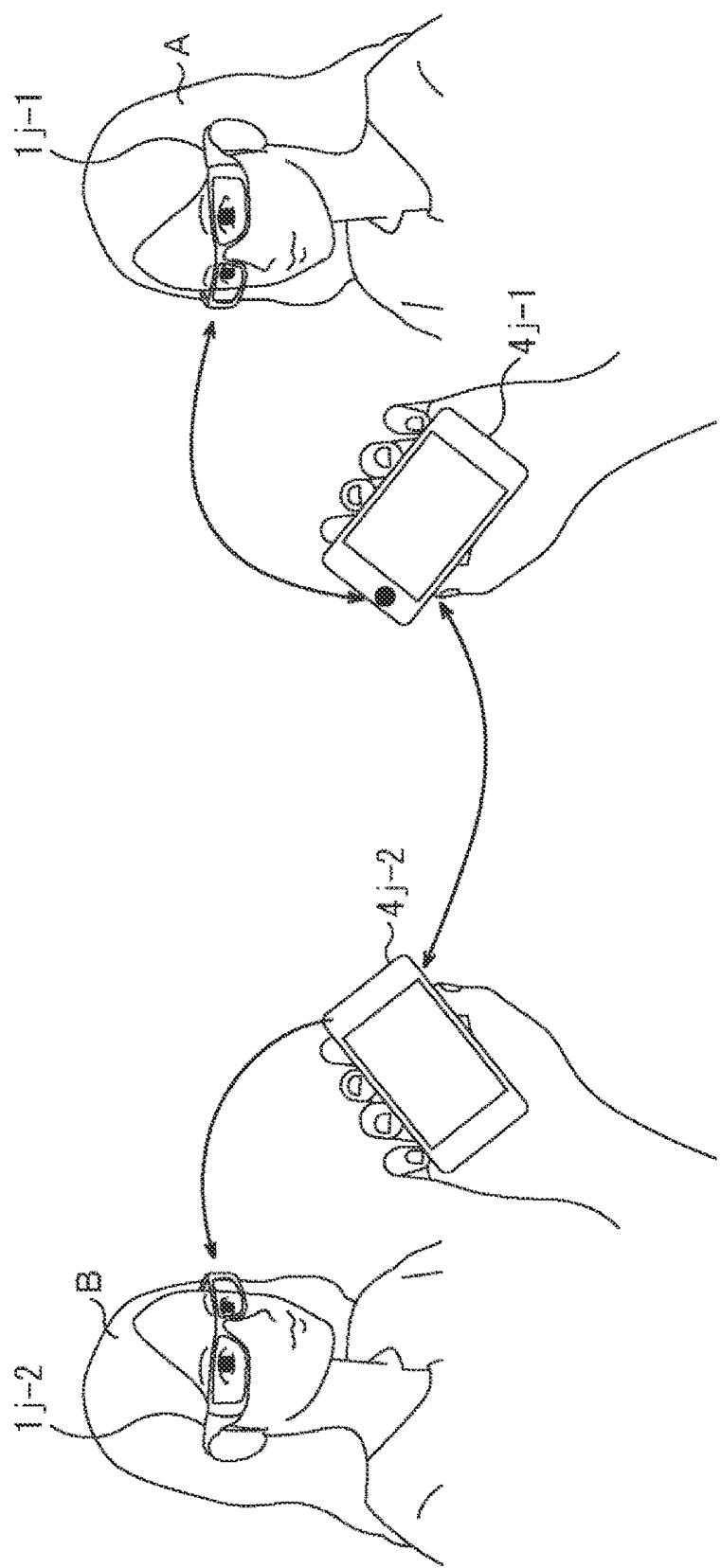
FIG. 37 is a view showing an image when another system is used.

As a tenth embodiment, an embodiment in which locations of a plurality of HMDs 1 are specified by using a plurality of smartphones 4 will be described. As shown in FIG. 37, a case where two users A and B share a virtual space will be described as an example.

The user A wears an HMD 1*j*-1 and holds a smartphone 4*j*-1. A location of the HMD 1*j*-1 worn by the user A is calculated by the smartphone 4*j*-1.

The user B wears an HMD 1*j*-2 and holds a smartphone 4*j*-2. A location of the HMD 1*j*-2 worn by the user B is calculated by the smartphone 4*j*-2.

The smartphone 4*j*-1 calculates a location of the smartphone 4*j*-2. The smartphone 4*j*-2 calculates a location of the smartphone 4*j*-1. That is, each other's locations of the smartphones 4*j* are calculated by each other.

Here, a description is given with, as an example, a case where an AR space (a virtual space) is localized in coordinates with the smartphone 4*j*-1 as a reference, but the smartphone 4*j*-2 can also be used as the reference. Furthermore, here, a case where there are two smartphones 4 will be described as an example, but the present embodiment can be applied even in a case where there are two or more smartphones 4.

Figure 38:
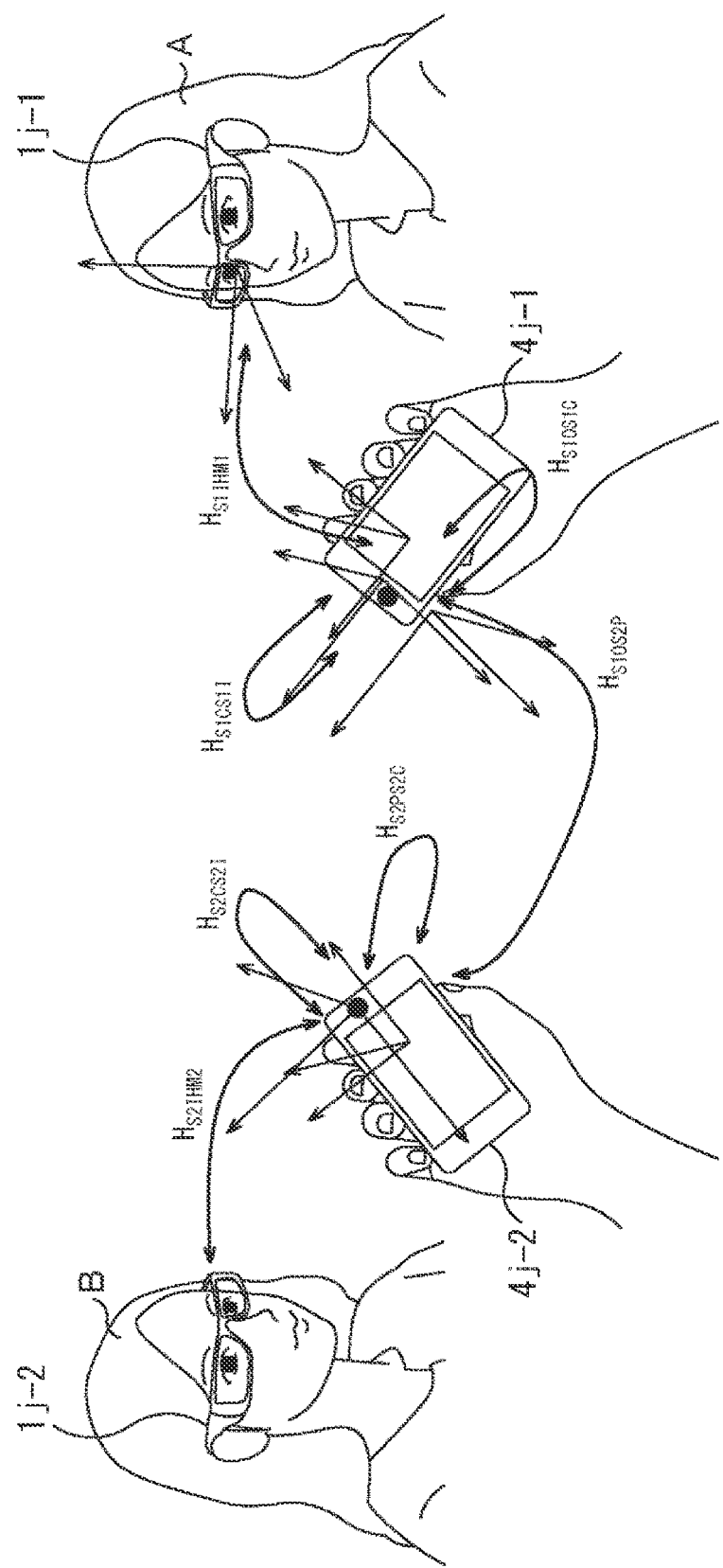
FIG. 38 is a view for explaining another coordinate transformation.

Here, calculation of a location will be specifically described with reference to FIG. 38. An appearance recognition origin of the smartphone 4*j*-2 is defined as an appearance recognition origin S2P. This appearance recognition origin S2P can be a location of an outer camera 101*j*-2 (FIG. 39) of the smartphone 4*j*-2.

Furthermore, here, as described with reference to FIG. 10, a description will be given to, as an example, a case where a predetermined location (for example, a center of a display) of the smartphone 4*j*-1 is set as a virtual origin S1C, and each location of the smartphone 4*j*-1 is specified by using the virtual origin. Furthermore, similarly, a description will be given to, as an example, a case where a predetermined location (for example, a center of a display) of the smartphone 4*j*-2 is set as a virtual origin S2C, and each location of the smartphone 4*j*-2 is specified by using the virtual origin.

The smartphone 4*j*-1 calculates a location HS1CHM1 of the HMD 1*j*-1 with respect to the virtual origin S1C of the smartphone 4*j*-1. H of this location HS1CHM1 represents a matrix H (this similarly applies hereinafter), S1C represents the virtual origin S1C of the smartphone 4*j*-1, and HM1 represents the HMD 1*j*-1. The location HS1CHM1 is calculated by multiplying a location HS1CS1I by a location HS1IHM1.

location HS1CHM1=location HS1CS1I−location HS1IHM1  (7)

The location HS1CS1I is a location of an inner camera 103*j*-1 (FIG. 39) with respect to the virtual origin SiC of the smartphone 4*j*-1, and S1I of the location HS1CS1I represents the inner camera 103*j*-1. The location HS1IHM1 is a location of the HMD 1*j*-1 with respect to the inner camera 103*j*-1 of the smartphone 4*j*-1.

The smartphone 4*j*-1 also calculates a location HS1CS2C of the smartphone 4*j*-2 with respect to the smartphone 4*j*-1. The location HS1CS2C is calculated by multiplying a location HS1OS2P, a location HS1CS1O, and a location S2PS2C.

location HS1CS2C=location HS1CS1O×location HS1OS2P×location S2PS2C  (8)

The location HS1CS1O is a location of an outer camera 101*j*-1 (FIG. 39) with respect to the virtual origin SiC of the smartphone 4*j*-1, and S1O of the location HS1CS1O represents the outer camera 101*j*-1. The location HS1OS2P is a location of the appearance recognition origin S2P of the smartphone 4*j*-2 with respect to the outer camera 101*j*-1 of the smartphone 4*j*-2. The location S2PS2C is a location of the virtual origin S2C set in the smartphone 4*j*-2 with respect to the appearance recognition origin S2P of the smartphone 4*j*-2.

When the smartphone 4*j*-1 calculates the location HS1CS2C of the smartphone 4*j*-2 with respect to the smartphone 4*j*-1 on the basis of Equation (8), the location S2PS2C is multiplied, which is the location of the virtual origin S2C set in the smartphone 4*j*-2 with respect to the appearance recognition origin S2P of the smartphone 4*j*-2. This location S2PS2C is supplied from the smartphone 4*j*-2.

The smartphone 4*j*-2 calculates a location HS2CHM2 of the HMD 1*j*-2 with respect to the virtual origin S2C of the smartphone 4*j*-2. S2C of this location HS2CHM2 represents the virtual origin S2C of the smartphone 4*j*-2, and HM2 represents the HMD 1*j*-2. The location HS2CHM2 is calculated by multiplying a location HS2CS2I by a location HS2IHM2.

location HS2IHM2=location HS2CS2I×location HS2IHM2  (9)

The location HS2CS2I is a location of an inner camera 103*j*-2 (FIG. 39) with respect to the virtual origin S2C of the smartphone 4*j*-2, and S2I of the location HS2CS2I represents the inner camera 103*j*-2. The location HS2IHM2 is a location of the HMD 1*j*-2 with respect to the inner camera 103*j*-2 of the smartphone 4*j*-2.

The smartphone 4*j*-1 uses these pieces of location data to calculate a location HHM1HM2 of the HMD 1*j*-2 with respect to the HMD 1*j*-1. The location HHM1HM2 is obtained by multiplying: (location HS1CHM1)$^{-1}$=location HHM1S1C, which is a reciprocal of the location HS1CHM1 obtained by Equation (7); the location HS1CS2C obtained by Equation (8); and the location HS2IHM2 obtained by Equation (9).

location HHM1HM2=location HHM1S1C×location HS1CS2C−location HS2IHM2  (10)

In this way, the smartphone 4*j*-1 calculates the location of the HMD 1*j*-2 with respect to the HMD 1*j*-1. Similarly, the smartphone 4*j*-2 calculates the location of the HMD 1*j*-1 with respect to the HMD 1*j*-2. Therefore, the HMD 1*j*-1 and the HMD 1*j*-2 can grasp a locational relationship with each other.

Configuration Example of Smartphone and HMD in Tenth Embodiment

Figure 39:
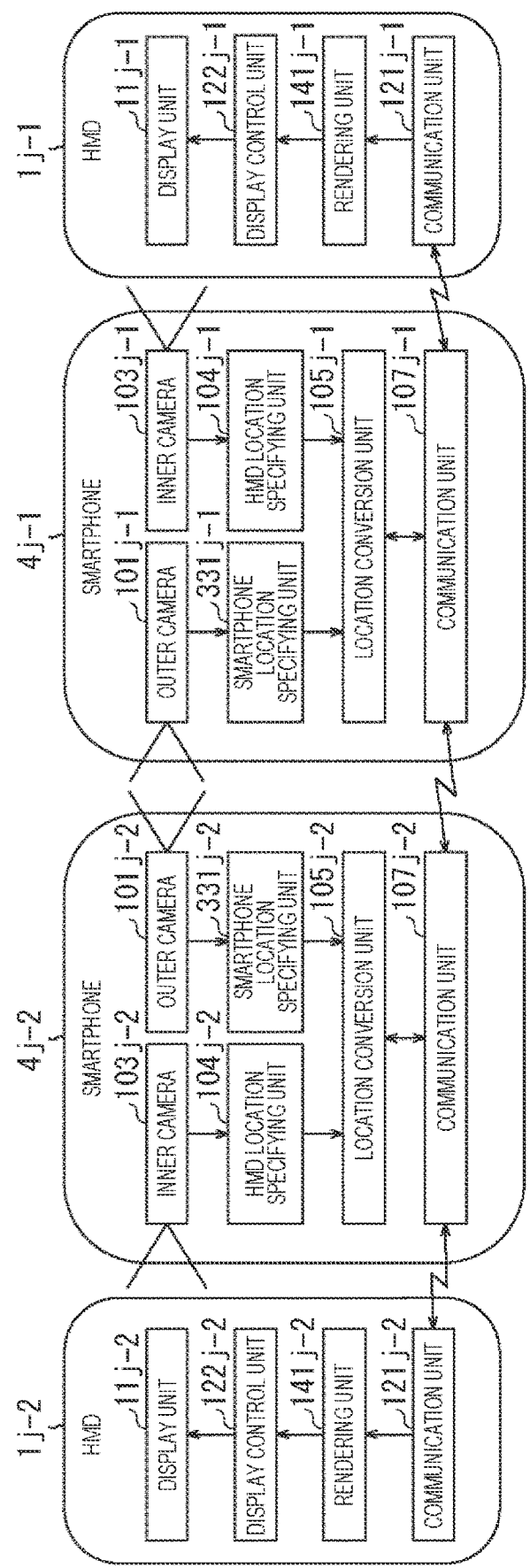
FIG. 39 is a diagram showing a configuration example of a smartphone and an HMD in a tenth embodiment.

FIG. 39 is a diagram showing configurations of the smartphone 4*j* and the HMD 1*j* in the tenth embodiment. The smartphone 4*j* has a configuration similar to that of the smartphone 4*b* (FIG. 13) in the second embodiment.

However, there is a difference in that, since the outer camera 101*j* images a partner smartphone 4*j* and specifies a location of the partner smartphone 4*j*, a processing unit that processes image data from the outer camera 101*j* is a smartphone location specifying unit 331*j*.

There is also a difference in that a location conversion unit 105*j* calculates a location of the partner HMD 1*j* with respect to the own HMD 1*j* by using location data of the partner smartphone 4*j* specified by the smartphone location specifying unit 331*j*, location data of the own HMD 1*j* specified by the HMD location specifying unit 104*j*, and location data supplied from the smartphone 4*j*-2 via a communication unit 107*j*-1.

Location data of the specified location is supplied to the communication unit 107*j*. The communication unit 107*j*-1 transmits location data regarding the HMD 1*j*-1 to the HMD 1*j*-1, and transmits location data regarding the HMD 1*j*-1 necessary for the HMD 1*j*-2 to specify the location to the HMD 1*j*-2.

The description is continued assuming that the HMD 1*j*-1 and the HMD 1*j*-2 have the same configuration. The HMD 1*j* includes a communication unit 121*j*, a rendering unit 141*j*, a display control unit 122*j*, and a display unit 11*j*. This configuration is similar to the configuration of the HMD 1*b* in the second embodiment, in which location data is received, and an AR content is subjected to spatial localization rendering on the basis of the location data. Since processing of the HMD 1*j* is similar to the processing of the HMD 1*b* (processing of the flowchart shown in FIG. 16) in the second embodiment, the description thereof will be omitted.

Processing of Smartphone in Tenth Embodiment

Figure 40:
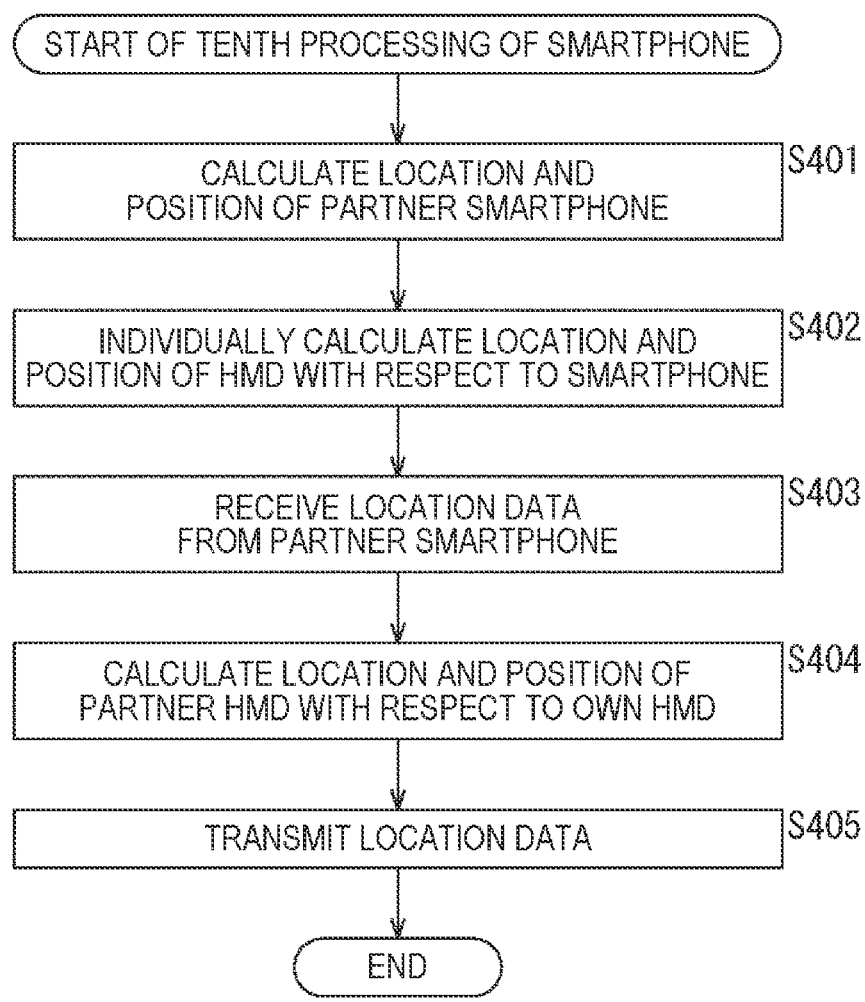
FIG. 40 is a flowchart for explaining processing of the smartphone in the tenth embodiment.

With reference to a flowchart shown in FIG. 40, processing of the smartphone 4*j* in the tenth embodiment will be described.

In step S401, the smartphone location specifying unit 331*j* analyzes an image obtained by imaging the partner smartphone 4*j* imaged by the outer camera 101*j*, and calculates a location of the partner smartphone 4*j* with respect to the self.

In step S402, the HMD location specifying unit 104*j* analyzes an image obtained by imaging the HMD 1*j* imaged by an inner camera 103*j*, and calculates a location of the HMD 1*j* with respect to the smartphone 4*j*.

In step S403, the location conversion unit 105*j* acquires location data regarding the partner HMD 1*j* and received by the communication unit 107*j*, from the partner smartphone 4*j*.

In step S404, the location conversion unit 105*j* calculates a location of the partner HMD 1*j* with respect to the own HMD 1*j*, by using the location data from the smartphone location specifying unit 331*j*, the location data from the HMD location specifying unit 104*j*, and the location data supplied via the communication unit 107*j*. The calculated location data is individually transmitted to the own HMD 1*j* and the partner HMD 1*j* by the communication unit 107 in step S405.

In this way, by the two smartphones 4*j* cooperating and specifying the locations of the plurality of the HMDs 1*j*, the same virtual space can be shared by the plurality of the HMDs 1*j*.

The smartphone 4*j* in the tenth embodiment specifies the location of the partner smartphone 4, not a location of the partner HMD 1*j*.

For example, in a case where the smartphone 4*j*-1 specifies the location of the partner HMD 1*j*-2 (in a case where location data is transmitted directly to the partner HMD 1*j*-2), the smartphone 4*j*-1 needs to recognize (authenticate and register) the partner HMD 1*j*-2 before the processing starts.

It is considered that processing for the smartphone 4*j*-1 to register the smartphone 4*j*-2 can be performed more easily than processing for the smartphone 4*j*-1 to register the HMD 1*j*-2. In other words, registration between the smartphones 4 is considered to be easier than registration between the smartphone 4 and a terminal other than smartphone 4.

Furthermore, for example, in a case where the smartphone 4*j*-1 is configured to specify the location of the partner HMD 1*j*-2, the smartphone 4*j*-1 needs to capture the HMD 1*j*-2. In a case of processing in which the smartphone 4*j*-1 needs to capture the HMD 1*j*-2, a range in which the HMD 1*j*-2 can move, in other words, a range in which the user B wearing the HMD 1*j*-2 can move, may be limited.

However, according to the tenth embodiment, since the smartphone 4*j*-1 only needs to capture the smartphone 4*j*-2, a range in which the user B wearing the HMD 1*j*-2 can move is wider than in a case of processing in which the smartphone 4*j*-1 needs to capture the HMD 1*j*-2.

For example, since a state will continue in which the smartphones 4*j* capture each other in a case where the smartphone 4*j*-1 and the smartphone 4*j*-2 are fixed at locations where they can capture each other, a range restricted as a movable range of (the user wearing) the HMD 1*j* can be eliminated without limit.

Note that the tenth embodiment may be an embodiment obtained by combining any one or a plurality of the first to ninth embodiments. By combining the first to tenth embodiments, it is also possible to perform spatial localization for the environment in a case where a configuration is adopted in which the environment can be captured.

Furthermore, in a case where a system configuration including a plurality of motion sensors is obtained by combining the first to tenth embodiments, it is also possible to achieve camera shake correction and the like of a predetermined device by linking the plurality of motion sensors. Especially when a smartphone is used while being held by a hand, it is assumed that there will be camera shake, so that such camera shake correction with the plurality of motion sensors being linked is to be an effective means for correcting camera shake.

Eleventh Embodiment

In the first to tenth embodiments, the description has been given with an example in which imaging is performed by the camera provided in the smartphone 4, and a location of the HMD 1 is specified by using the imaged image. One of the outer camera 101 or the inner camera 103 included in the smartphone 4 may be replaced with a camera provided to a terminal other than the smartphone 4. Furthermore, the processing described as the first to tenth embodiments can be executed by using the camera of the terminal other than the smartphone 4.

Figure 41:
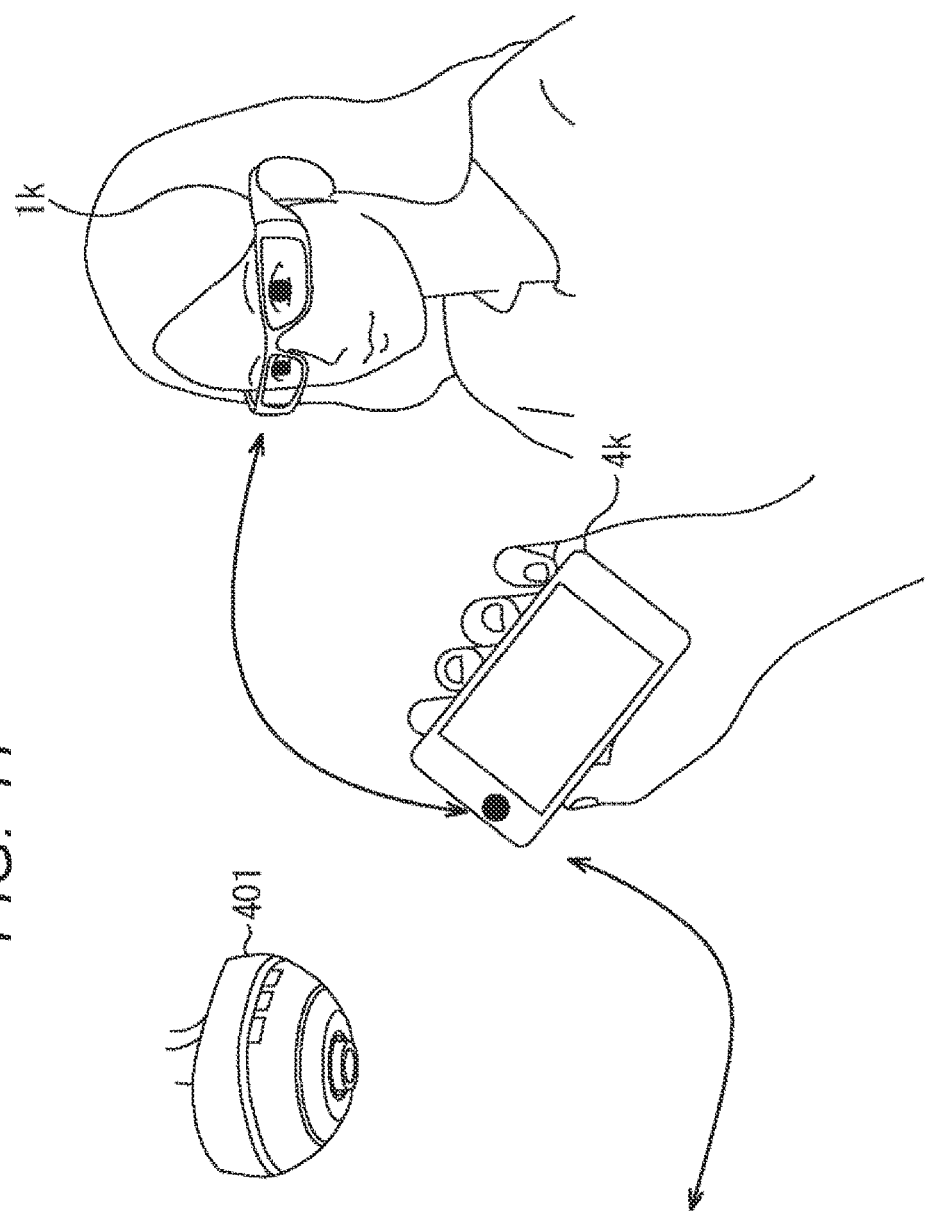
FIG. 41 is a view showing an image when another system is used.

Furthermore, as an eleventh embodiment, a case where a camera provided to a terminal other than a smartphone 4 is also used will be described. As shown in FIG. 41, the eleventh embodiment is a state in which a smartphone 4*k* is held by a user and an HMD 1 is imaged by the smartphone 4*k*. Furthermore, the smartphone 4*k* is in a state of being imaged by an external terminal 401.

The external terminal 401 is a camera installed in a predetermined space in a real world, for example, a facility such as a store, a museum, or a station. Here, the description is continued assuming that the external terminal 401 is installed in a facility where there is a plurality of stores on one floor. The external terminal 401 is connected to, for example, an information processing apparatus 2 (FIG. 1), and is configured to be able to acquire information in the facility, such as locations of stores, locations of toilets, and information on products handled by each store.

Figure 42:
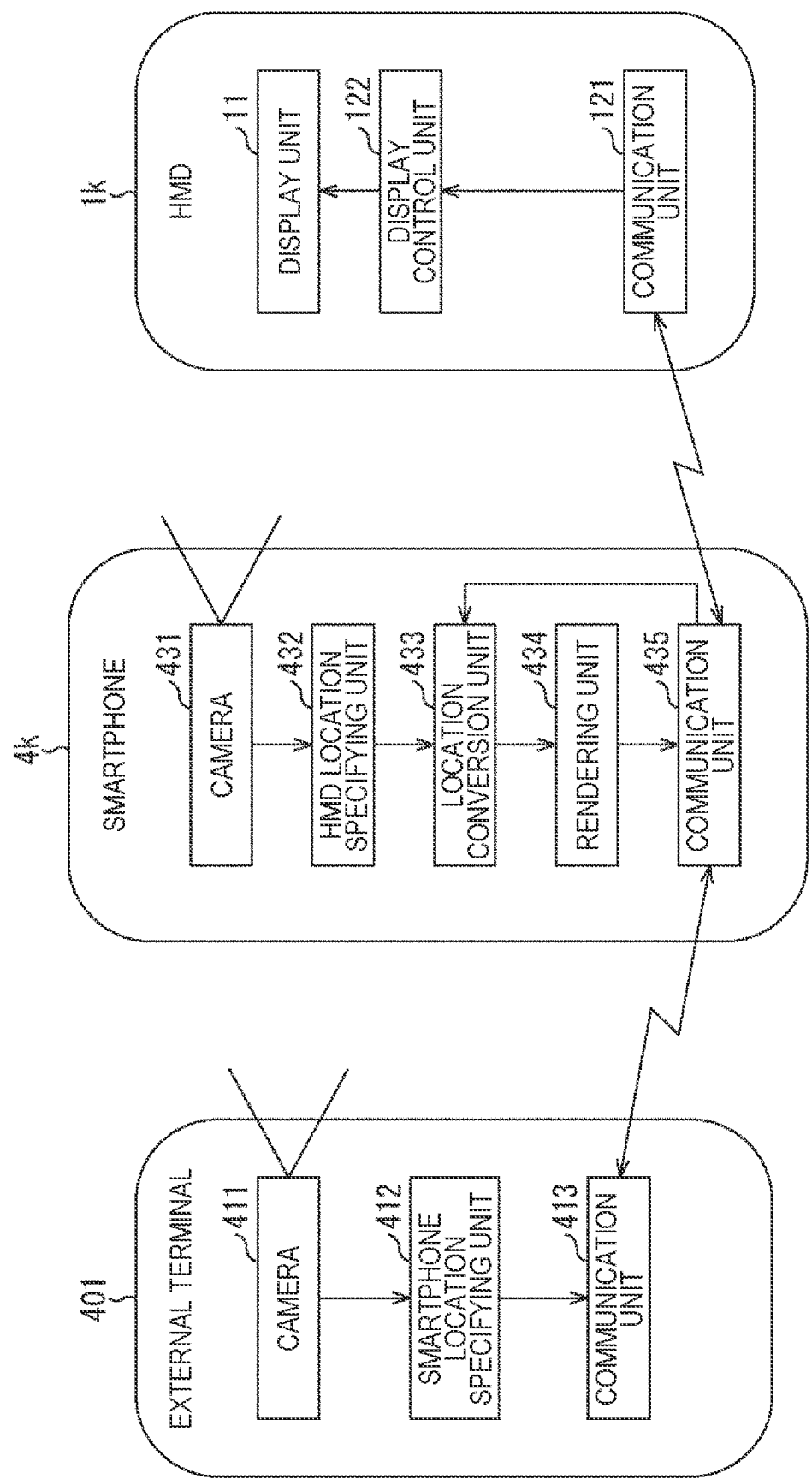
FIG. 42 is a diagram showing a configuration example of a smartphone, an HMD, and an external terminal in an eleventh embodiment.

Configuration Example of External Terminal, Smartphone, and HMD in Eleventh Embodiment FIG. 42 is a diagram showing a configuration of the external terminal 401, the smartphone 4k, and an HMD 1k in the eleventh embodiment.

The external terminal 401 includes a camera 411, a smartphone location specifying unit 412, and a communication unit 413. The external terminal 401 has, for example, a function corresponding to the outer camera 101 and the environment location specifying unit 102 of the smartphone 4a (FIG. 6) in the first embodiment. That is, the camera 411 of the external terminal 401 images the smartphone 4k and supplies image data to the smartphone location specifying unit 412.

The smartphone location specifying unit 412 specifies a location of the smartphone 4k in the real space. In other words, the smartphone location specifying unit 412 specifies a location of the smartphone 4k with respect to an environment. Location data regarding the specified location is transmitted to the smartphone 4k by the communication unit 413.

The location of the smartphone 4k with respect to the environment has been specified by the environment location specifying unit 102 of the smartphone 4a (FIG. 6) in the first embodiment, but is specified by the external terminal 401 in the eleventh embodiment.

The smartphone 4k includes a camera 431, an HMD location specifying unit 432, a location conversion unit 433, a rendering unit 434, and a communication unit 435. In a case of being compared with the smartphone 4a (FIG. 6) in the first embodiment, the camera 431 corresponds to the inner camera 103, the HMD location specifying unit 432 corresponds to the HMD location specifying unit 104, the location conversion unit 433 corresponds to the location conversion unit 105, the rendering unit 434 corresponds to the rendering unit 106, and the communication unit 435 corresponds to the communication unit 107.

The camera 431 images the HMD 1k and supplies image data to the HMD location specifying unit 432. The HMD location specifying unit 432 specifies a location of the HMD 1k with respect to the smartphone 4k. Location data regarding the specified location is supplied to the location conversion unit 433.

The location conversion unit 433 is also supplied with location data of the smartphone 4k with respect to the environment transmitted from the external terminal 401 via the communication unit 435. The location conversion unit 433 specifies a location of the HMD 1k with respect to the environment, and supplies location data to the rendering unit 434.

The rendering unit 434 generates image data in which an AR content is subjected to spatial localization rendering, and supplies to the communication unit 435. The communication unit 435 transmits the image data to the HMD 1k.

Here, the description is continued assuming that the smartphone 4k is provided with the rendering unit 434, but the HMD 1k may include a rendering unit 141k (not illustrated) as in the HMD 1j of the tenth embodiment. Furthermore, in a case of a configuration in which the HMD 1k includes the rendering unit 141k, location data supplied from the external terminal 401 can be supplied to the HMD 1k.

The HMD 1k includes a communication unit 121, a display control unit 122, and a display unit 11. This configuration is similar to the configuration of the HMD 1a in the first embodiment, in which image data is received, and displaying of an image by the display unit 11 is controlled on the basis of the image data. Since processing of the HMD 1k is similar to the processing of the HMD 1a (processing of the flowchart shown in FIG. 12) in the first embodiment, the description thereof will be omitted.

Processing of External Terminal in Eleventh Embodiment

Figure 43:
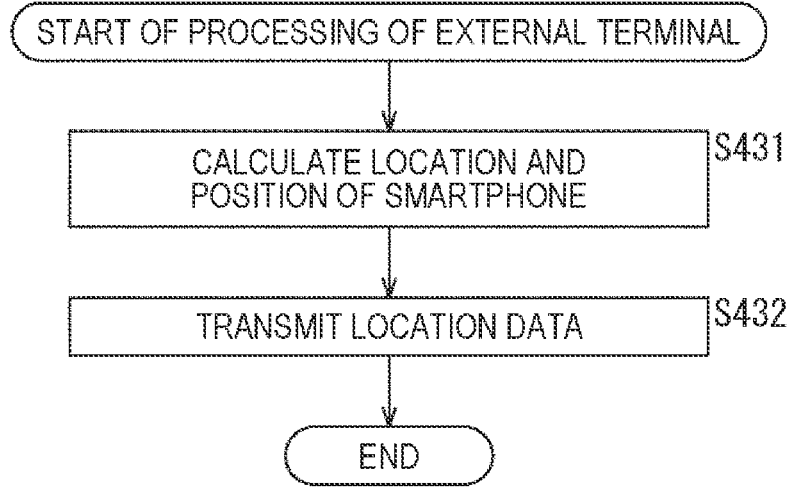
FIG. 43 is a flowchart for explaining processing of the external terminal in the eleventh embodiment.

Processing of the external terminal 401 will be described with reference to a flowchart shown in FIG. 43.

In step S431, the smartphone location specifying unit 412 analyzes an image imaged by the camera 411, detects the smartphone 4k, and specifies a location of the smartphone 4k with respect to the environment. Location data regarding the specified location is supplied to the communication unit 413.

In step S432, the communication unit 413 transmits the location data to the smartphone 4k.

Processing of Smartphone in Eleventh Embodiment

Figure 44:
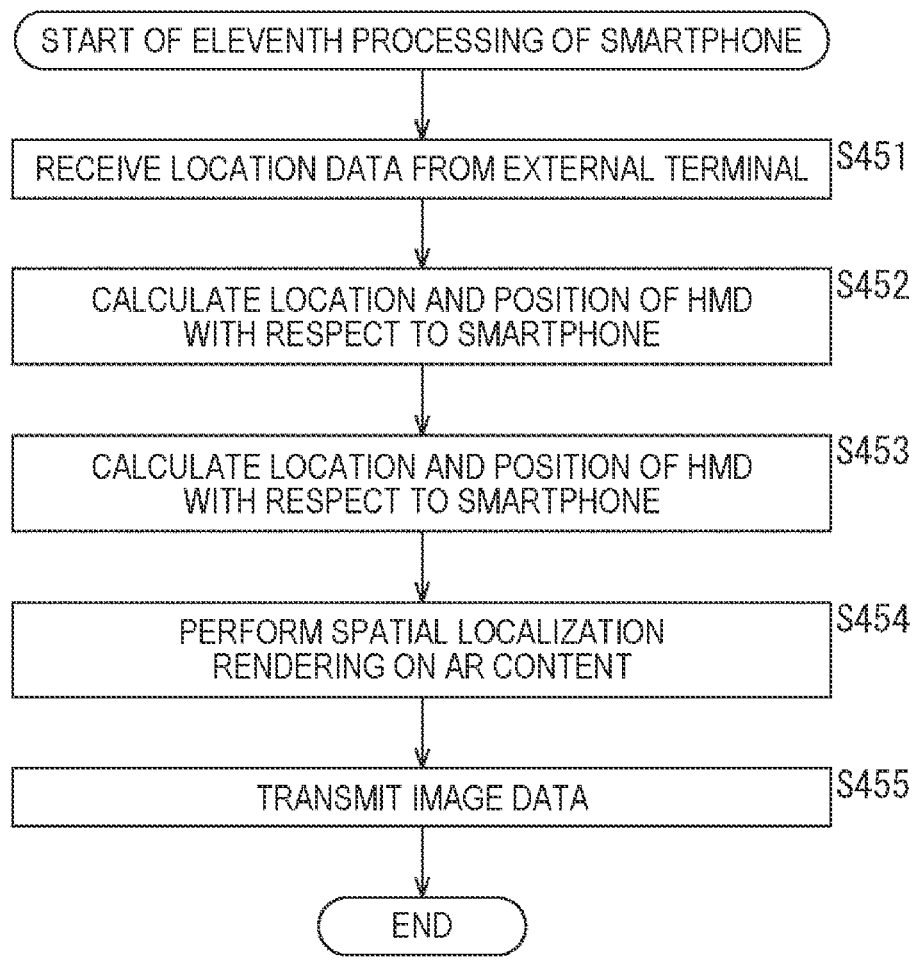
FIG. 44 is a flowchart for explaining processing of the smartphone in the eleventh embodiment.

Processing of the smartphone 4k will be described with reference to a flowchart shown in FIG. 44.

In step S451, the communication unit 435 of the smartphone 4k receives location data transmitted from the external terminal 401. The location data received by the communication unit 435 is supplied to the location conversion unit 433.

In step S452, the HMD location specifying unit 432 analyzes an image imaged by the camera 431, detects the HMD 1k, and specifies a location of the HMD 1k with respect to the smartphone 4k. Location data regarding the specified location is supplied to the location conversion unit 433.

Note that orders of processes in step S451 and step S452 may be switched. That is, while the HMD location specifying unit 432 specifies the location of the HMD 1k with respect to the smartphone 4k, the location data transmitted from the external terminal 401 may be received by the communication unit 435, and the processing by the location conversion unit 433 may be executed.

In step S453, the location conversion unit 433 specifies a location of the HMD 1k with respect to the environment by using the location data of the smartphone 4k with respect to the environment transmitted from the external terminal 401 via the communication unit 435 and the location data of the HMD 1k with respect to the smartphone 4k supplied from the HMD location specifying unit 432. Location data of the specified location is supplied to the rendering unit 434.

In step S454, the rendering unit 434 executes processing of spatial localization rendering on an AR content by using the location data from the location conversion unit 433, and generates image data. At this time, an image is generated in which, as the AR content, if necessary, information directly transmitted or transmitted via the external terminal 401 from the information processing apparatus 2 is also provided to the user. For example, information on products in a viewing direction, information regarding a location of a toilet, and the like are provided to the user.

In step S455, the communication unit 435 transmits the image data to the HMD 1k.

In this way, the smartphone 4k can be captured by the external terminal 401 different from the smartphone 4k and the HMD 1k, and the location of the HMD 1k with respect to the environment can be specified.

In a case where a plurality of the smartphones 4k is imaged at the same time, the external terminal 401 can generate and supply location data for each smartphone 4k. Therefore, a virtual space can be shared by a plurality of the HMDs 1ks paired with the plurality of the smartphones 4k whose locations are specified by the external terminal 401 installed in a predetermined space.

For example, a virtual screen can be provided as the AR content, and a plurality of users can enjoy the content displayed on the virtual screen at the same time. Furthermore, as described above, it is also possible to individually provide information required by the user, such as, for example, product information. Furthermore, for example, it is possible to provide information on availability of seats in a store.

Note that the eleventh embodiment may be an embodiment obtained by combining any one or a plurality of the first to tenth embodiments.

In the first to eleventh embodiments described above, not only a movement of the HMD may be captured by the camera, but also a movement of a line-of-sight of a user may be captured. By capturing the line-of-sight of the user, it becomes possible to perform rendering in accordance with the line-of-sight, and accuracy of spatial localization can be further improved.

Note that, in the embodiments described above, a case where the present technology is applied to the display device called the HMD 1 has been described as an example, but it is also possible to provide generated location data to a device other than the display device. For example, the location data may be provided to an audio device such as an AR speaker so that a sound corresponding to a location in a predetermined space is provided to a user.

According to the present technology, the configuration of the HMD 1 itself can be simplified. By simplifying the configuration of the HMD 1, it is possible to reduce a size, a weight, and a manufacturing cost. Furthermore, it is also possible to reduce power consumption of the HMD 1. Therefore, a display of a contact lens type or the like can be used instead of the HMD 1 described above.

By reducing the manufacturing cost, it is possible to reduce an introduction cost for introducing a device necessary for the user to experience augmented reality. Therefore, according to the present technology, it is possible to promote widespread use of devices for experiencing augmented reality such as the HMD 1.

Furthermore, since the smartphone 4 is already owned by many users, it is possible to promote widespread use of the HMD 1 by using such a terminal. Furthermore, the HMD 1 can have a configuration without a camera, and the appearance of the HMD 1 can be simplified. For example, by the HMD 1 including a camera, even users who hesitate to wear such an HMD 1 are more likely to want to wear a simple HDM 1.

<About Recording Medium>

The series of processes described above can be executed by hardware or also executed by software. In a case where the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 45:
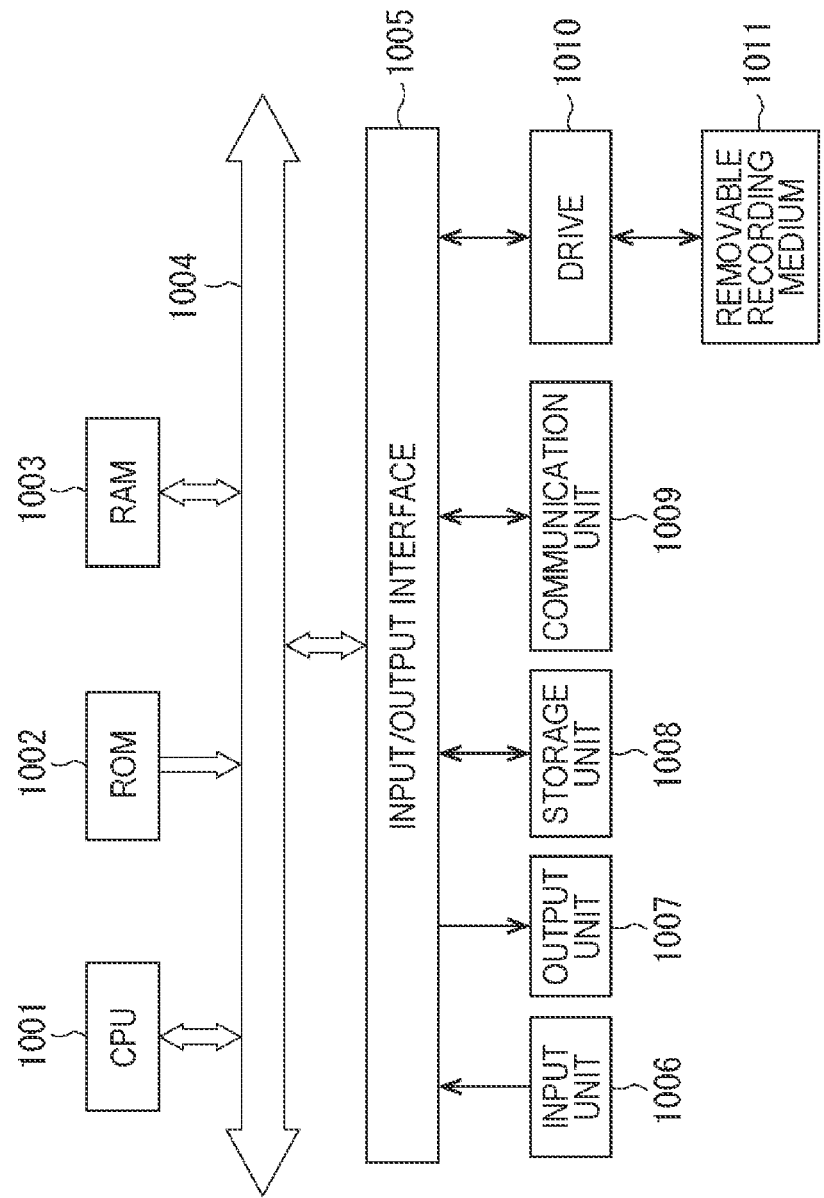
FIG. 45 is a diagram for explaining a configuration of a personal computer.

FIG. 45 is a block diagram illustrating a configuration example of hardware of a computer that executes the series of processes described above in accordance with a program.

In a computer, a central processing unit (CPU) 1001, a read only memory (ROM) 1002, and a random access memory (RAM) 1003 are mutually connected by a bus 1004. The bus 1004 is further connected with an input/output interface 1005. To the input/output interface 1005, an input unit 1006, an output unit 1007, a storage unit 1008, a communication unit 1009, and a drive 1010 are connected.

The input unit 1006 includes a keyboard, a mouse, a microphone, and the like. The output unit 1007 includes a display, a speaker, and the like. The storage unit 1008 includes a hard disk, a non-volatile memory, and the like. The communication unit 1009 includes a network interface or the like. The drive 1010 drives a removable recording medium 1011 such as a magnetic disk, an optical disk, a magneto-optical disk, or a semiconductor memory.

In the computer configured as described above, the series of processes described above are performed, for example, by the CPU 1001 loading a program recorded in the storage unit 1008 into the RAM 1003 via the input/output interface 1005 and the bus 1004, and executing.

The program executed by the computer (the CPU 1001) can be provided by being recorded on, for example, the removable recording medium 1011 as a package recording medium or the like. Furthermore, the program can be provided via a wired or wireless transmission medium such as a local area network, the Internet, or digital satellite broadcasting.

In the computer, by attaching the removable recording medium 1011 to the drive 1010, the program can be installed in the storage unit 1008 via the input/output interface 1005. Furthermore, the program can be received by the communication unit 1009 via a wired or wireless transmission medium, and installed in the storage unit 1008. Besides, the program can be installed in advance in the ROM 1002 and the storage unit 1008.

Note that the program executed by the computer may be a program that performs processing in a time series according to an order described in this specification, or may be a program that performs processing in parallel or at necessary timing such as when a call is made.

Furthermore, in the present specification, the system represents an entire device including a plurality of devices.

Note that the effects described in this specification are merely examples and are not limited, and other effects may also be present.

Note that the embodiment of the present technology is not limited to the above-described embodiment, and various modifications can be made without departing from the scope of the present technology.

Note that the present technology can also have the following configurations.

(1)

An information processing apparatus including a generation unit configured to generate:

first location data regarding a location of self with respect to a real space;

second location data regarding a location of another device with respect to self; and third location data regarding a location of the another device with respect to the real space on the basis of the first location data and the second location data.

(2)

The information processing apparatus according to (1) described above, in which on the basis of the third location data, image data of an image localized in the real space and to be displayed in the another device is generated.

(3)

The information processing apparatus according to (1) or (2) described above, in which the third location data is calculated by multiplying the first location data and the second location data.

(4)

The information processing apparatus according to any one of (1) to (3) described above, in which the first location data is calculated using an image obtained by imaging the real space with a first camera, and the second location data is calculated using an image obtained by imaging the another device with a second camera.

(5)

The information processing apparatus according to (4) described above, in which the first location data is a location of the first camera with respect to the real space, the second location data is a location of the another device with respect to the second camera, and the third location data is calculated by multiplying the first location data, the second location data, and fourth location data regarding a location of the second camera with respect to the first camera.

(6)

The information processing apparatus according to (4) or (5) described above, in which the generation unit further generates:

fourth location data regarding a location of a virtual origin with respect to the first camera; and fifth location data regarding a location of the second camera with respect to the virtual origin, the first location data is a location of the first camera with respect to the real space, the second location data is a location of the another device with respect to the second camera, and the third location data is calculated by multiplying the first location data, the second location data, the fourth location data, and the fifth location data.

(7)

The information processing apparatus according to any one of (4) to (6) described above, in which the first camera and the second camera are provided on different surfaces.

(8)

The information processing apparatus according to any one of (4) to (7) described above, in which image data of an image to be displayed in the another device is generated by using the third location data and information of the real space, the information being obtained from an image imaged by the first camera.

(9)

The information processing apparatus according to any one of (4) to (8) further including:

a first determination unit configured to determine whether or not a capture-loss state has occurred in which the real space is not captured by the first camera;

a second determination unit configured to determine whether or not a capture-loss state has occurred in which the another device is not captured by the second camera; and a warning processing unit configured to generate information to issue a warning in a case where it is determined that a capture-loss state has occurred in at least one of the first determination unit or the second determination unit.

(10)

The information processing apparatus according to (9) described above, in which the warning processing unit generates information to return from the capture-loss state to a state in which no capture loss has occurred.

(11)

The information processing apparatus according to any one of (4) to (10), in which the second camera images a plurality of the another devices, and the second location data and the third location data are generated for each of the plurality of the another devices.

(12)

The information processing apparatus according to any one of (1) to (11) described above, further including:

a motion sensor, in which the first location data and the second location data are acquired in a time division manner, and location data obtained from the motion sensor is used to correct the third location data.

(13)

The information processing apparatus according to any one of (1) to (12) described above, in which the first location data is supplied from an apparatus including a camera installed in the real space.

(14)

An information processing apparatus including a generation unit configured to generate:

first location data regarding a location of another device with respect to self for each of a plurality of the another devices; and second location data regarding locations of the another devices with each other on the basis of a plurality of pieces of the first location data.

(15)

The information processing apparatus according to (14) described above, further including:

one or more cameras configured to image a plurality of the another devices.

(16)

An information processing apparatus for generating location data representing a locational relationship between a first device and a third device on the basis of:

first location data regarding a location of the first device with respect to self, the first location data being calculated by using an image obtained by imaging the first device with a first camera;

second location data regarding a location of a second device with respect to self, the second location data being calculated by using an image obtained by imaging the second device with a second camera; and third location data regarding a location of the third device with respect to the second device, the third location data being generated by the second device.

(17)

The information processing apparatus according to any one of (1) to (16) described above, in which the information processing apparatus is a smartphone.

(18)

The information processing apparatus according to any one of (1) to (17) described above, in which the another device is a head mounted display (HMD).

(19)

An information processing method in which an information processing apparatus configured to generate location data generates:

first location data regarding a location of self with respect to a real space;

second location data regarding a location of the another device with respect to self; and third location data regarding a location of the another device with respect to the real space on the basis of the first location data and the second location data.

(20)

A program for causing a computer to execute processing including a step of generating:

first location data regarding a location of self with respect to a real space;

second location data regarding a location of the another device with respect to self; and third location data regarding a location of the another device with respect to the real space on the basis of the first location data and the second location data.

REFERENCE SIGNS LIST

1 HMD
2 Information processing apparatus
3 Network
4 Smartphone
11 Display unit
15 Location conversion unit
31 CPU
32 Memory
33 Sensor unit
34 Input unit
Output unit
36 Communication unit
37 Bus
91 Object
101 Outer camera
102 Environment location specifying unit
103 Inner camera
104 HMD location specifying unit
105 Location conversion unit
106 Rendering unit
107 Communication unit
121 Communication unit
122 Display control unit
130 Inner camera
141 Rendering unit
161 Determination unit
162 Determination unit
163 Warning processing unit
164 Warning processing unit
181 Warning processing unit
182 Speaker
201 Location storage unit
231 Camera
232 Environment HMD location specifying unit
234 Motion sensor
235 Location conversion unit
251 Motion sensor
281 Camera
282 HMD location specifying unit
301 HMD location specifying unit
331 Smartphone location specifying unit
401 External terminal
411 Camera
412 Smartphone location specifying unit
413 Communication unit
431 Camera
432 HMD location specifying unit
433 Location conversion unit
434 Rendering unit
435 Communication unit

The invention claimed is:

1. An information processing apparatus comprising a generation unit configured to generate:

first location data regarding a location of a first device with respect to a real space;

second location data regarding a location of a second device with respect to the first device; and third location data regarding a location of the second device with respect to the real space based on the first location data and the second location data, wherein the third location data is calculated by an arithmetic operation using the first location data and the second location data, and wherein the generation unit is implemented via at least one processor.

2. The information processing apparatus according to claim 1, wherein based on the third location data, image data of an image localized in the real space and to be displayed in the second device is generated.

3. The information processing apparatus according to claim 1, wherein the third location data is calculated by multiplying the first location data and the second location data.

4. The information processing apparatus according to claim 1, wherein the first location data is calculated using an image obtained by imaging the real space with a first camera, and the second location data is calculated using an image obtained by imaging the second device with a second camera.

5. The information processing apparatus according to claim 4, wherein the first location data is a location of the first camera with respect to the real space, the second location data is a location of the second device with respect to the second camera, and the third location data is calculated by multiplying the first location data, the second location data, and fourth location data regarding a location of the second camera with respect to the first camera.

6. The information processing apparatus according to claim 4, wherein the generation unit is further configured to generate:

fourth location data regarding a location of a virtual origin with respect to the first camera; and fifth location data regarding a location of the second camera with respect to the virtual origin, the first location data is a location of the first camera with respect to the real space, the second location data is a location of the second device with respect to the second camera, and the third location data is calculated by multiplying the first location data, the second location data, the fourth location data, and the fifth location data.

7. The information processing apparatus according to claim 4, wherein
the first camera and the second camera are provided on different surfaces.

8. The information processing apparatus according to claim 4, wherein
image data of an image to be displayed in the second device is generated by using the third location data and information of the real space, the information being obtained from an image imaged by the first camera.

9. The information processing apparatus according to claim 4, further comprising:
a first determination unit configured to determine whether or not a capture-loss state has occurred in which the real space is not captured by the first camera;
a second determination unit configured to determine whether or not a capture-loss state has occurred in which the second device is not captured by the second camera; and
a warning processing unit configured to generate information to issue a warning in a case where it is determined that a capture-loss state has occurred in at least one of the first determination unit or the second determination unit,
wherein the first determination unit, the second determination unit, and the warning processing unit are each implemented via at least one processor.

10. The information processing apparatus according to claim 9, wherein
the warning processing unit is further configured to generate information to return from the capture-loss state to a state in which no capture loss has occurred.

11. The information processing apparatus according to claim 4, wherein
the second camera images a plurality of second devices, and
the second location data and the third location data are generated for each of the plurality of second devices.

12. The information processing apparatus according to claim 1, further comprising:
a motion sensor, wherein
the first location data and the second location data are acquired in a time division manner, and
location data obtained from the motion sensor is used to correct the third location data.

13. The information processing apparatus according to claim 1, wherein
the first location data is supplied from an apparatus including a camera installed in the real space.

14. An information processing apparatus comprising:
a generation unit configured to generate, for a first device:
first location data regarding a location of each second device of a plurality of second devices with respect to the first device; and
second location data regarding locations of the plurality of second devices with respect to each other based on a plurality of pieces of the first location data,
wherein third location data regarding a location of the plurality of second devices in a real space is calculated by an arithmetic operation using the first location data and the second location data, and
wherein the generation unit is implemented via at least one processor.

15. The information processing apparatus according to claim 14, further comprising:
one or more cameras configured to image a plurality of second devices.

16. An information processing apparatus comprising:
circuitry configured to generate location data representing a locational relationship between a first device and a third device based on:
first location data regarding a location of the first device with respect to a real space, the first location data being calculated by using an image obtained by imaging the first device with a first camera;
second location data regarding a location of a second device with respect to a real space, the second location data being calculated by using an image obtained by imaging the second device with a second camera; and
third location data regarding a location of the third device with respect to the second device, the third location data being generated by the second device,
wherein the locational relationship between the first device and the third device is calculated by an arithmetic operation using the first location data, the second location data, and the third location data.

17. The information processing apparatus according to claim 1, wherein
the information processing apparatus includes a smartphone as the first device.

18. The information processing apparatus according to claim 1, wherein
the second device includes a head mounted display (HMD).

19. An information processing method comprising:
generating first location data regarding a location of a first device with respect to a real space;
second location data regarding a location of a second device with respect to the first device; and
third location data regarding a location of the second device with respect to the real space based on the first location data and the second location data,
wherein the third location data is calculated by an arithmetic operation using the first location data and the second location data.

20. A non-transitory computer-readable storage medium having embodied thereon a program, which when executed by a computer causes the computer to execute a method, the method comprising:
generating first location data regarding a location of a first device with respect to a real space;
generating second location data regarding a location of a second device with respect to the first device; and
generating third location data regarding a location of the second device with respect to the real space based on the first location data and the second location data,
wherein the third location data is calculated by an arithmetic operation using the first location data and the second location data.

* * * * *